(12) United States Patent
Van Der Westhuizen et al.

(10) Patent No.: US 10,126,923 B2
(45) Date of Patent: Nov. 13, 2018

(54) EVENT AND CAUSALITY-BASED HUMAN-COMPUTER INTERACTION

(71) Applicant: Flow Labs, Inc., Menlo Park, CA (US)

(72) Inventors: Willem Morkel Van Der Westhuizen, Stellenbosch (ZA); Frederik George Scholtz, Stellenbosch (ZA); Jan Pool, Stellenbosch (ZA)

(73) Assignee: Flow Labs, Inc., Menlo Park, CA (US)

( * ) Notice: Subject to any disclaimer, the term of this patent is extended or adjusted under 35 U.S.C. 154(b) by 496 days.

(21) Appl. No.: 14/653,697

(22) PCT Filed: Dec. 13, 2013

(86) PCT No.: PCT/ZA2013/000093
§ 371 (c)(1),
(2) Date: Jun. 18, 2015

(87) PCT Pub. No.: WO2014/100838
PCT Pub. Date: Jun. 26, 2014

(65) Prior Publication Data
US 2015/0331587 A1    Nov. 19, 2015

(30) Foreign Application Priority Data
Dec. 18, 2012 (ZA) .................... 2012/09577

(51) Int. Cl.
*G06F 3/0484* (2013.01)
*G06F 17/30* (2006.01)
(Continued)

(52) U.S. Cl.
CPC .......... *G06F 3/04842* (2013.01); *G06F 3/048* (2013.01); *G06F 17/16* (2013.01); *G06F 17/30914* (2013.01)

(58) Field of Classification Search
CPC ......................................... G06F 3/048–3/0486
See application file for complete search history.

(56) References Cited

U.S. PATENT DOCUMENTS 6,121,969 A * 9/2000 Jain .................. G06F 3/04815
                                              382/305
6,735,555 B1 * 5/2004 Suzuki .............. G06F 17/509
                                              703/13
(Continued)

FOREIGN PATENT DOCUMENTS

WO  WO 2004/044689 A2  5/2004

OTHER PUBLICATIONS

PCT International Search Report and Written Opinion, PCT Application No. PCT/ZA2013/000093, dated Jun. 3, 2014, 11 pages.
(Continued)

*Primary Examiner* — Patrick F Marinelli
(74) *Attorney, Agent, or Firm* — Fenwick & West LLP

(57) ABSTRACT

The invention relates to a method for human-computer interaction (HCI). The method includes: establishing an event set; establishing and referencing one or more events in the event set; establishing and referencing an event to represent the observer in the event set; establishing a representation manifold as an indefinite metric Riemann manifold; representing the events on the representation manifold in such a way that the logical relations between events are coordinate independent and geometrically encoded as causal relations; establishing an input manifold to represent user input; and establishing an output manifold that maps between the representation manifold and a physical output device. Further, based on user input, select any one or more steps from: manipulating the observer event, adjusting manifold metrics, changing mappings, adjusting mapping parameters, and applying mappings. The above steps are repeated when the user input changes.

14 Claims, 42 Drawing Sheets

Figure 1:
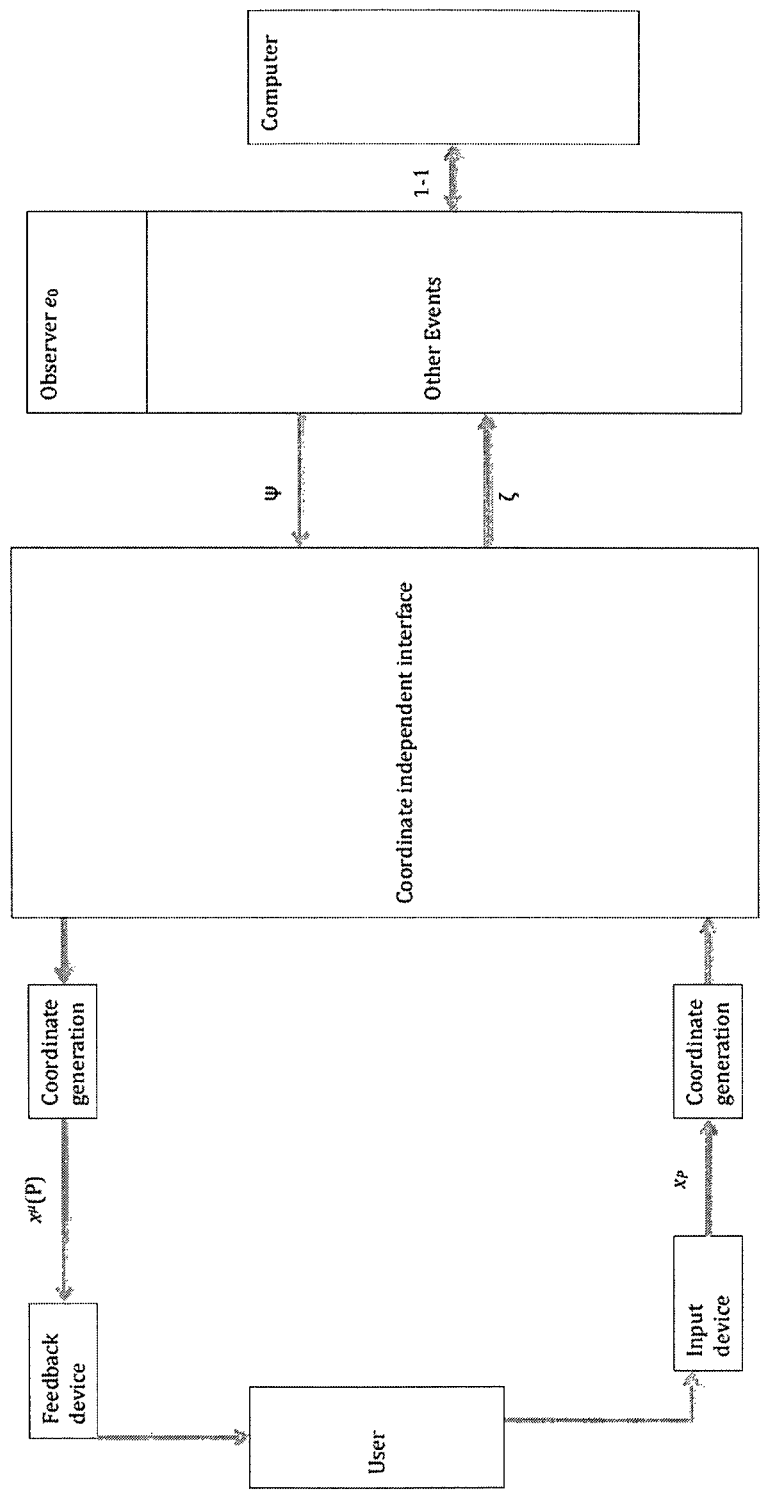

(51) Int. Cl.
*G06F 17/16* (2006.01)
*G06F 3/048* (2013.01)

(56) References Cited

U.S. PATENT DOCUMENTS 8,046,705 B2 10/2011 Hunleth et al.
2017/0242568 A1* 8/2017 Van Der Westhuizen ..................
G06F 3/04845

OTHER PUBLICATIONS

Fidaleo, D. et al., "Manifold Analysis of Facial Gestures for Face Recognition," Proceedings of the 2003 ACM SIGMM Multimedia Biometrics Methods and Application Workshop, WBMA '03, Nov. 8, 2003, 5 pages.
Buxton, B. "HCI and the Inadequacies of Direct Manipulation Systems," SIGCHI Bulletin, Jan. 1993, pp. 21-22, vol. 25, No. 1.
Bachmat, E. et al., "Analysis of Airplane Boarding Times," Operations Research, Accepted Dec. 1, 2007, Published: Mar. 11, 2009, pp. 1-34, vol. 57, Issue 2.
Moray, N. et al., "Minkowski Space as Models of Human-Machine Communication," Theoretical Issues in Ergonomic Science, Jul.-Aug. 2009, pp. 315-334, vol. 10, No. 4.
Darlow, A. et al., "Causal Temporal Order in HGI," Vancouver: CHI 2011, ACM, May 7-12, 2011, pp. 2389-2394.
Hrischuk, C.E. et al., "Proper Time: Causal and Temporal Relations of a Distributed System," SCE-96-04, Mar. 1996, Version 1.2, 40 pages, May be Retrieved at<URL:http://www.sce.carleton.ca/rads/rads.html>.
Broy, M., "Time, Abstraction, Causality and Modularity in Interactive Systems," FESCA 2004 Preliminary Version, Electronic Notes in Theoretical Computer Science, 2004, 8 pages, vol. 108.
Kortemeyer, G. et al., "Seeing and Experiencing Relativity—A New Tool for Teaching?" AAPT Physics Education, The Physics Teacher, Nov. 2013, pp. 460-461, vol. 51.
Matherat, P. et al., "Relativistic Causality and Clockless Circuits," ACM Journal on Emerging Technologies in Computing Systems, Association for Computing Machinery, 2011, 26 pages, vol. 7, No. 4.
Beaudouin-Lafon, M., "Designing Interaction, Not Interfaces," AVI'04, ACM, May 25-28, 2004, pp. 15-22.
Hinze-Hoare, V., "Review and Analysis of Human Computer Interaction (HCI) Principles," Southampton University, Jul. 2007, pp. 1-13.

* cited by examiner

Figure 4.1
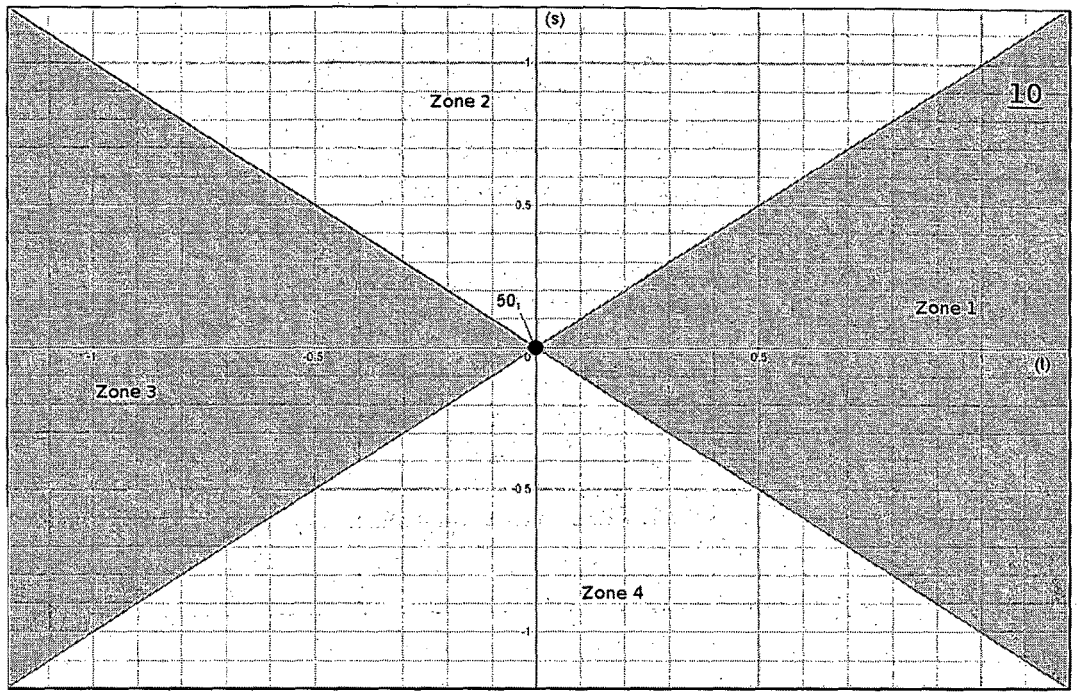
Figure 4.2
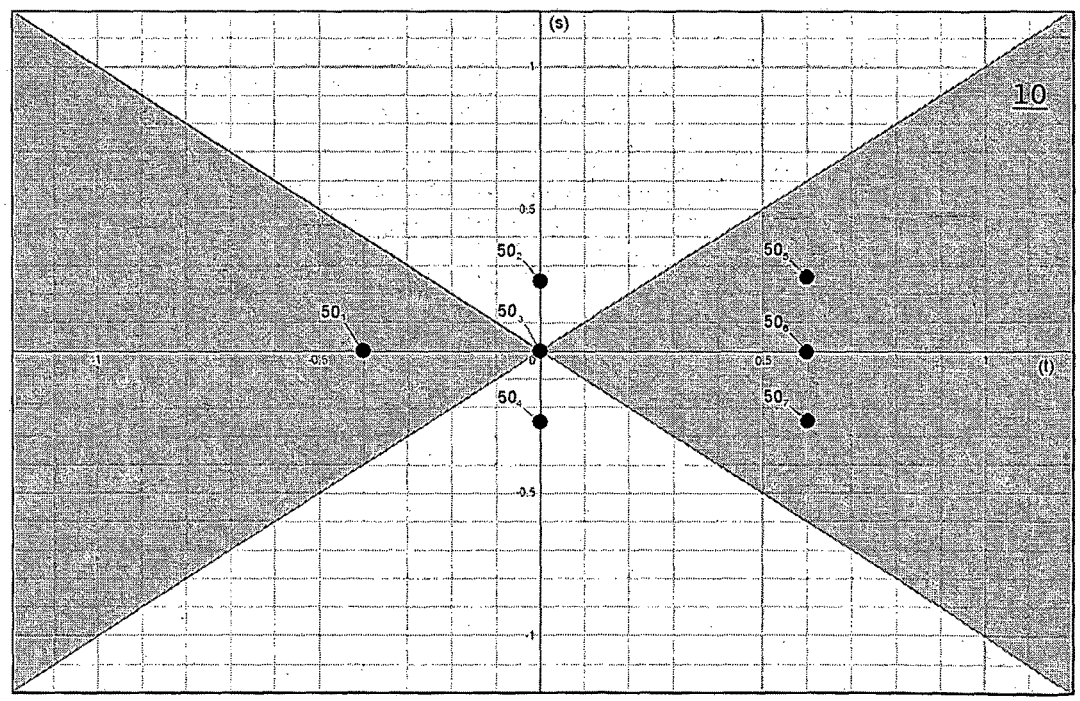

Figure 6.1
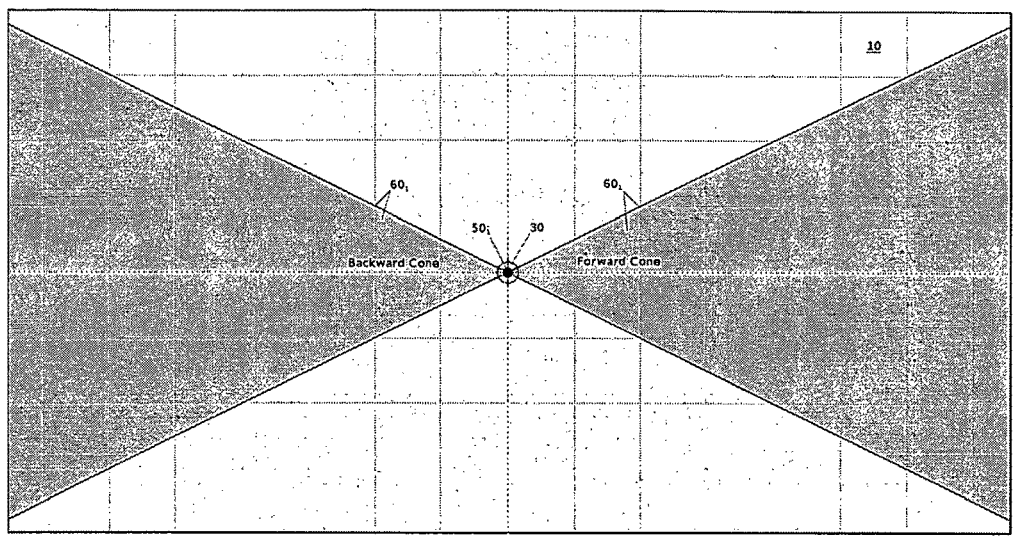
Figure 6.2
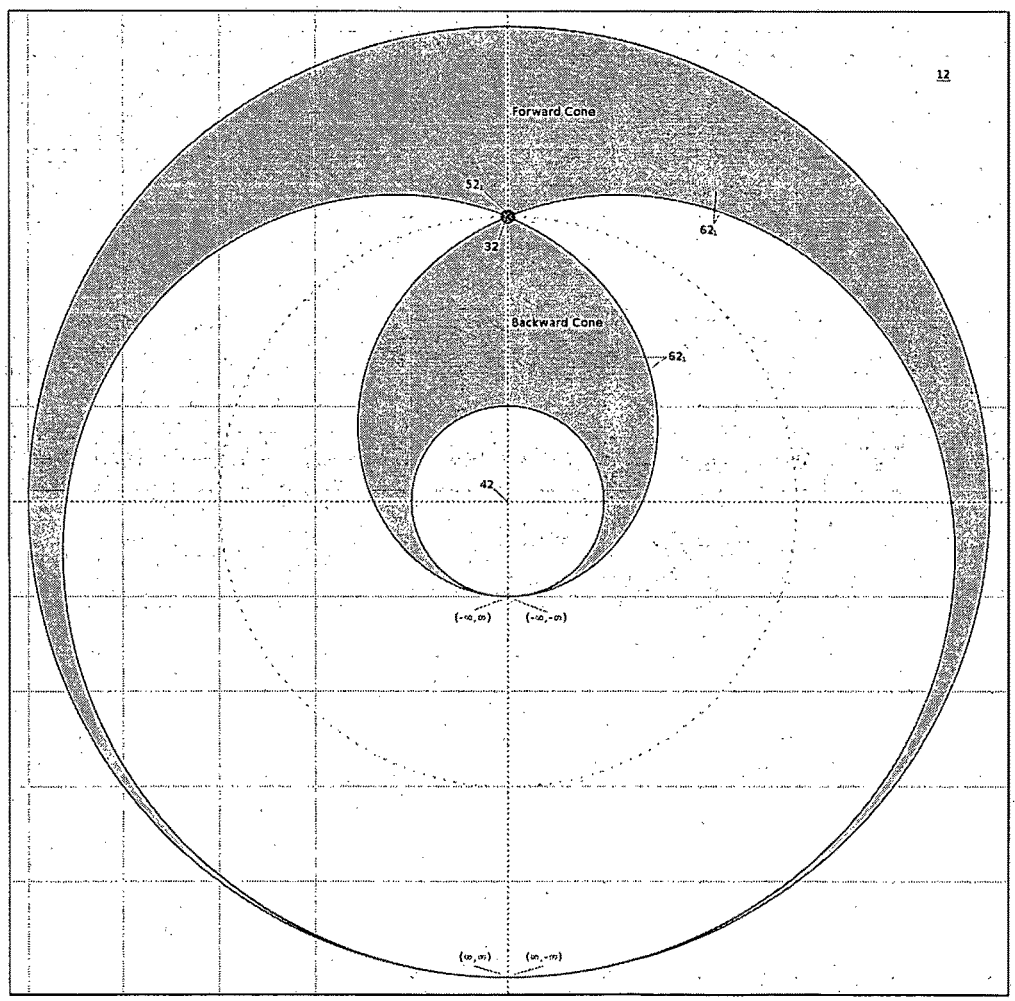

Figure 7.1
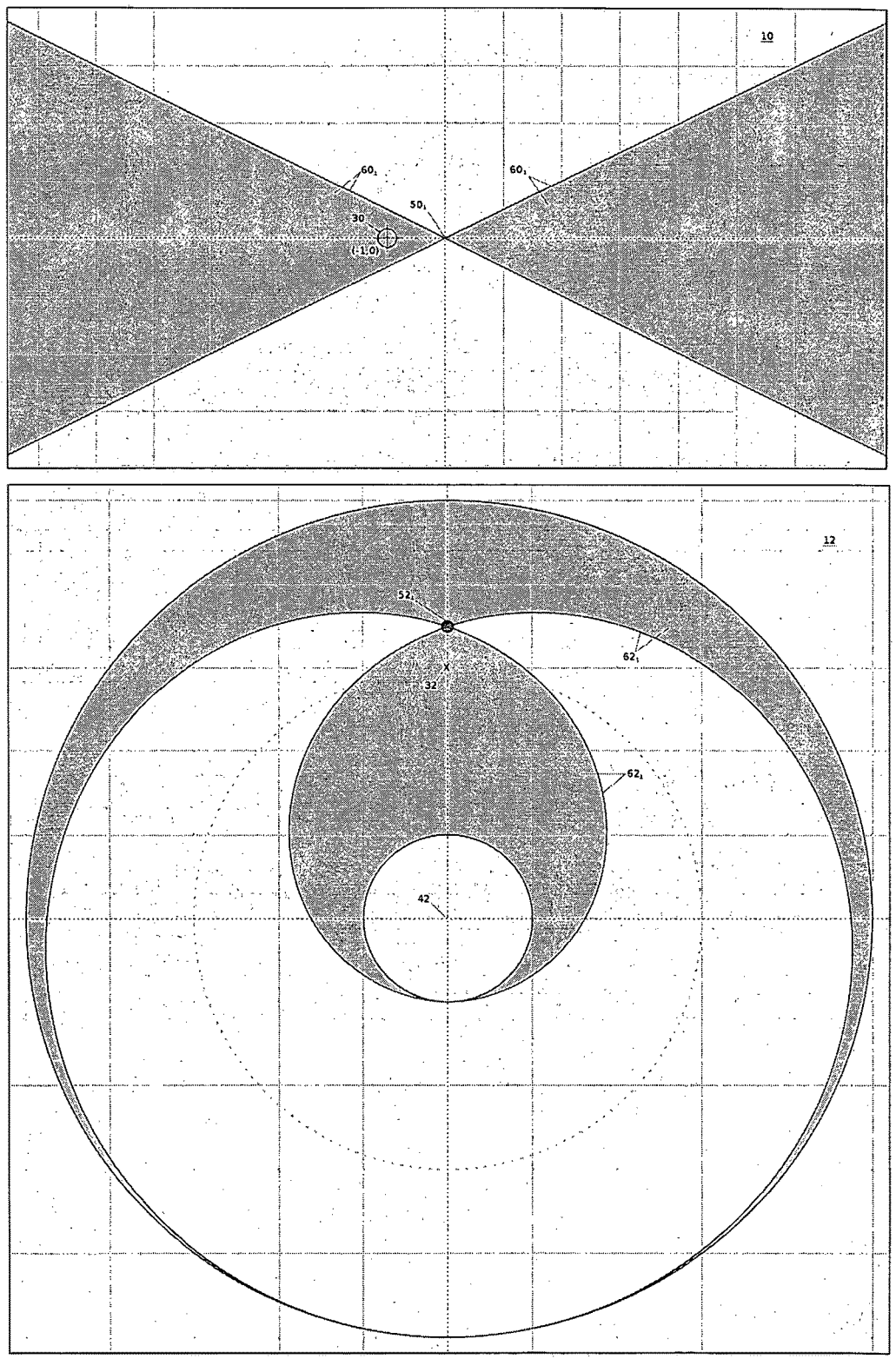

Figure 7.2
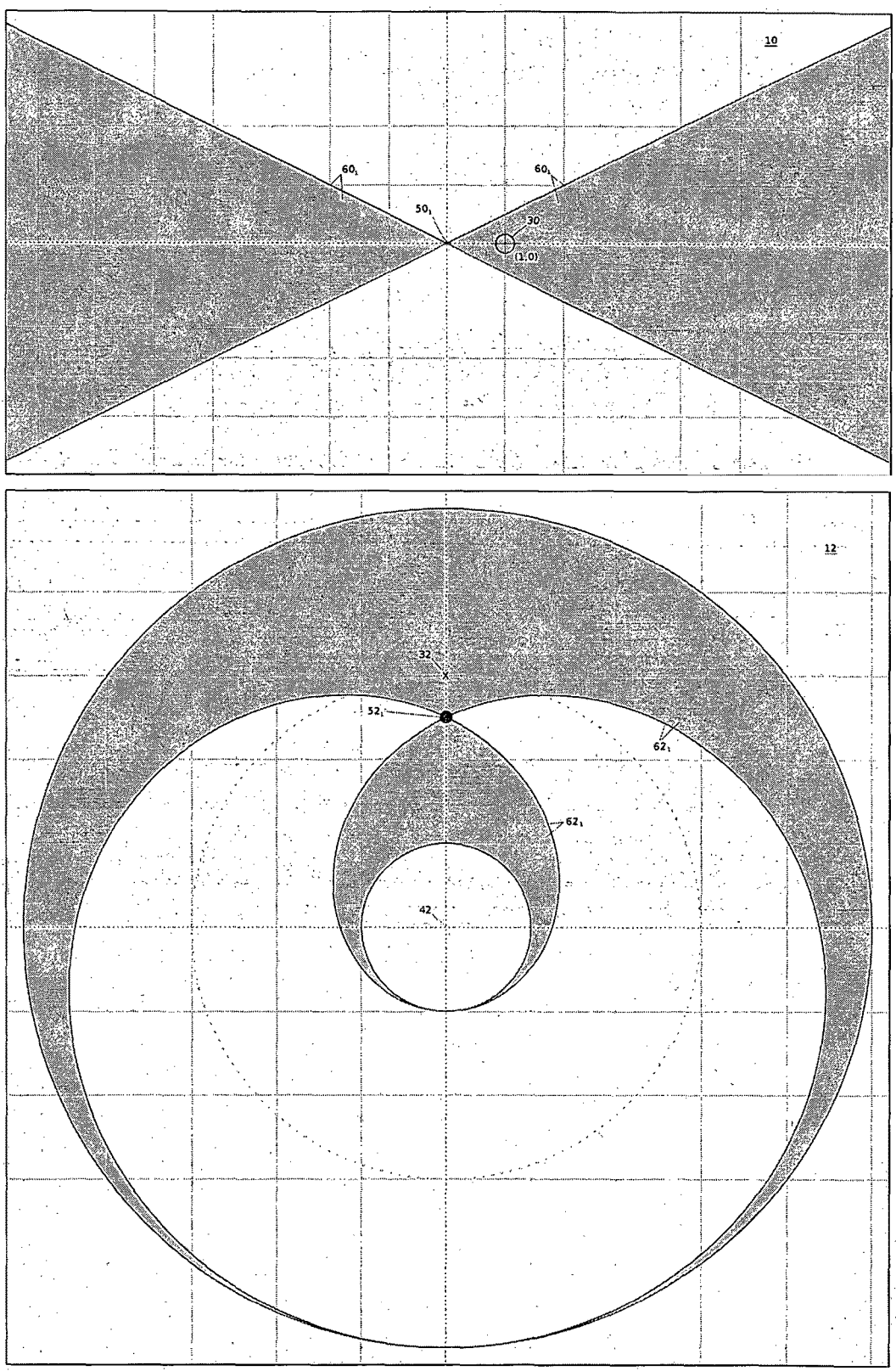

Figure 7.3
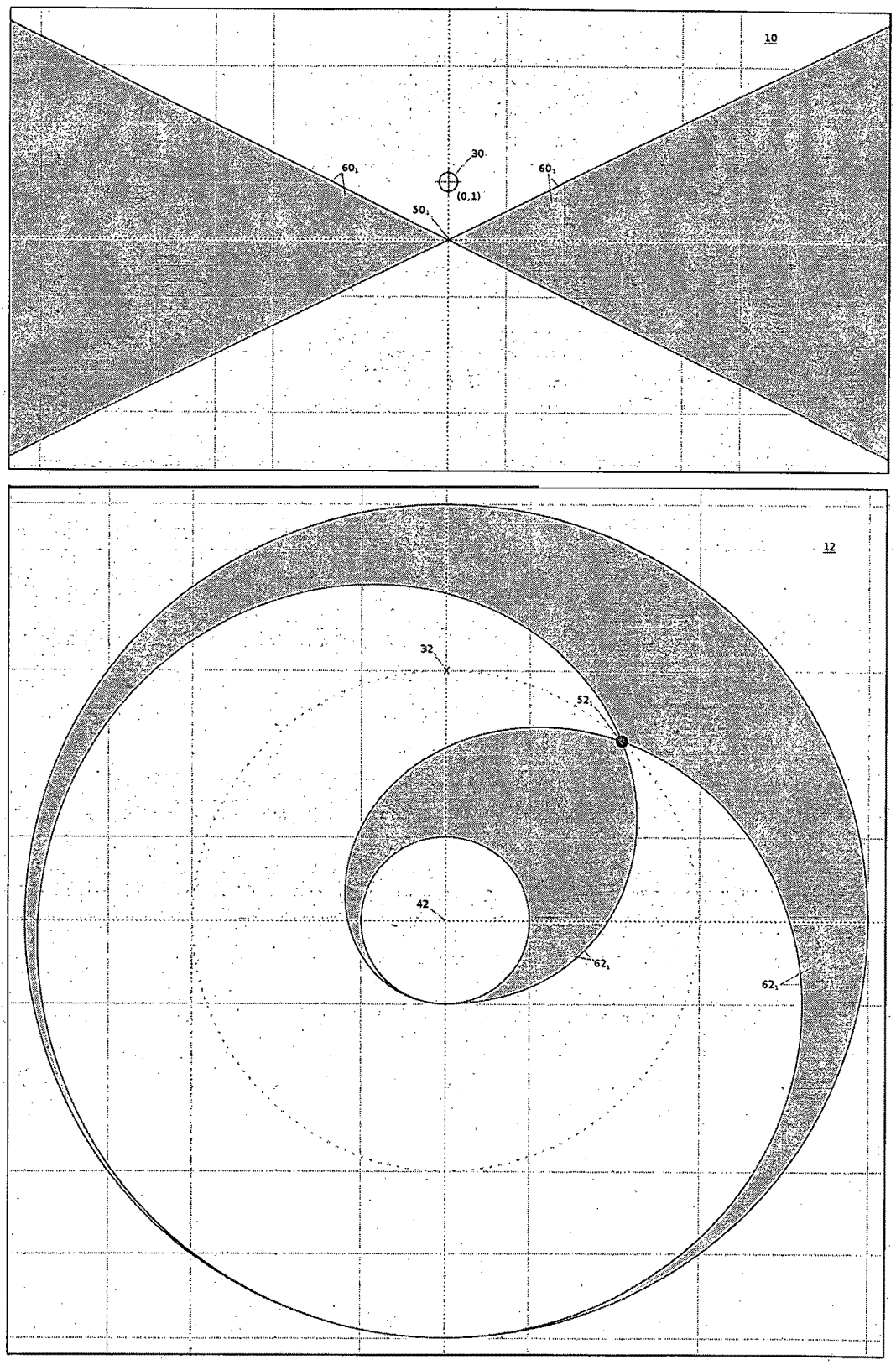

Figure 7.4
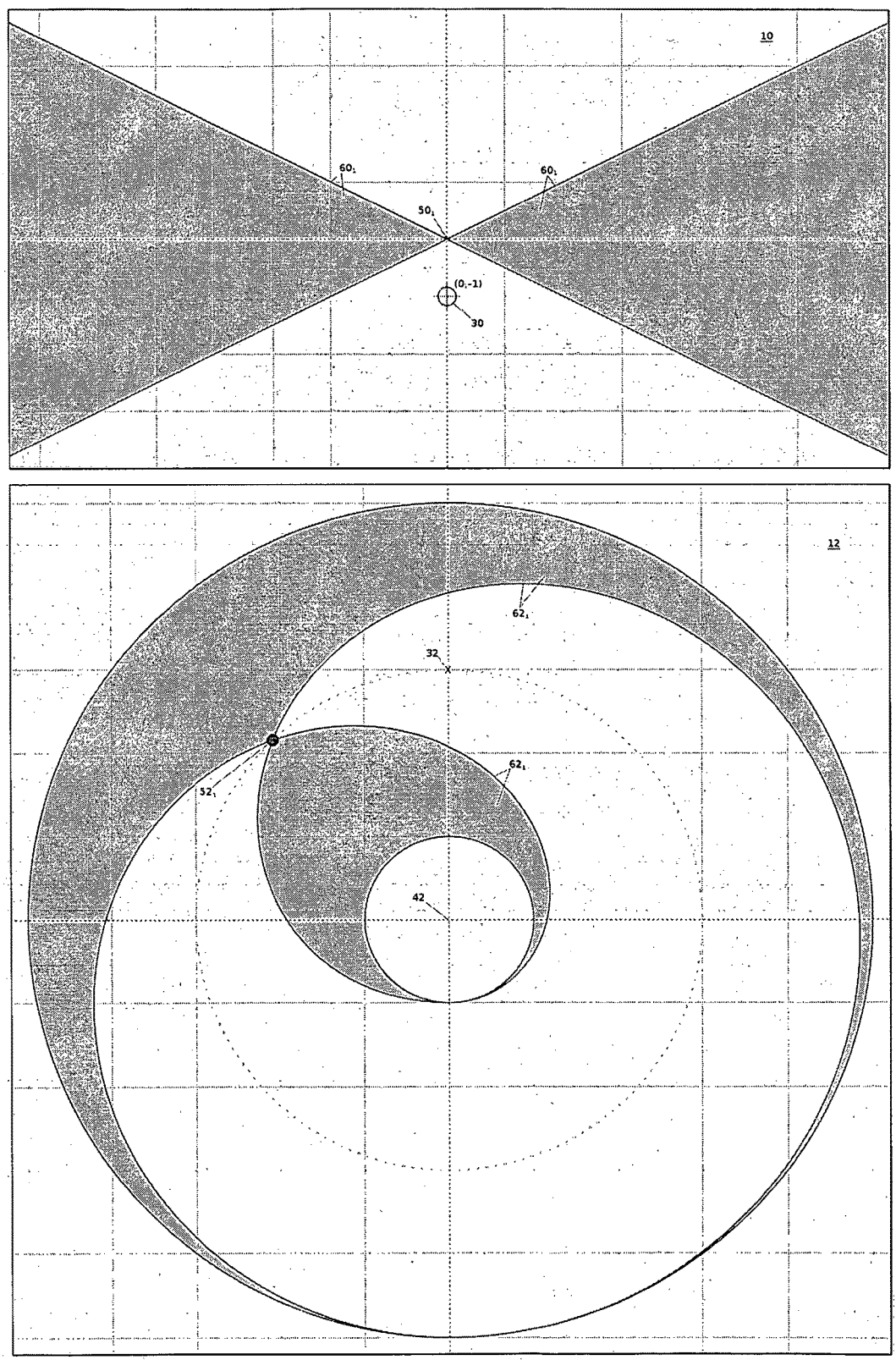

Figure 8.1
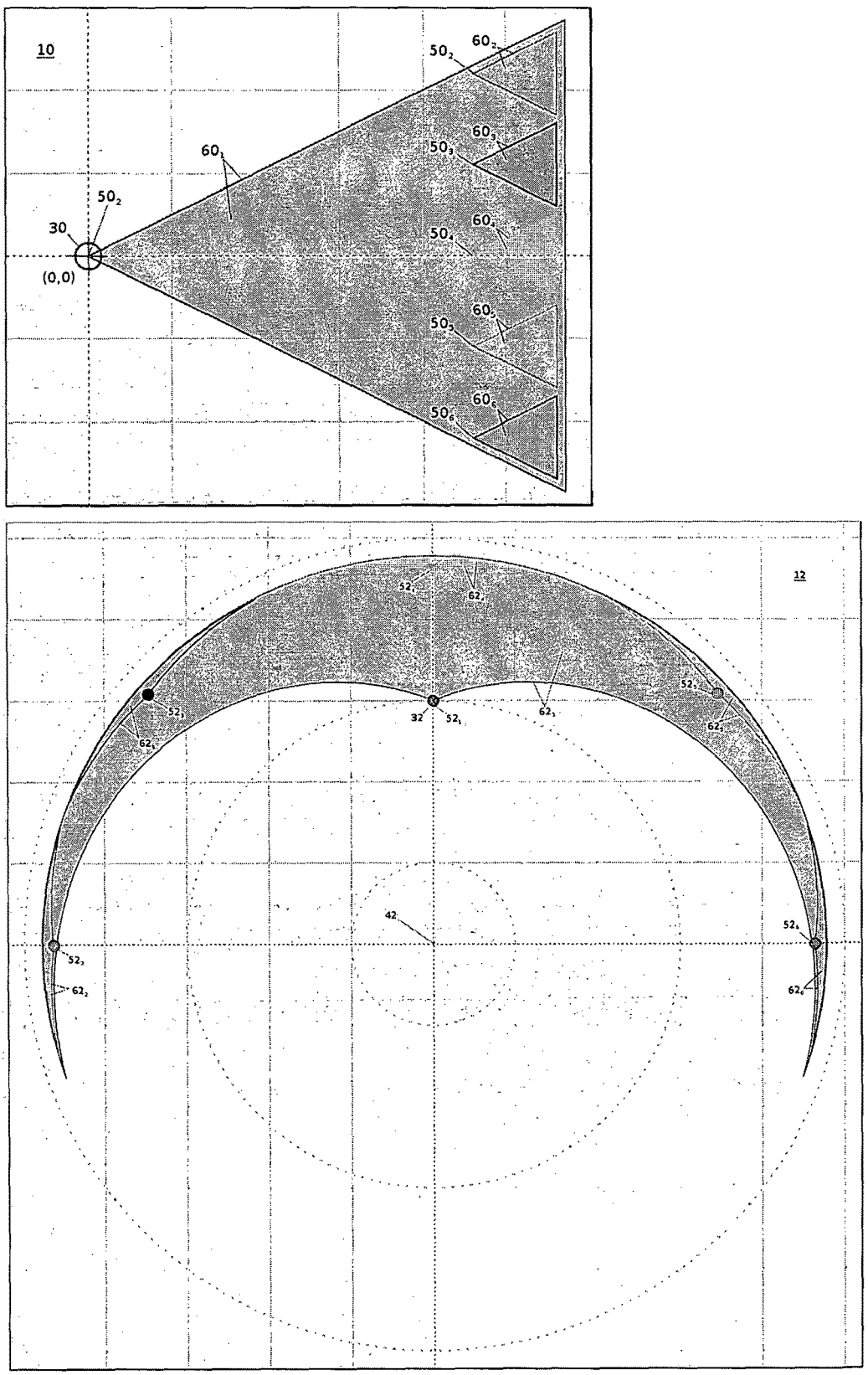

Figure 8.2a
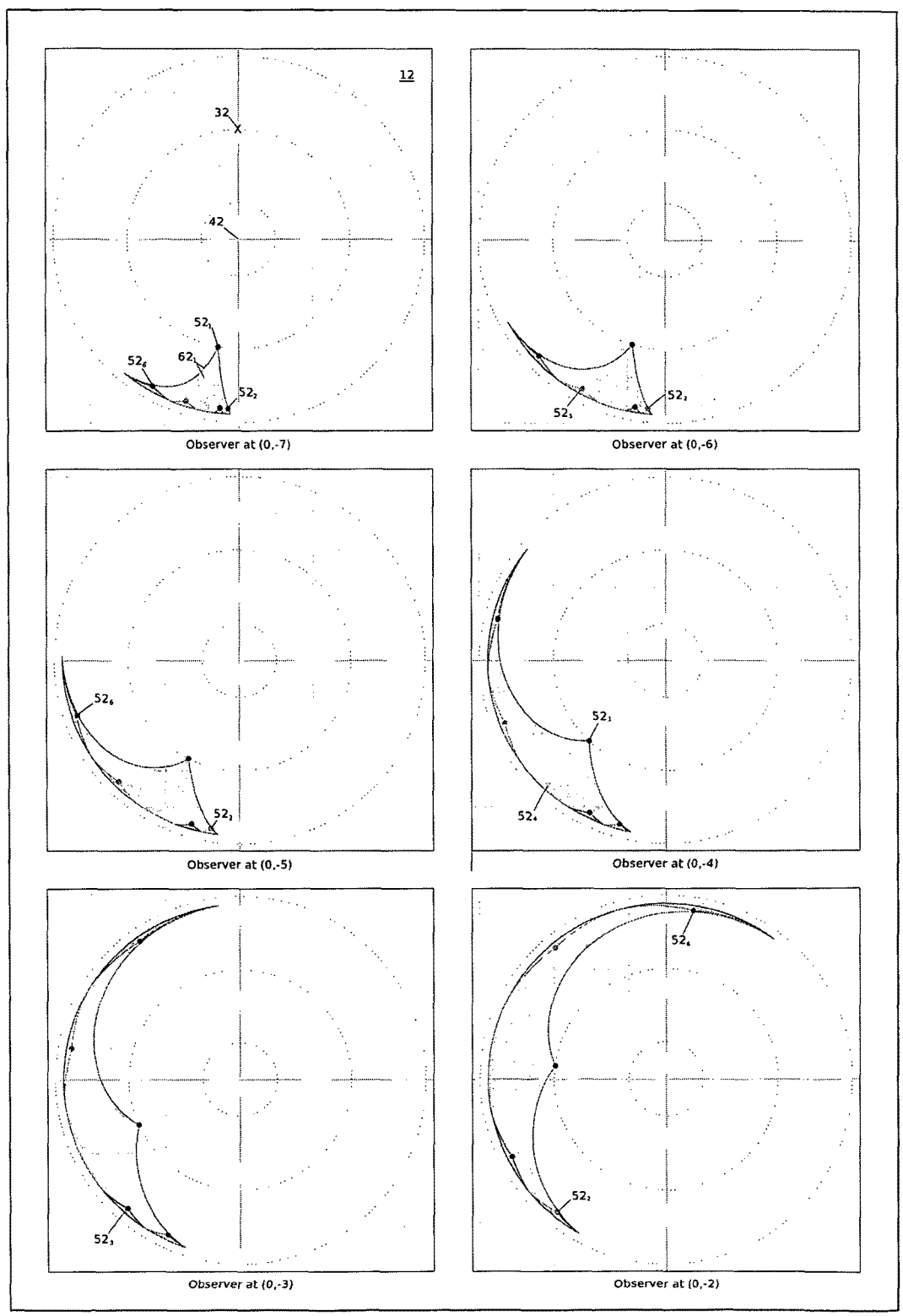

Figure 8.2b
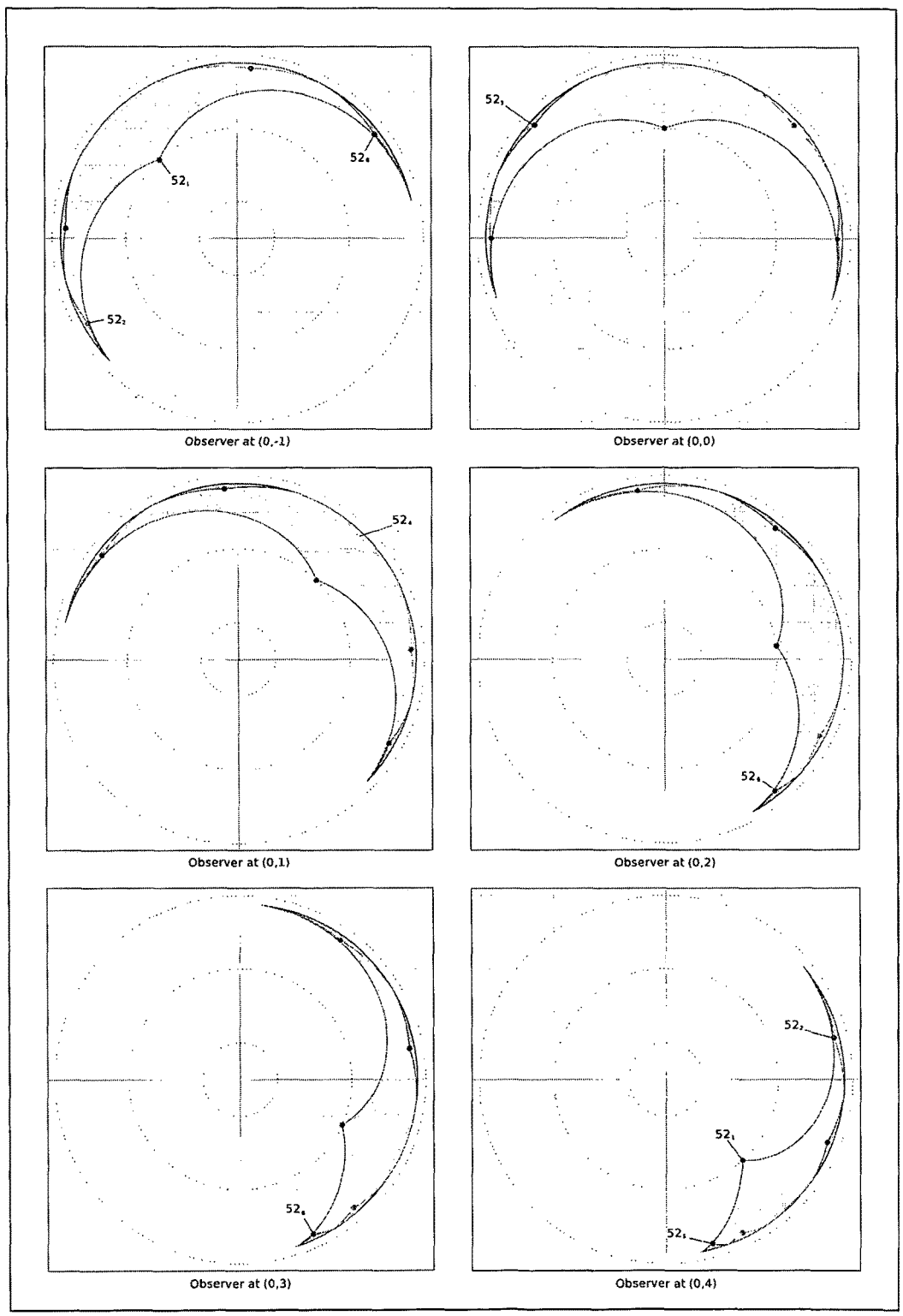

Figure 8.2c
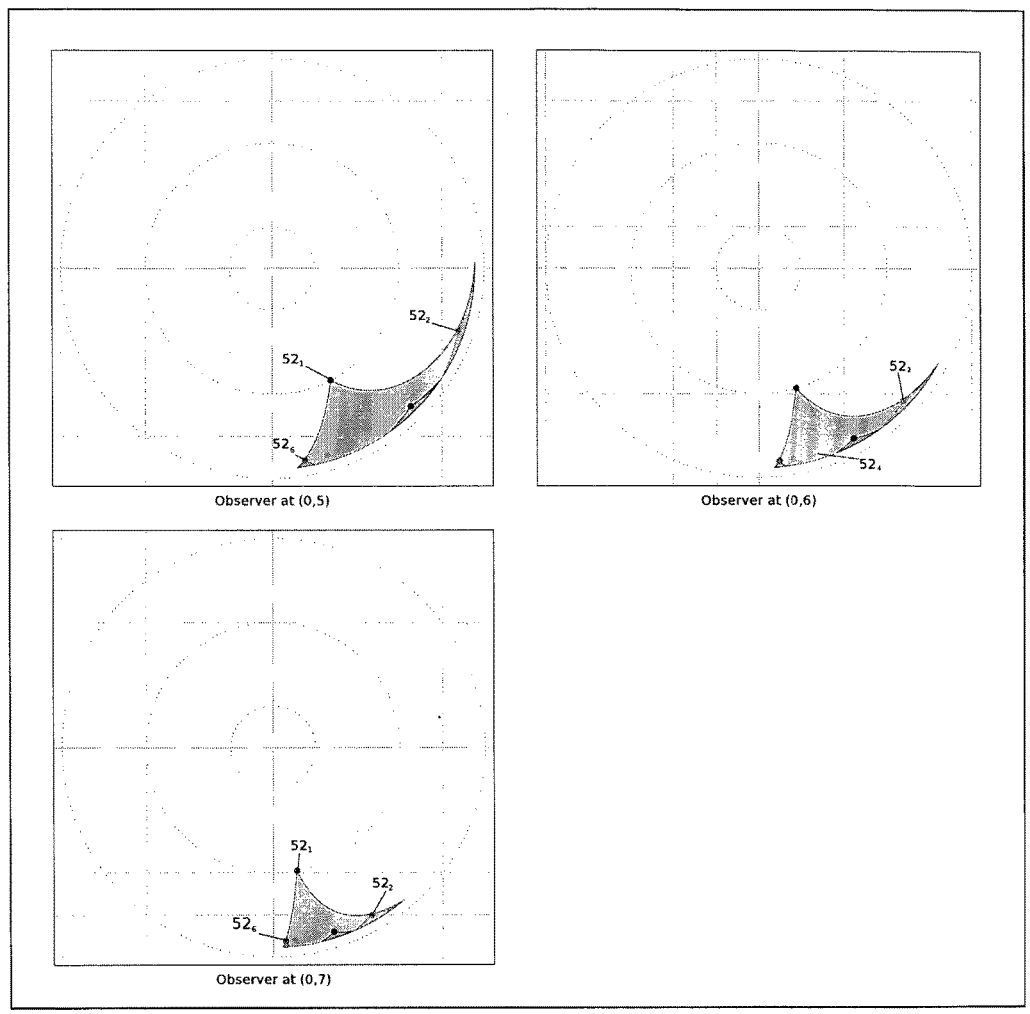

Figure 8.3a
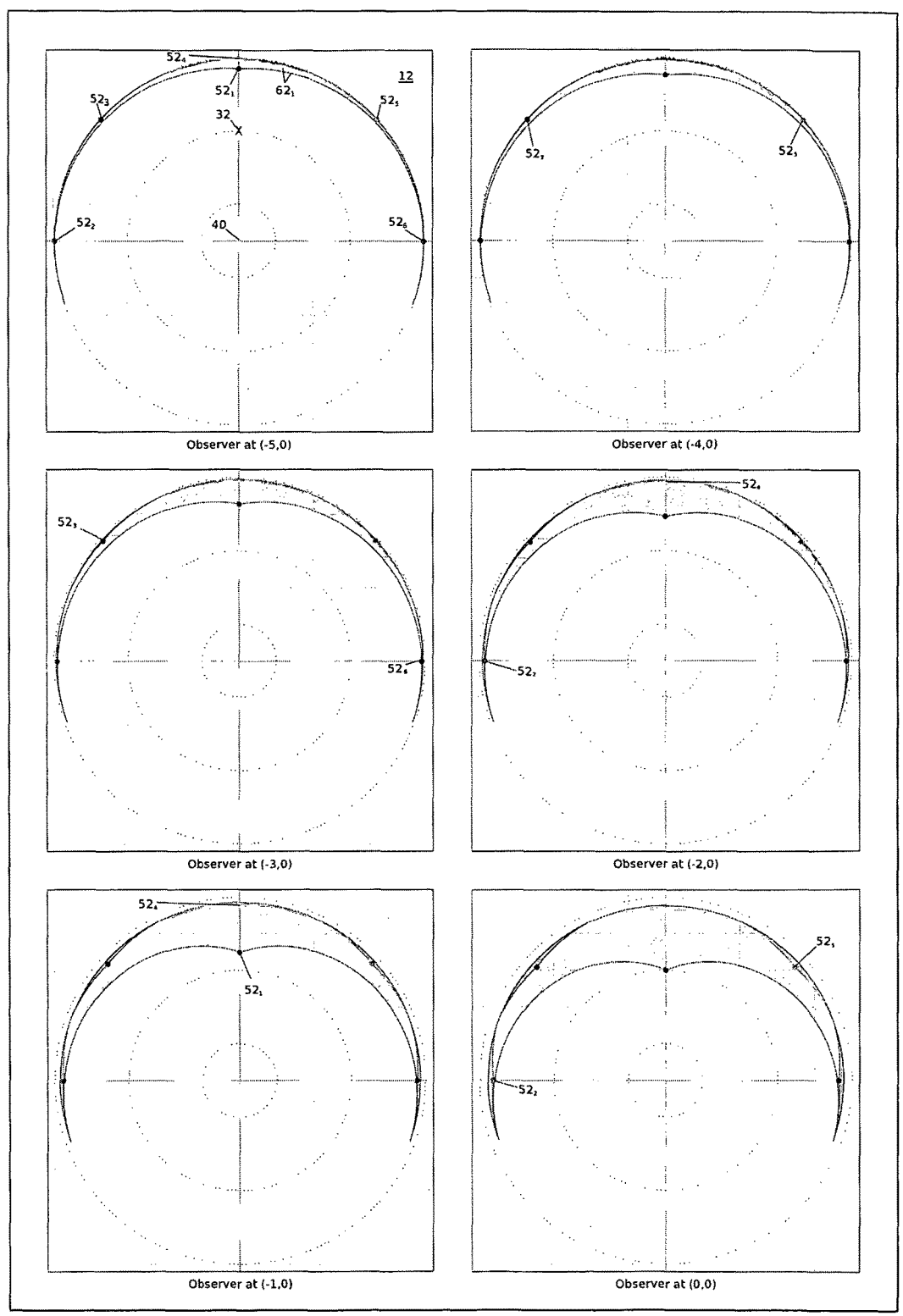

Figure 8.3b
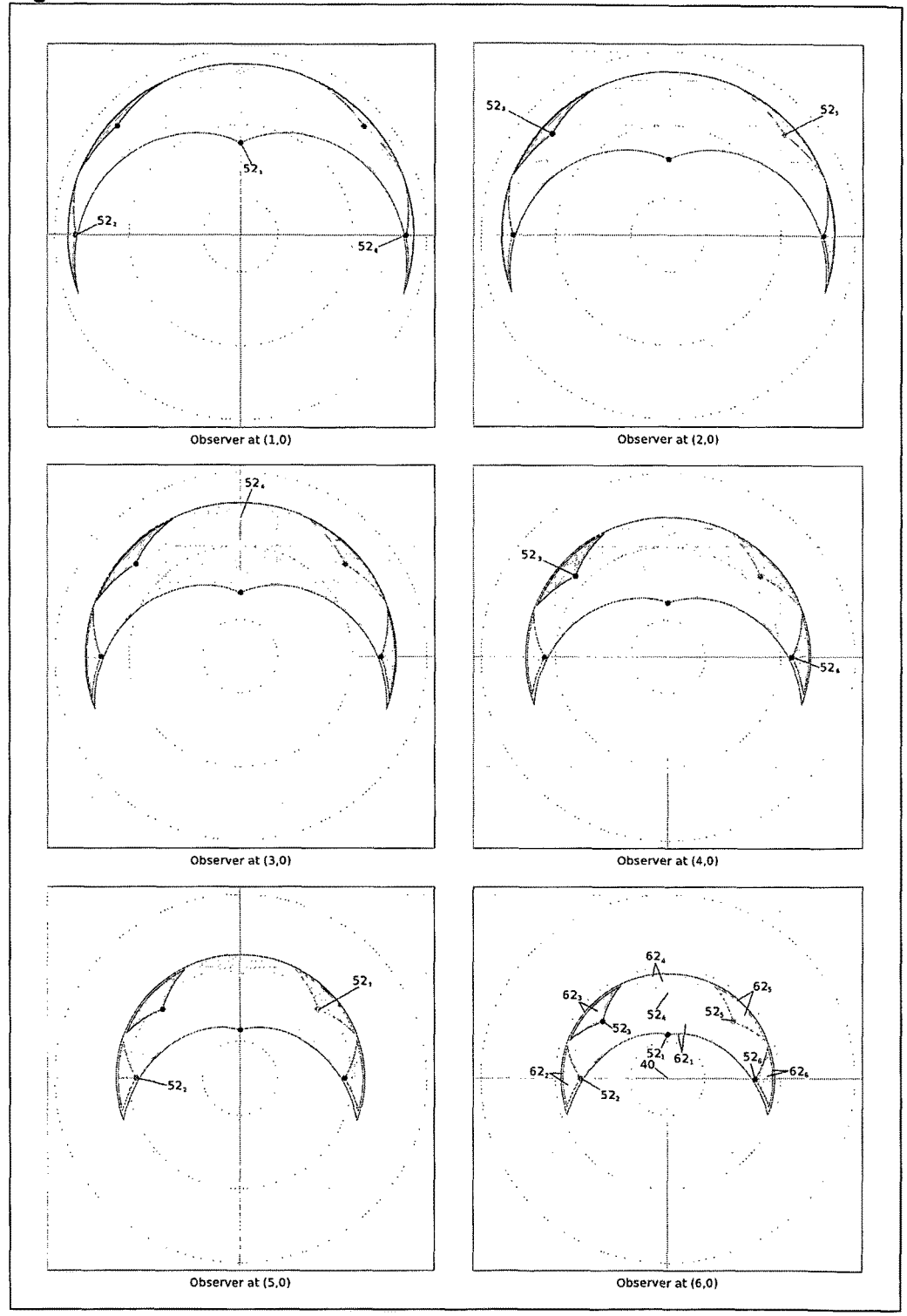

Figure 8.4a
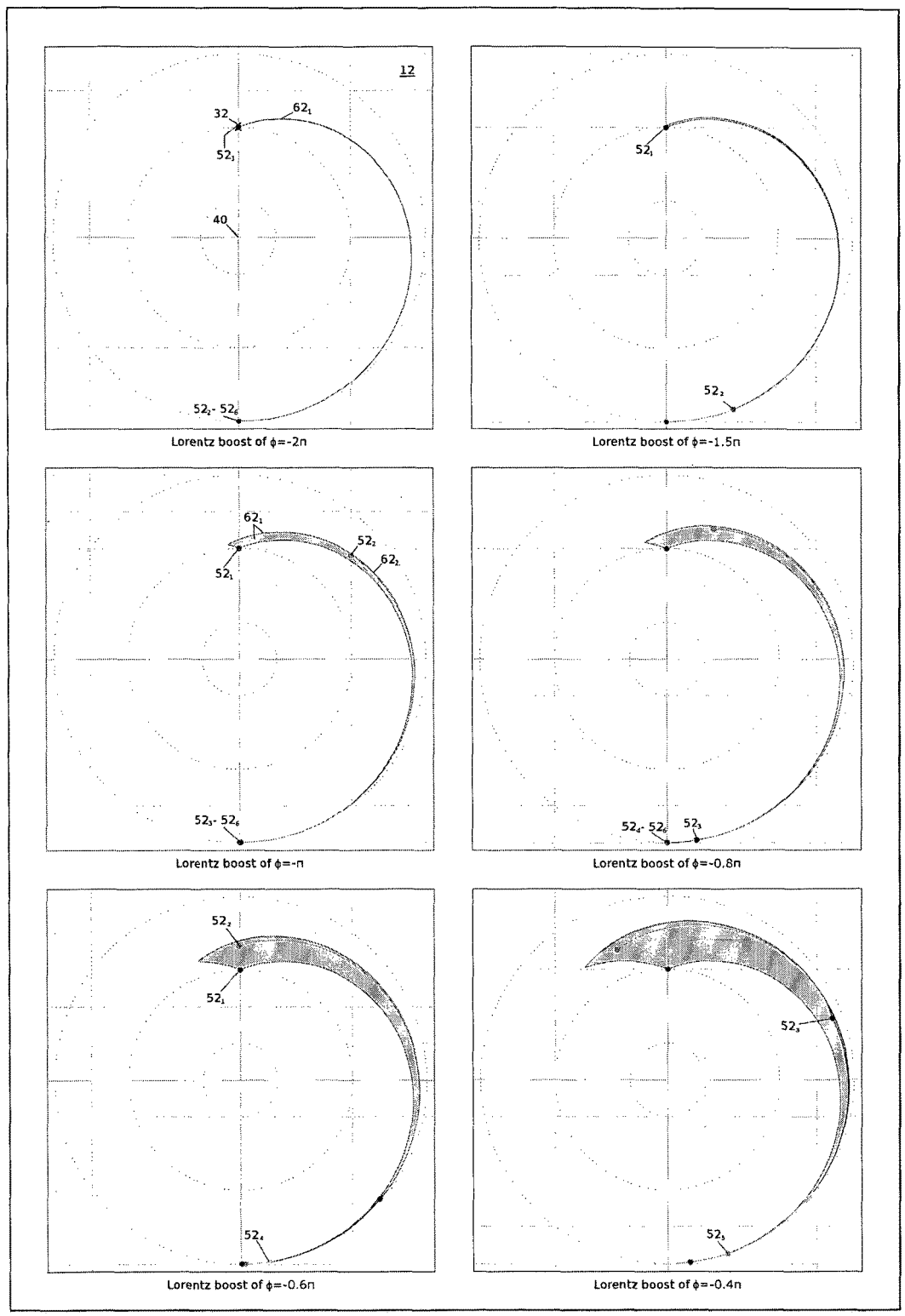

Figure 8.4b
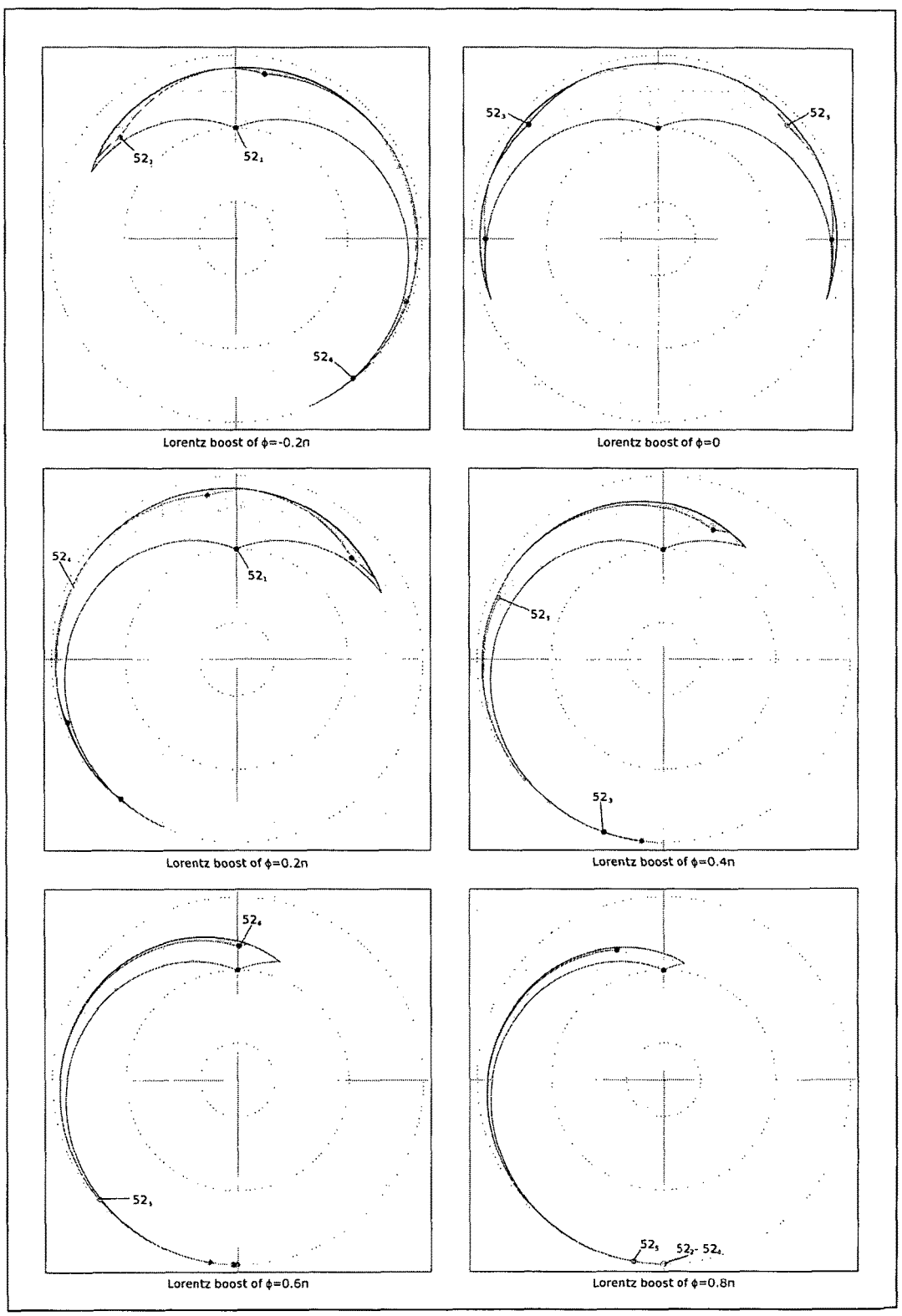

Figure 8.4c
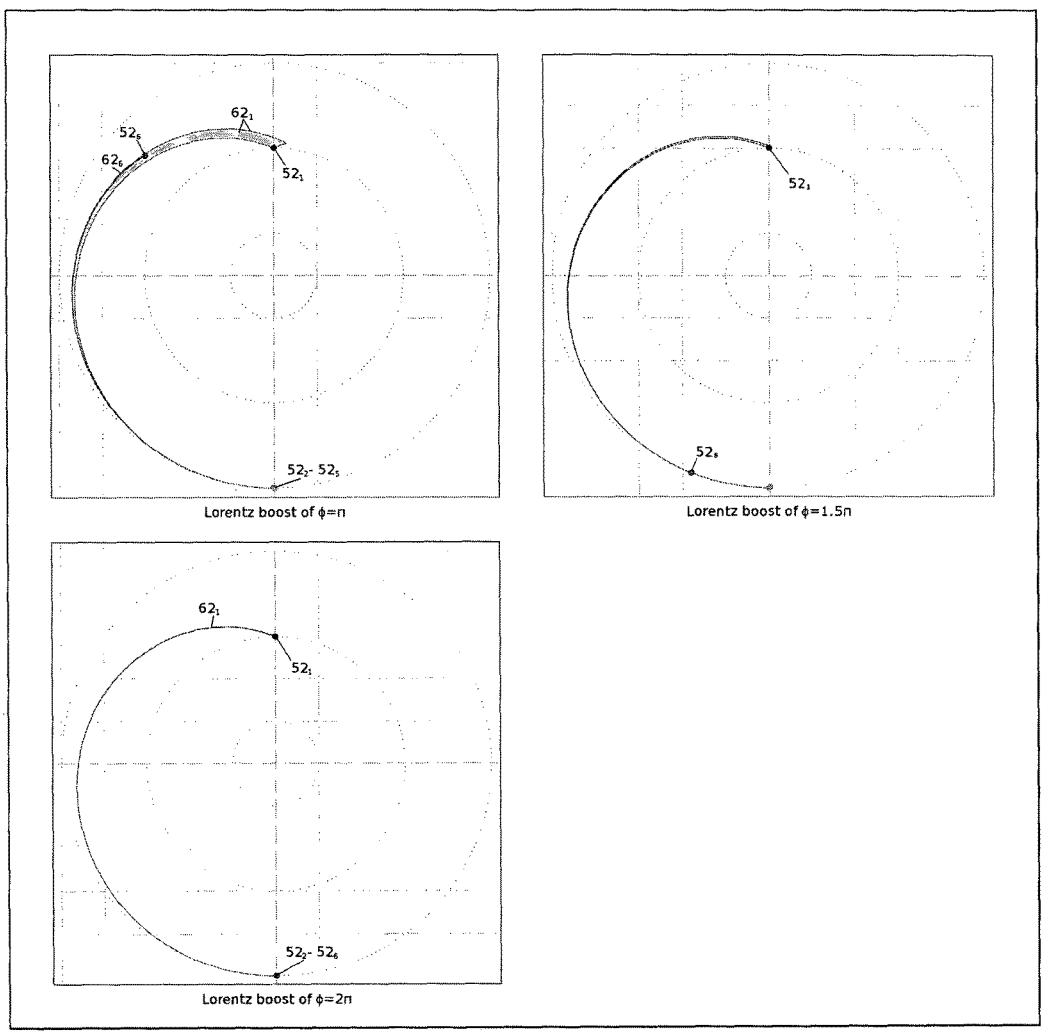

Figure 13.1
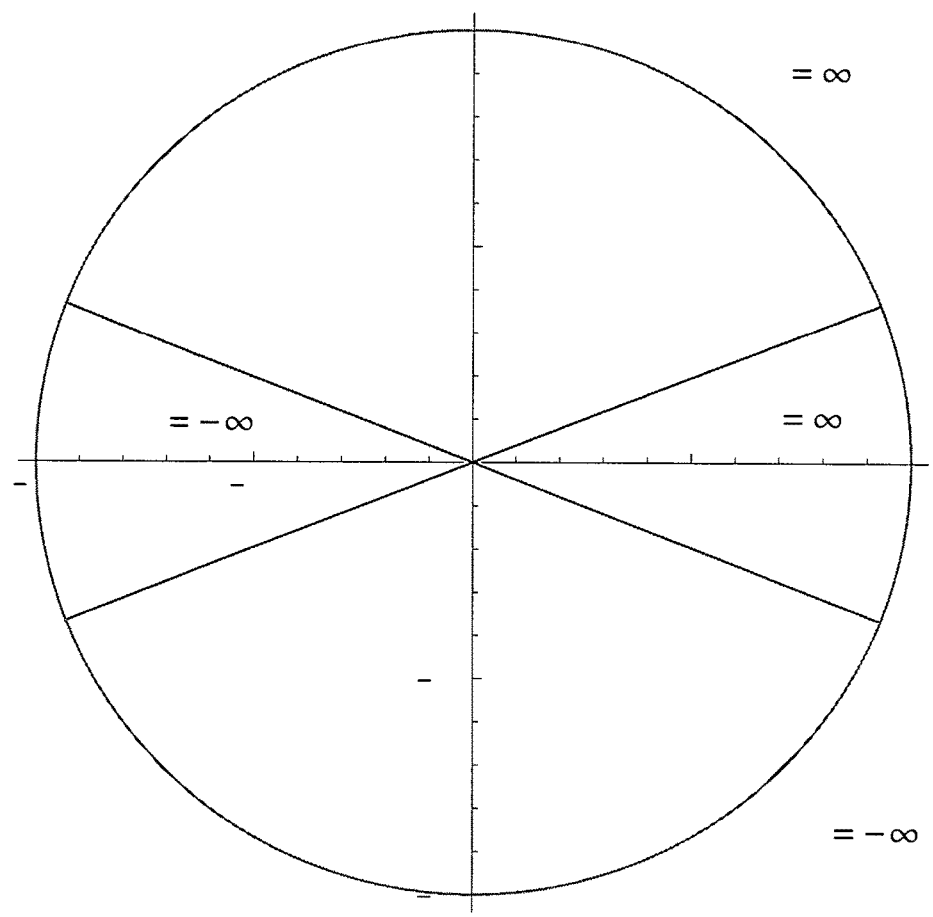

Figure 13.2a
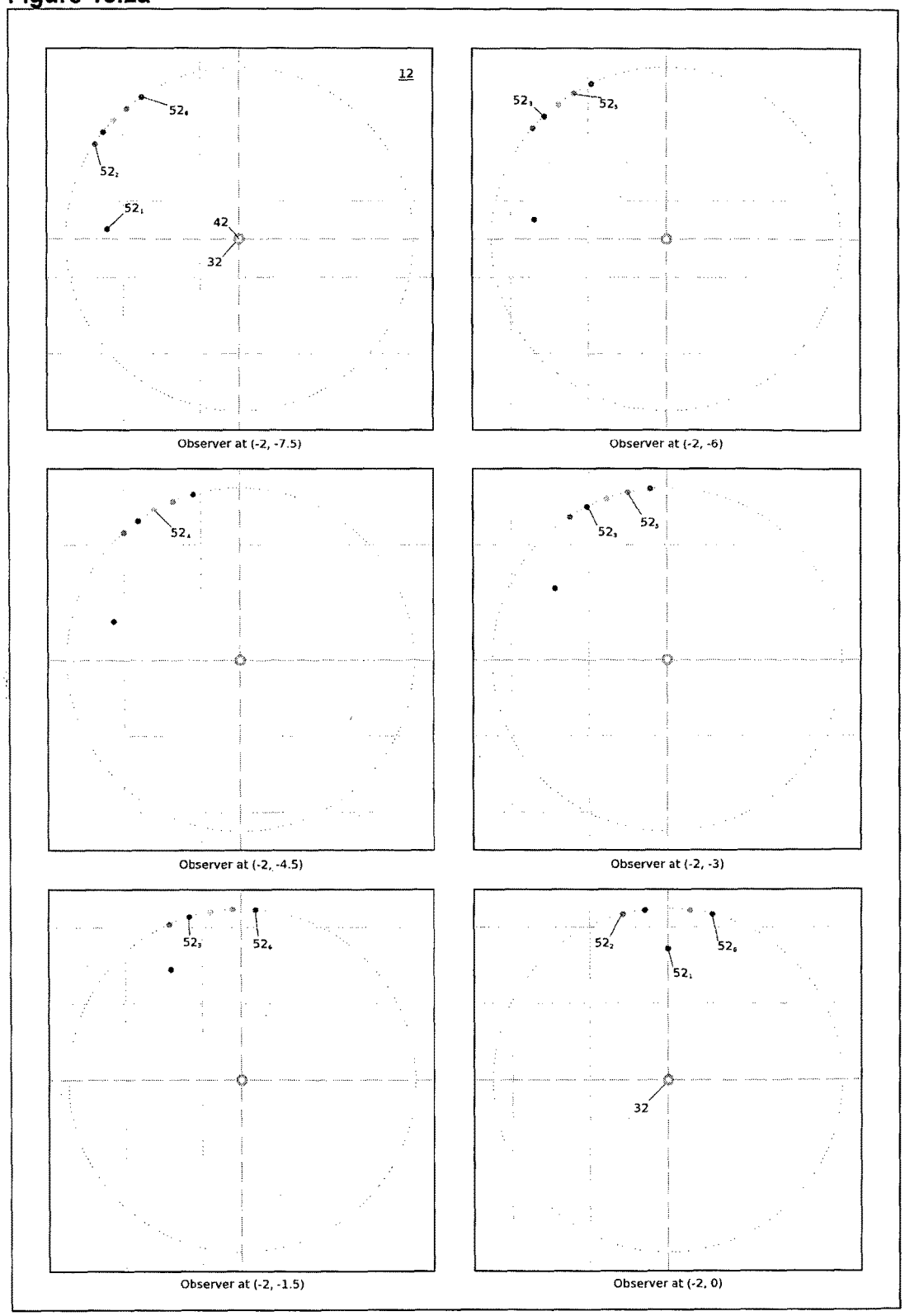

Figure 13.2b
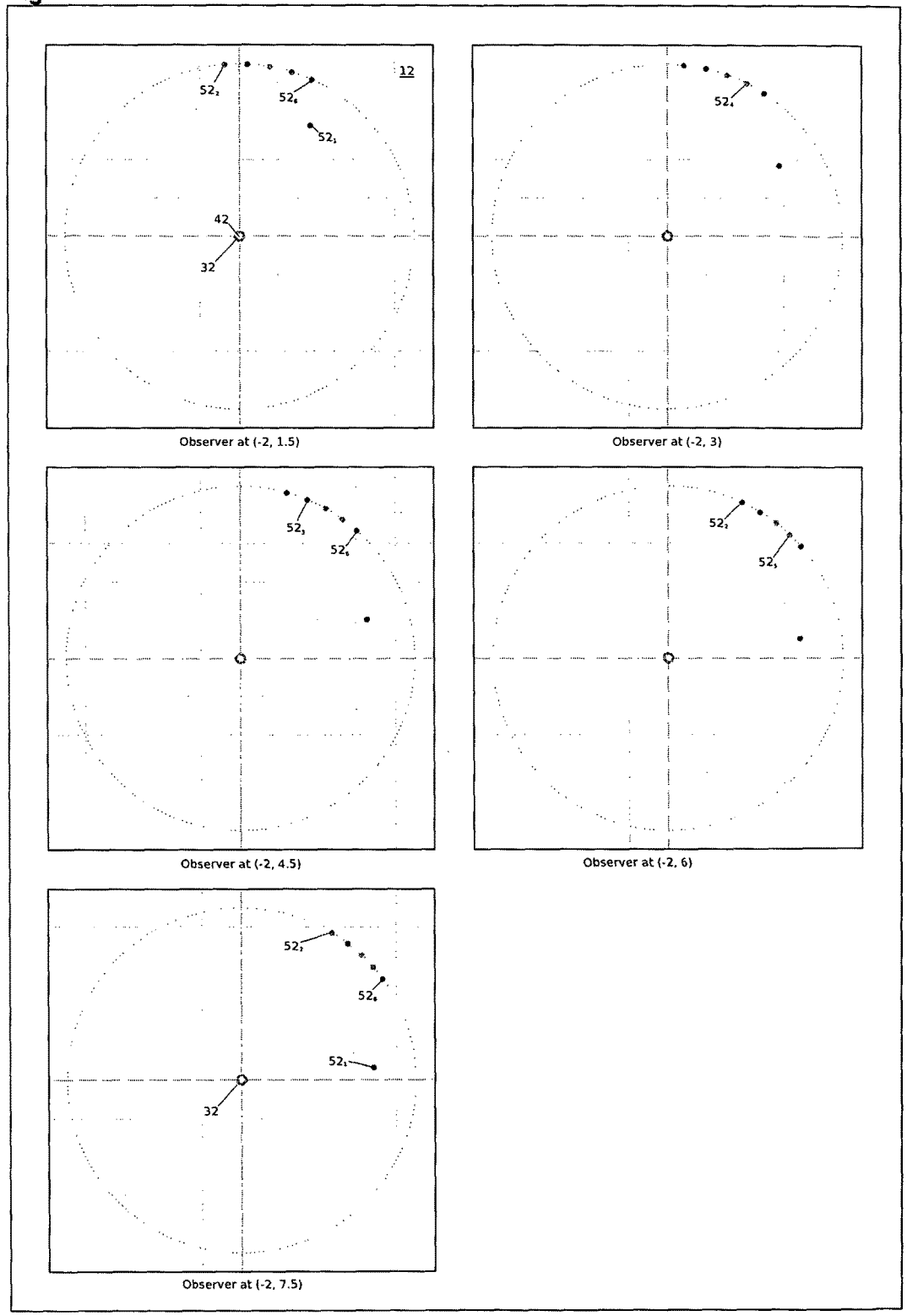

Figure 13.3a
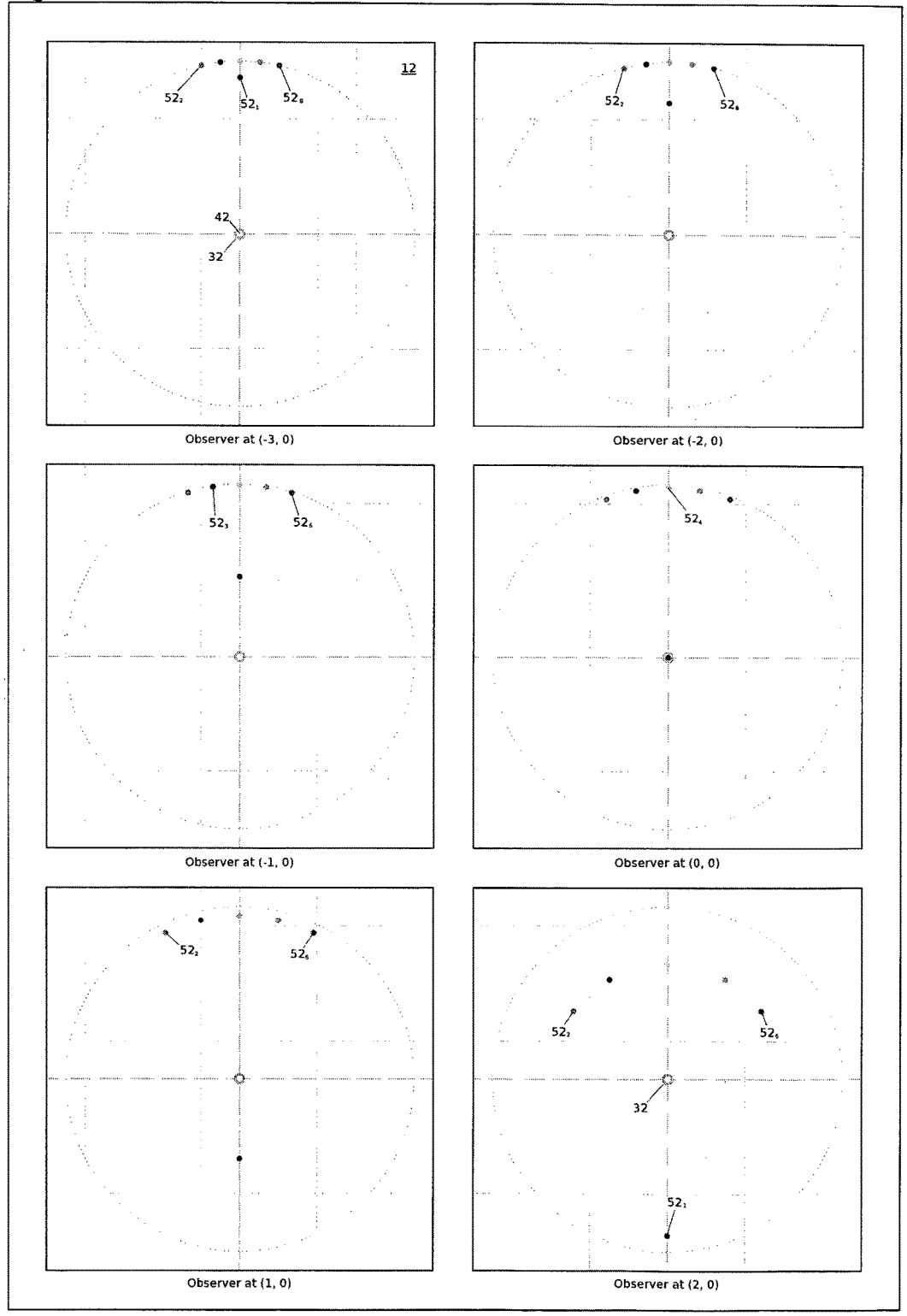

Figure 13.3b
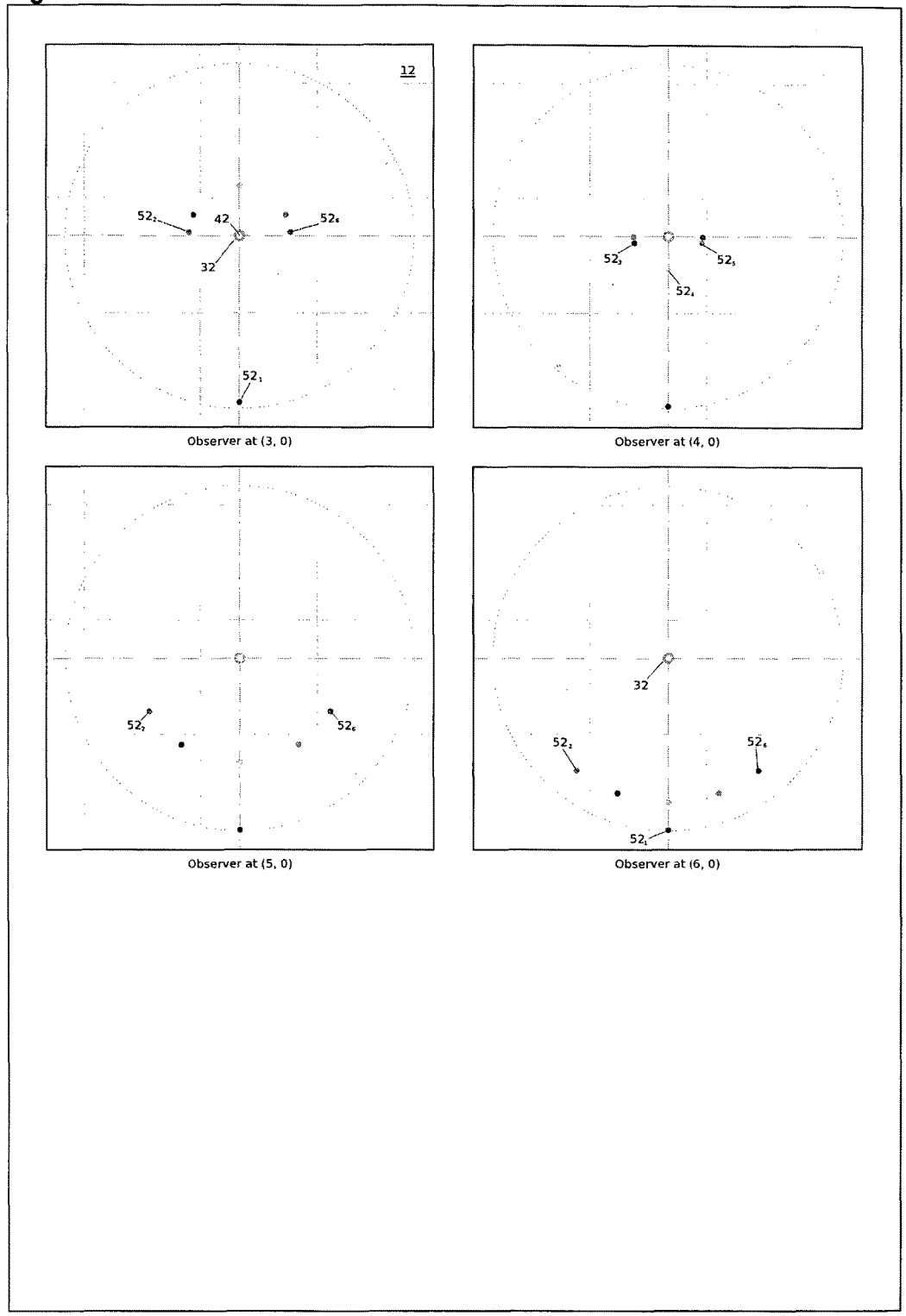

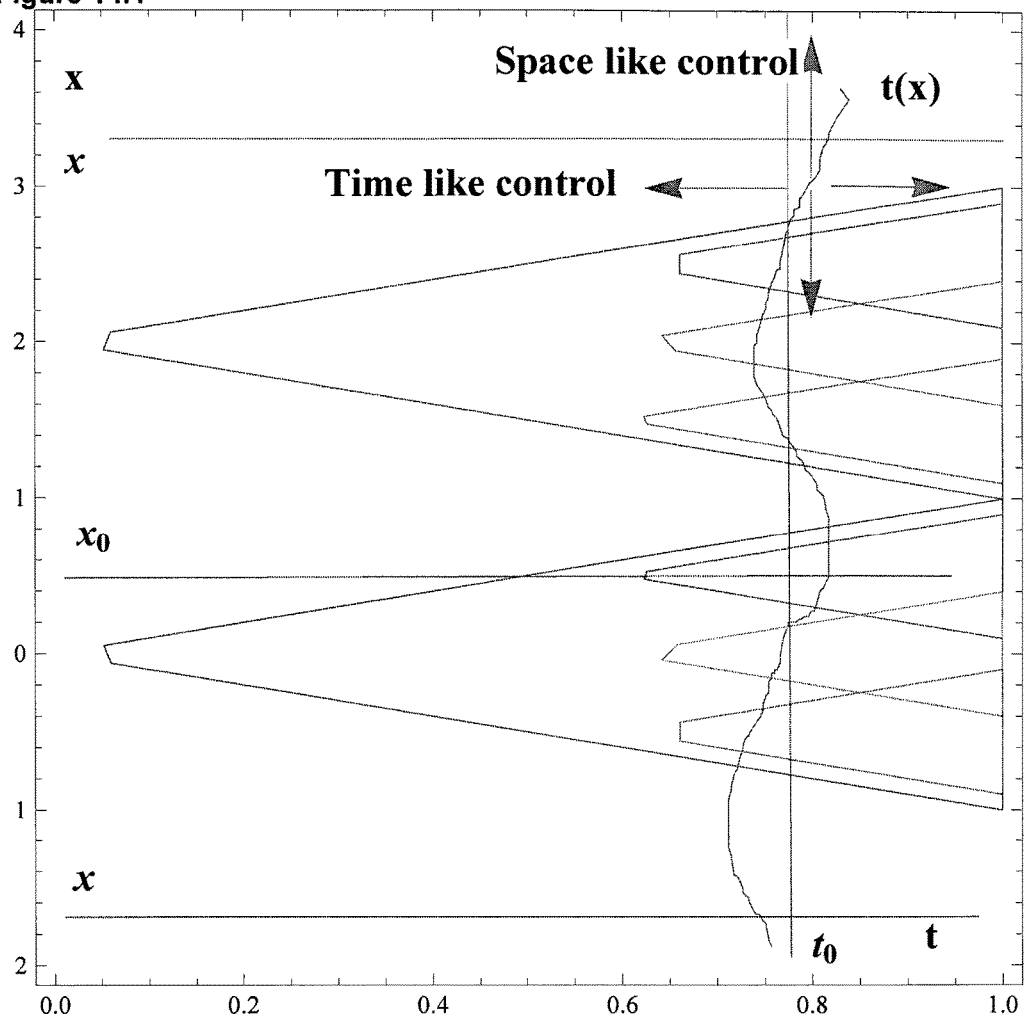
Figure 14.1

Figure 14.2
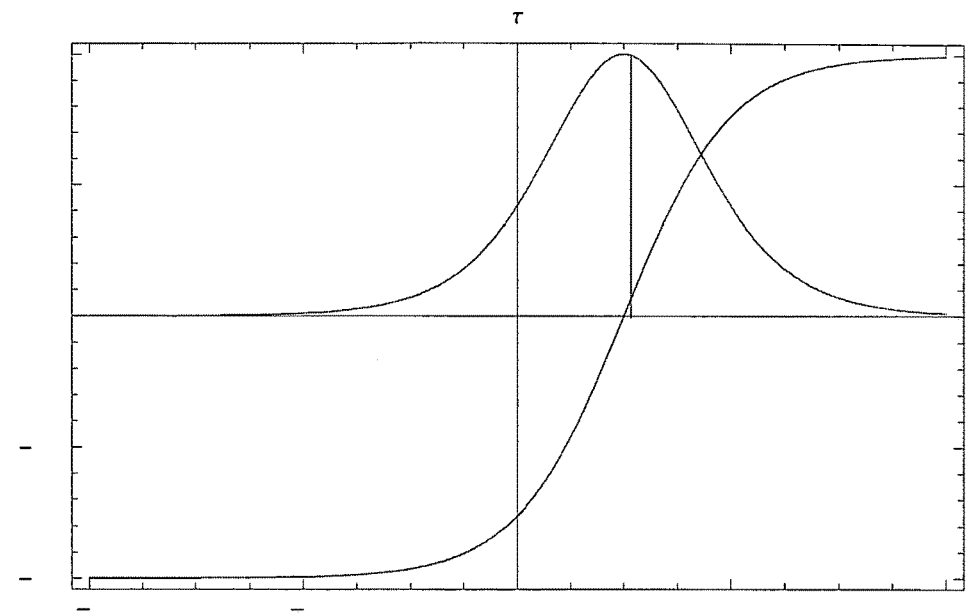
Figure 14.3
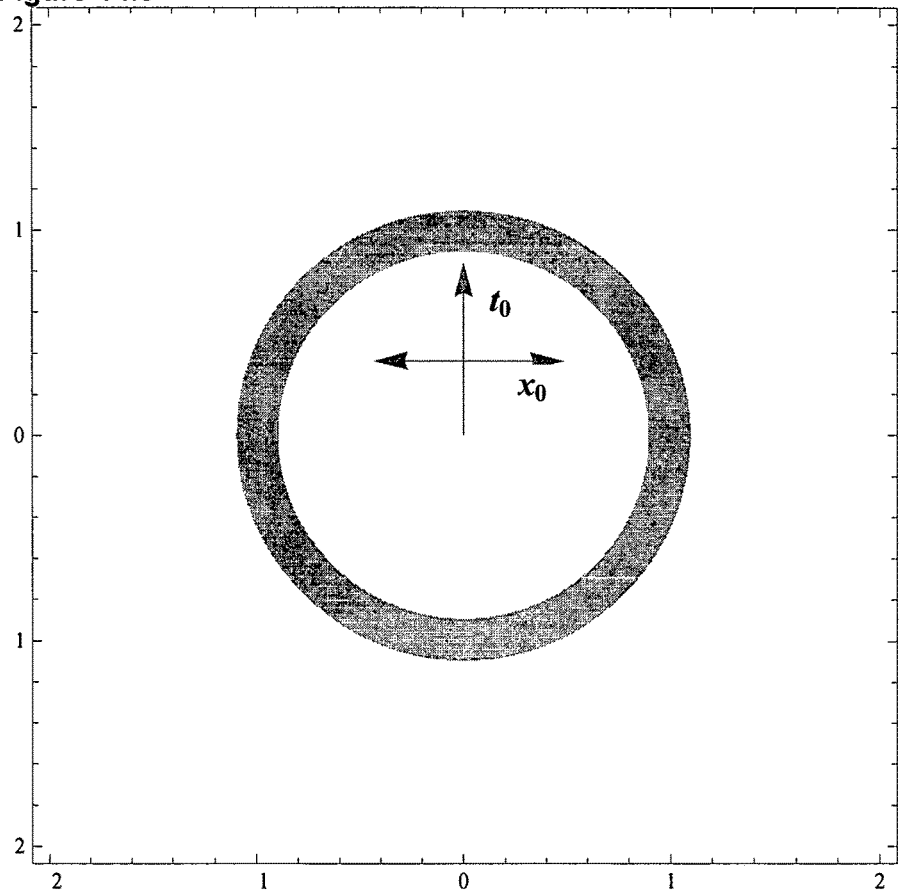

Figure 14.4
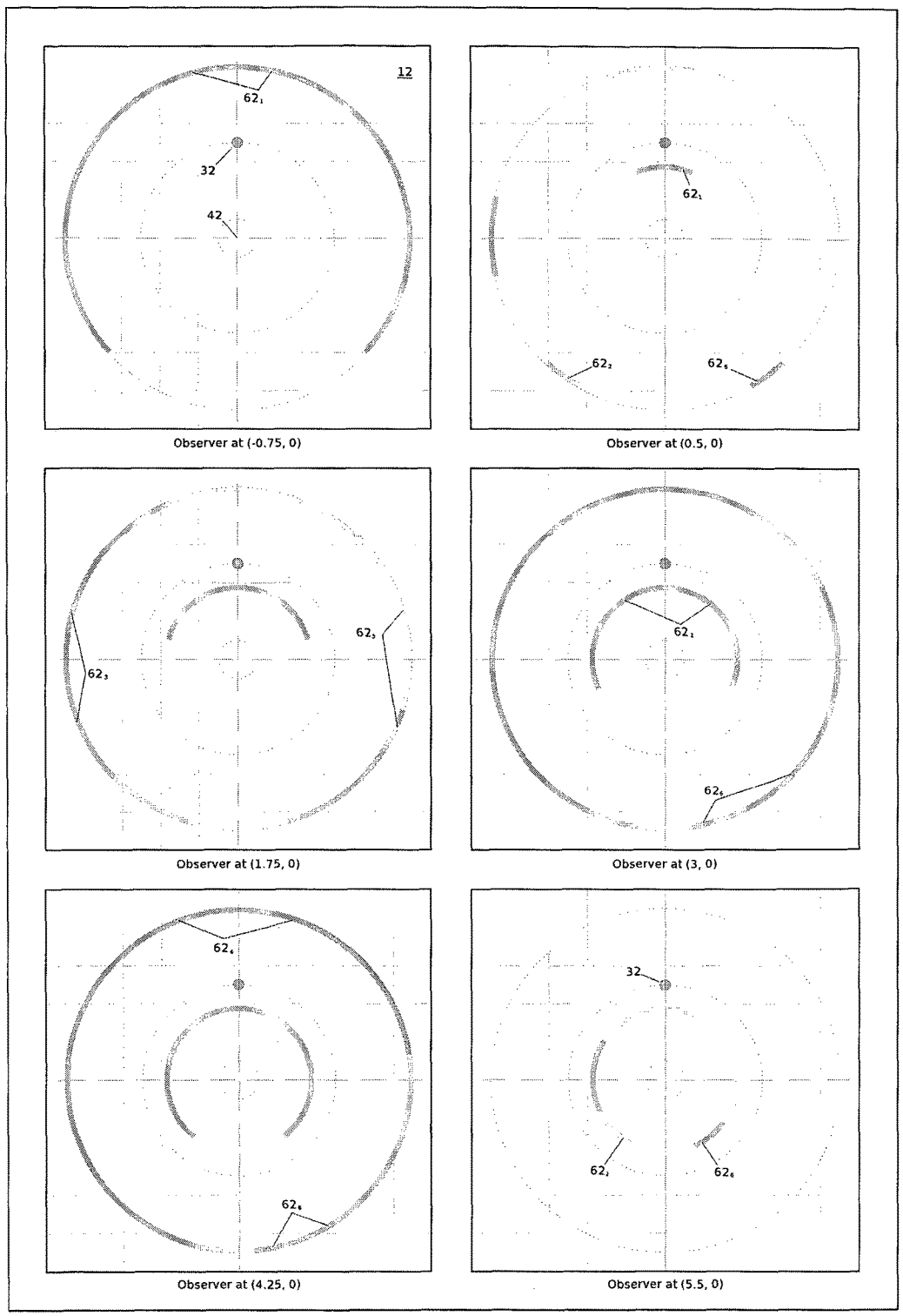

Figure 14.5
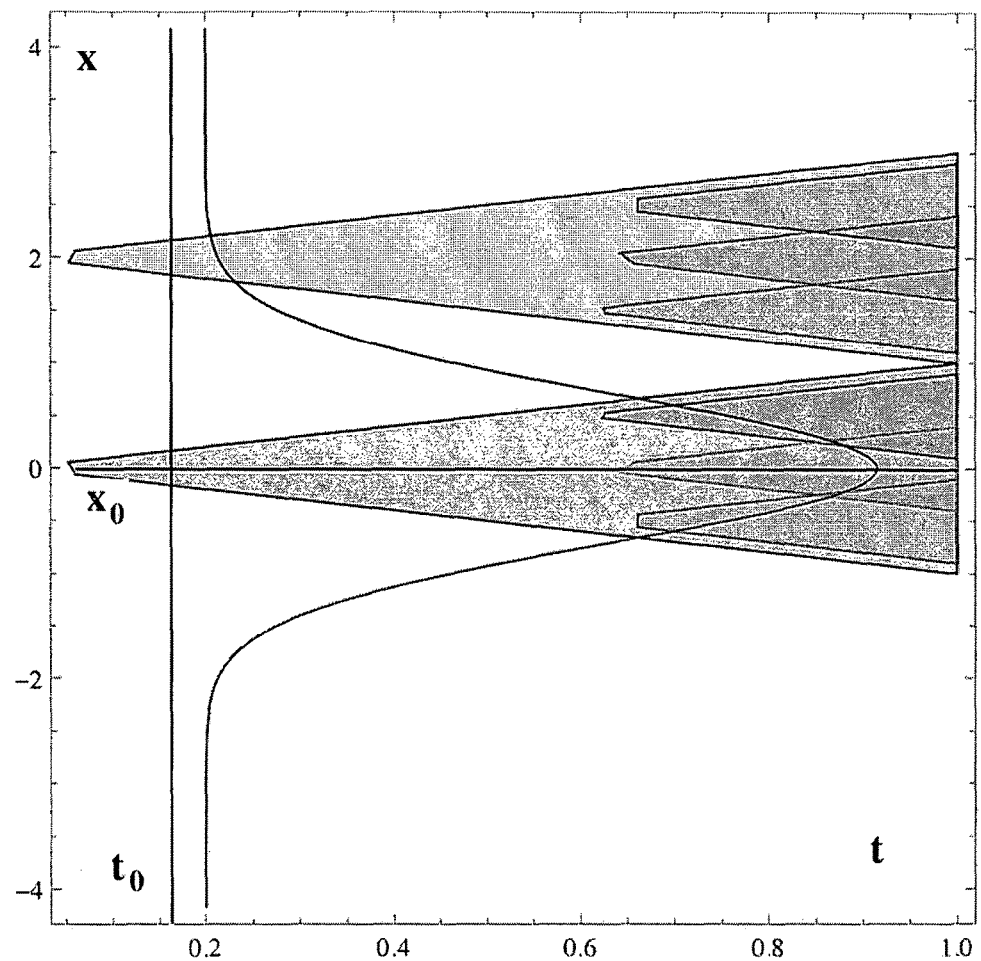

Figure 15.1
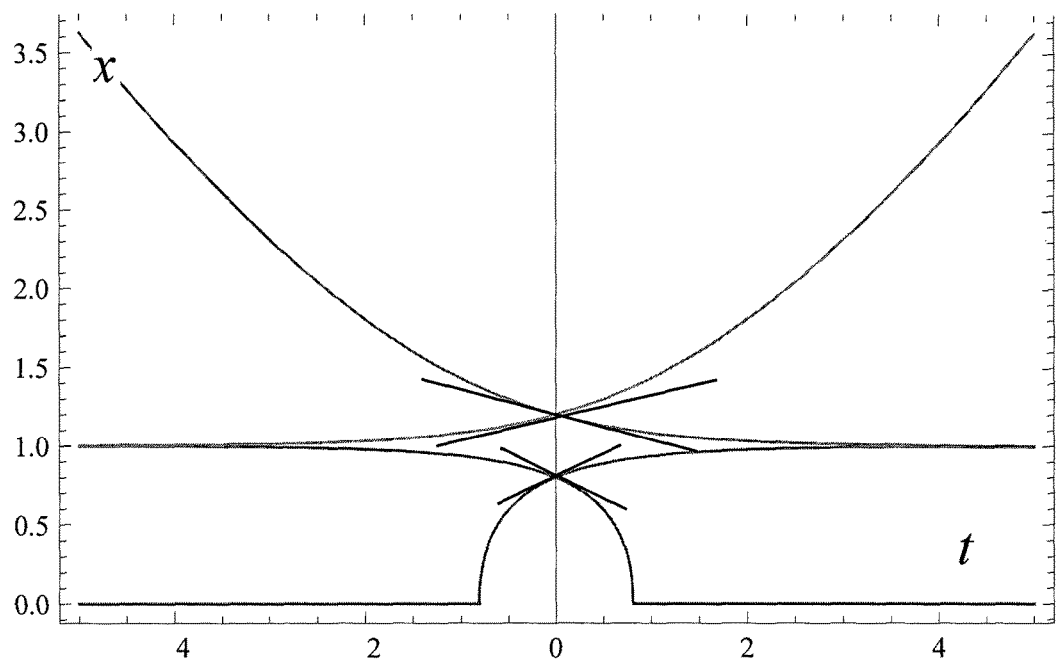
Figure 15.2
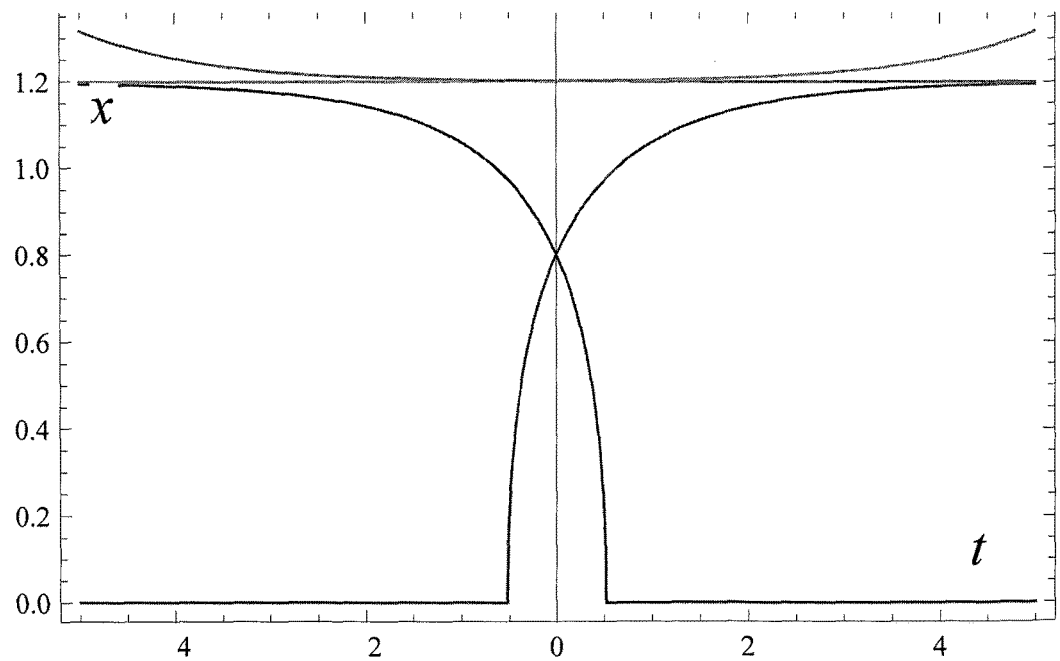

Figure 15.3
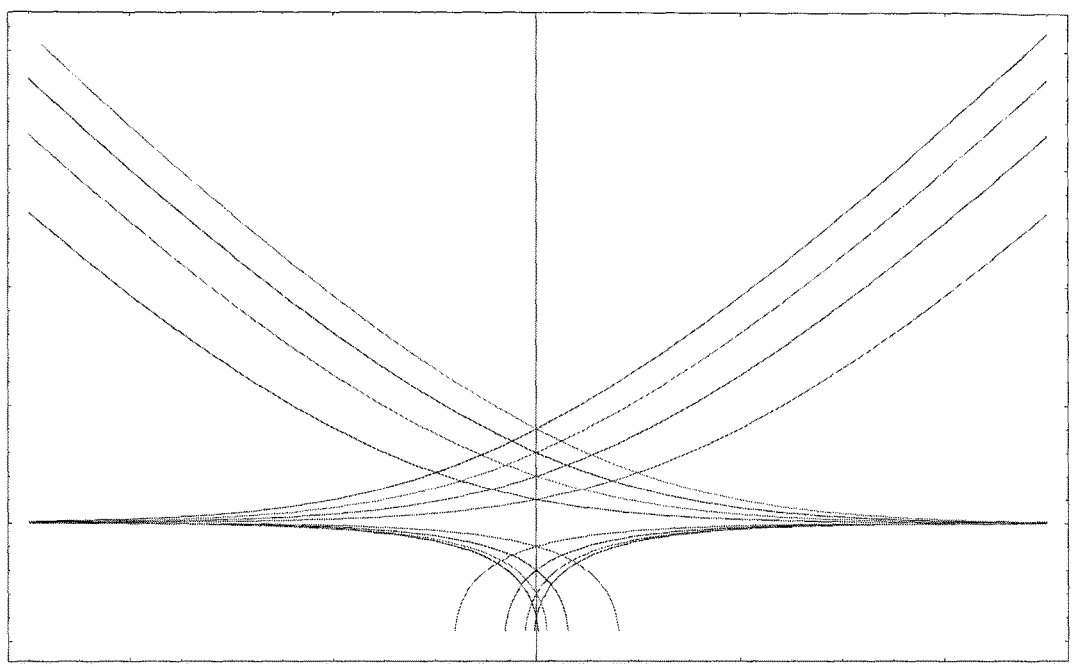

EVENT AND CAUSALITY-BASED HUMAN-COMPUTER INTERACTION

TECHNICAL FIELD OF THE INVENTION

This invention generally relates to a method for human-computer interaction on a user interface.

BACKGROUND TO THE INVENTION

Buxton (1993) posits two modes of interaction with a computer, the descriptive method (such as was implemented in DOS) and the direct manipulation system (such as the graphical user interface (GUI)). Both have inadequacies. The ideal will be a system that has features of both.

On the most basic level, human-computer interaction is governed by the pairing of actions (verbs) with objects (nouns) (Buxton 1993). This can be done in the descriptive mode by specifying an application that should be run, followed by the file on which it must be applied, e.g., a text editor that opens a text file. The same applies in the direct manipulation method; an action is selected and afterwards the objects on which it should be applied. This pairing can also be viewed as the creation of a logical relation between action and object. Many other logical relations may exist between actions, objects or both, e.g., a file with a certain extension is logically paired with a certain application. An example given by Buxton (Buxton 1993) exploits the logical distinction between AND gates followed by inverters and those not followed by inverters, to expose the shortcomings of the direct manipulation method when converting this combination into a single NAND gate. In contrast, using this distinguishing feature, the descriptive method can apply this operation to all AND gates followed by a converter.

These observations lead to a natural question: What would happen if the logical relation that pairs actions and objects, or any other logical relations, are also encoded geometrically, form an integral part of the graphical interface and provide the basis for the interaction? The framework for this integration is well known; it exploits the notion of causality as geometrically encoded in Einstein's theory of relativity. This sets the rationale for the present invention.

The notion of causality, i.e., that one event causes another and that the order cannot be changed, is central to our everyday experience. It is a natural and intuitive concept.

Central to Einstein's theory of relativity is the observation that the speed of light is the maximum speed at which a signal can travel. This leads to the notion of causally connected and disconnected events, i.e., two events can only affect each other if they are causally connected in the sense that light can transverse their spatial separation in a time shorter than the time separating the two events. If the spatial separation is too large, the two events cannot communicate within the time separating them and they are causally disconnected. In the language of relativity this is expressed by saying that an event caused by another must lie in the forward light cone of the latter, or that they have a timelike separation, while they are causally disconnected and cannot affect each other if they lie outside each other's light cones or have a spacelike separation.

A fundamental principle of relativity is that physical reality is not coordinate dependent as coordinates are merely labels that an observer introduces to label events and is completely arbitrary (within mild limits). Causality is a physical reality; when some event causes another all observers, regardless of their choice of coordinates, must agree on the order of the events. Thus the mathematical quantity that encodes the causality must not change under a change of coordinates (be an invariant). In general relativity, this is encoded by introducing a Riemann manifold with a metric g and an invariant distance squared $ds^2(x)=g_{\mu\nu}(x)dx^\mu dx^\nu$ where $x^\mu$ are local coordinates. The metric transforms in such a way that under a coordinate change $ds^2$ does not change. In special relativity the metric is taken to be Minkowski everywhere and the distance function squared is $ds^2=c^2dt^2-dx\cdot dx$, where $\cdot$ is the usual Euclidean scalar product. This is invariant under a more restricted set of coordinate transformations, the Lorentz transformations. Causality is encoded in the sign of the invariant quantity $ds^2$, i.e., $ds^2>0$ represents timelike separation and causally connected events, while $ds^2<0$ represents spacelike separation and causally disconnected events. By construction then, the notion of causality is independent of the observer's choice of coordinates or, stated differently, the precise graphical presentation of events as the causal relations between events are preserved in any presentation.

The role of causality in the control of physical processes that involves communication between human and machine, where there is an upper bound on the speed of communication (not necessarily the speed of light) has been recognised and analysed by Moray and Hancock (2009). Darlow and Goldin (2011) investigated the role of causality in HCI. It was found that interaction processes respecting causality were more efficient than those that do not, emphasizing again the natural and intuitive nature of causality. Most recently, computer games (Seeing and Experiencing Relativity—A New Tool for Teaching 2012) simulating relativity, and by implication the notions of causally connected and disconnected events, have been developed in order to create greater intuition of these notions in the relativistic setting where speeds are close to the speed of light (or the speed of light is slowed down).

In the applications described above time is physical time, as measured by a physical clock. However, it has also been realised that the notion of causality can be very useful in logical processes where logical relations can be captured through causal relations involving a logical rather than physical time. This was explored in interacting systems by Broy (2004) and distributed systems by Hrischuk and Woodside (1996). In these investigations the emphasis was on information flow in systems with many components. It found practical applications in airplane boarding and other physical processes (Bachmat et al. n.d.) and in circuit design (Matherat and Jaekel 2011).

Despite these investigations and applications, nobody has investigated to what extent these notions can be used in the design of HCI interfaces. The closest to an investigation in this direction is the work of Darlow and Goldin (2011). Yet, even here the full potential offered by such an approach is hardly touched upon. Only very limited examples that demonstrate the benefits of appealing to our natural intuition of causality are investigated. The idea to use logical causality is not explored at all.

When one considers the arguments presented by Buxton (1993) regarding the inadequacies of the direct manipulation system, as well as the descriptive system, it is clear that we have not yet reached, even to some approximation, an optimal design for HCI. Even the design principles of HCI still seem to be strongly debated (Beaudouin-Lafon n.d., Hinze-Hoare n.d.). The main drawback of the direct manipulation, and specifically the GUI system, is that the user is tied to a very rigid graphical presentation offering only limited control to enhance user computer interaction. As already remarked, from the perspective of causality the precise graphical presentation becomes irrelevant and it is therefore natural to ask whether this offers other, more flexible, graphical alternatives.

Causality becomes a natural candidate when one realizes that, at the most fundamental level of HCI, all processes involve actions, objects and logical relations. If the HCI can be implemented on this level, the graphical feedback or presentation of this interaction becomes secondary and can be designed around the needs of the user, offering much more flexibility. To appreciate this, note that, for two users using exactly the same computer, the actions, objects and their logical relations must be the same and they must both implement them in some way to achieve the same outcome. Precisely how these actions, objects and logical relations are communicated to the user is immaterial as long as it provides a faithful presentation of these. Each user may even have his preferences. This is a very strong motivation to seek a formulation of HCI based on actions, objects and logical relations in which the choice of coordinates and graphical representation becomes a secondary consideration, dictated only by choice and convenience. It is in this setting that the ideas of general relativity and causality come to fruition.

To emphasise the shortcomings of current Euclidean-based GUI in achieving this goal, one has to note (as can be verified by counter examples) that the notion of causality cannot be implemented in a coordinate independent fashion in a Euclidean space. This, in turn, gives rise to severe difficulties with the maintenance of logical relations when it is attempted to encode them in Euclidean space. Moving away from Euclidean-based geometry to facilitate this is a fundamental paradigm shift away from existing graphical interface designs.

General Description of the Invention

As described, when a user interacts with a computer, the user wants to access certain actions and objects and typically pair them. Generically there exist logical relations, such as an ordering hierarchy, between these actions themselves, between the objects themselves and between the actions and objects. Let us refer to the set of actions and objects as events and organise them in an event set $E'=\{e_1, e_2, \ldots\}$. Note that the user may create and destroy events, e.g., by deleting or creating a file. Thus the user has control over the event set.

If two events $e_i$ and $e_j$ are logically related we, denote it by $e_i \succ e_j$. The only assumption we make about this relation is that it is transitive, i.e., if $e_i \succ e_j$ and $e_j \succ e_k$ then $e_i \succ e_k$. Thus, this need not be an equivalence relation, as it may not be reflexive or symmetric. We assume that within a particular mode of human-computer interaction these logical relations is a fundamental property of the event set that cannot be changed by the user within this mode without destroying his ability to interact efficiently with the computer. Thus, within a particular interaction mode, any control of the user over events must respect these logical relations. The user or system design may, however, prefer to change the event set and/or the logical relations between events for other modes of interaction. Note that a graphical display is only a convenient tool to communicate the properties of the event set to the user, but that it actually plays a secondary role and that the precise design of this graphical display depends very much on the aims of the user. Central stage must be given to the events and their logical relations.

The setup described above is reminiscent of the situation in general relativity where events and their causal relations are the key elements and not the specific choice of coordinates, which is simply a tool that the observer uses to label and graphically display the events. In this sense the event set and the relations between events correspond in general relativity to the causally ordered events and the user interface represents the choice of coordinates, which is not fundamental, but very much a matter of choice and convenience. In general relativity it is well known how to free us from the limitations of specific choices of coordinates and how to formulate the fundamental physical relations in a coordinate independent fashion. This is in stark contrast to the current state of HCI and specifically the GUI in which the graphical representation has become the end rather than the means (Buxton 1993). The aim of the present construction is to use the same ideas as in general relativity to free the interaction between user and computer from the choice of graphical representation and to exploit this freedom for more efficient human computer interaction.

The first step in doing this, which is also in the spirit of general relativity, is to extend the event set to also include an observer, controlled by the user, and to introduce the extended event set $E=\{e_0, e_1, e_2, \ldots\}$ where $e_0$ represents the observer. The introduction of the observer is in general accompanied by the introduction of a set of logical relations between the observer and other events. As the user can control the observer, he can also control these logical relations.

To make direct contact between the set of events, described above, and general relativity, it is necessary to connect with the notion of Riemann geometry, which is the key ingredient of general relativity. The most obvious way to establish this link is to introduce a map between the elements of E and points of a Riemann manifold, referred to as the representation manifold $M_R$ with metric $g_R$. However, as we also want to give the user control over the event set, this construction must be done with more circumspection. Clearly, as long as the event set is finite, we can always think of it as a subset $Z_E$ of the non-negative integers $Z_0$ ($Z_0$ can be thought of as the set of all possible actions and objects available to the user). Mapping the observer to $\{0\}$, we always take $0 \in Z_E \subset Z_0$. Introduce a map $\xi: M_R \to Z_0$ then we take the event set $Z_E$ to be the range of this map, i.e., $\xi(M_R)=Z_E$. This is not a one-to-one map and not invertible. The extreme example is when $Z_E \{0\}$, i.e., the only event is the observer. If we define a relation ~ on $M_R$ by a ~b $\Leftrightarrow \xi(a)=\xi(b)$ with a, b$\in M_R$, it is simple to verify that this is an equivalence relation and thus $M_R$ can be partitioned in equivalence classes. Then a one-to-one map $\psi: E \to M_R$ between E and equivalence classes on $M_R$ exists. In practice, this map will be from an element of E to a representative element in the equivalence class, which obviously still leaves freedom in the construction of $\psi$. Within this setup, the central entity controlled by the user is the map $\xi$ that determines the set of events, and essentially, also the map $\psi$.

Despite a large degree of freedom in the choice of $\xi$, $\psi$ and $M_R$, there are a few limiting conditions that need to be imposed:

We need a mechanism on $M_R$ to encode the logical relations between elements in the event set. The most natural relation in general relativity that can be used for this purpose is the notion of causality, which is encoded in general relativity through an indefinite metric. If the separation of two events is positive (timelike), they are causally connected and can affect each other, else they have a negative (spacelike) separation and cannot affect each other (the sign convention here is arbitrary). The logical relation between events in the event set can now be encoded on the level of the representation manifold as follows: denote a causal relation in general relativity between two events (points on $M_R$) a and b by a→b, the arrow capturing the notion of the second event following (being caused by) the first. Note that this is a transitive relation, but not symmetric or reflexive. The logical relation $e_i \succ e_j$ between two events can then be captured as follows:

$$e_i \succ e_j \Leftrightarrow \psi(e_i) \to \psi(e_j).$$

Note that a symmetrical logical relation can be captured by $$e_i \succ e_j \Leftrightarrow \psi(e_i) \to \psi(e_j) \text{ or } \psi(e_j) \to (e_i).$$

$M_R$ will therefore be assigned an indefinite metric $g_R$. Note that the dimensionality of $M_R$ is at this stage arbitrary. In practical implementation however, it is often convenient to take it to be a two-dimensional manifold. The focus in the examples below is on this case.

Locally at a point a on the manifold the notion of causality is encoded by the distance squared, which is determined by the metric:

$$ds^2_R(a) = g_{\mu\nu}(a) dx^\mu dx^\nu,$$

where the $dx^\mu$ form a basis for the tangential space of the manifold $M_R$ at the point a, i.e., the vectors $dx^\mu$ are tangent to the manifold at this point. The repeated summation convention is used here. When a coordinate patch is introduced at the point a, the $dx^\mu$ are the infinitesimal coordinate differences between two infinitesimally separated events at the point a. If the two events are causally connected $ds^2_R(a) \geq 0$ and if they are not causally connected $ds^2_R(a) < 0$ (again the choice of sign is completely arbitrary here). If $dx^\mu$ denotes the coordinate differences between the coordinates of $\psi(e_i)$ and $\psi(e_j)$ and $dx^0$, the timelike coordinate, the logical relations are captured as $$e_i \succ e_j \Leftrightarrow ds^2_R((e_i)) \geq 0 \text{ and } dx^0 > 0,$$

i.e., the second event lies in the forward light cone ($dx^0 > 0$) of the first. In the case of a symmetric relation $$e_i \succ e_j \Leftrightarrow ds^2_R((e_i)) \geq 0,$$

i.e., the events lie in each other's light cone, regardless whether it is the forward or backward light-cone. For finitely separated events a and b in $M_R$ the geodesic distance squared, $s^2_R(a, b)$, together with an analysis of the light cone structure of an event, can be used to capture the logical relations, i.e., the event $e_j$ is placed in the forward light cone of $e_i$. For symmetrical relations, the analysis of the light cone structure is unnecessary and the logical relation can simply be expressed as $$e_i \succ e_j \Leftrightarrow s^2_R(\psi(e_i), \psi(e_j)) \geq 0.$$

For a local two-dimensional Minkowski space, the distance function squared has the form $ds^2 = c^2 dt^2 - dx^2$. If the space is globally flat and Minkowski (the metric does not change from point to point), we can express the squared distance between any two points (not necessarily infinitesimally separated) in a global coordinate patch by $$s^2 = c^2(t_1 - t_2)^2 - (x_1 - x_2)^2.$$

If $s^2 > 0$ and $t_1 - t_2 > 0$ then the event at $(x_2, t_2)$ lies in the backward light cone of the event at $(x_1, t_1)$, while it lies in the forward light cone if $s^2 > 0$ and $t_1 - t_2 < 0$. If $s^2 < 0$ the two events are causally disconnected.

Note that the choice of an indefinite metric and appropriate maps $\xi$, $\psi$ to encode the logical relations through causal relations is very natural and convenient, but it may seem to be nonessential. One can of course attempt to encode the ordering of objects on a Riemann manifold with positive definite metric (all distances squared are positive) by assigning appropriate properties to the maps $\xi$, $\psi$, e.g., one may order objects by requiring that their distance squared from a fixed point on the manifold increases with the deepening of a hierarchy. However, the choice of a fixed point offers clear disadvantages in terms of the graphical presentation. Trying to avoid the choice of a fixed point when encoding ordering is very problematic; one cannot decide, based simply on the relative squared distance between two objects, whether they are causally connected or not. The crucial feature of an indefinite metric space is that it enables the user to decide whether two objects are causally (logically) connected or not by simply computing the sign of the relative squared distance between the objects. No absolute reference point is required for this. This feature cannot be captured in a positive definite, e.g. Euclidean space, in a coordinate independent way.

Keeping in mind that the observer is also represented as an event, $e_0$, in the event set, this observation immediately leads to a further advantage of the current proposal in that a natural interest function exists for the user through the manipulation of the position of the observer. All the user needs to do is to place the observer on the manifold such that the distance function squared $S^2_R(\psi(e_0), \psi(e_i))$ is positive for events that interest him and negative for events in which he has no interest (again with arbitrary choice of sign and without any preference in terms of the forward or backward light cone). Obviously, this also involves a control function, i.e., the user must be able to control the observer's position on the manifold relative to the other events.

On a completely general level, the control mechanism involves an output mechanism (such as a two-dimensional display) and an input mechanism (such as a two-dimensional touch screen or pad) and the user controls his interaction with the computer through a human-in-the-loop feedback system between the output and the input. The user has the following control through the input mechanism over the event set and representation manifold:

The user can add to or delete from the event set elements as encoded by his control over the range of the map $\xi$.

The choice of the maps $\xi$, $\psi$ between the event set and the representation manifold $M_R$.

The choice of $M_R$ itself and specifically the metric $g_R$ and thus the squared distance function. Generally, such a change will have to be accompanied by a change in $\xi$, $\psi$ in order to preserve the logical relations between events as encoded in the causal relations on $M_R$.

The position of the observer on the representation manifold, which is used to express the user's interest in certain events.

It must be remarked that some of the control features mentioned above are not independent. One can, for example, change the position of the observer on the representation manifold directly or one can capture it in the maps $\xi$, $\psi$. For practical implementation, however, it is useful to think of these features independently for the moment. Note, however, that the first and third control mechanisms are independent from the other two.

Concrete models for the output mechanism and input mechanism, based on a two-dimensional display and input device, are constructed next. It should, however, be noted that if the input and/or output device facilitate higher dimensional representations, the construction below can be generalized by introducing higher dimensional interface (input/output) manifolds that match the dimensionality of the input and/or output devices.

Beginning with the output mechanism, one has to realise that the representation manifold need not be locally homeomorphic to $\Re^2$ as it may, for example, be of different dimensionality. Even if it is locally homeomorphic to $\Re^2$, $M_R$ does not generally admit a global coordinate patch, but only local two-dimensional coordinate patches. A direct map from $M_R$ to the physical two-dimensional display may therefore not be possible. Instead, one needs an interface between $M_R$ and the physical display. This interface is now described.

Introduce a two-dimensional Riemann manifold with an indefinite metric that admits a global coordinate patch, is locally and globally homeomorhic to $\Re^2$, but in general geometrically different. We refer to this as the output manifold, denote it by $M_O$, the metric on it by $g_O$ and the geodesic distance function squared on it by $S^2_O$ (a,b). In contrast to the representation manifold, we take the output manifold to be two-dimensional. In addition, a map X: $M_R \rightarrow M_O$, which may in general not be one-to-one, is introduced such that $S^2_O$ (X(a),X(b))≥0 $\Leftrightarrow$ $S^2_R$(a,b)≥0 for all a,b$\in M_R$. This ensures that the logical relations of the event set is preserved by its embedding in $M_O$. The physical graphic user interface is then created by a specific choice of global coordinates on $M_O$ and the logical relations of events in the event set are encoded by an explicit coordinate representation of the metric on the output manifold. The design and control of the graphical user interface therefore has three components:

The choice of the output manifold $M_O$ and its metric $g_O$.
The choice of the map X.
The choice of coordinates on $M_O$.

Note that even if $M_R$ is also two-dimensional, $M_O$ and $M_R$ need not be the same and can typically be multi-coverings of each other. In applications here the following choices are made: the representation manifold is taken to be locally and globally homeomorphic to $\Re^2$, $M_O = M_R$, X the identity map and the graphical user interface is then determined by a specific choice of global coordinates on the output manifold. Normally the choice of global coordinates is made such that the global coordinate patch on $M_O$ corresponds to a bounded region of $\Re^2$, which represents the physical display.

Finally, a model for the input or control mechanism is proposed. For this purpose, a two-dimensional Riemann manifold is introduced. We refer to this as the input manifold, denote it by $M_I$, the metric on it by $g_I$ and the geodesic distance function squared on it by $S^2_I$ (a,b). In this case the metric need not be indefinite. The above components are controlled by a point P on $M_I$, which in turn is controlled by a physical input device. To facilitate the control of this point, coordinates must be introduced on $M_I$ (this most naturally would be an Euclidean manifold with Cartesian coordinates). The coordinates, $x_P$, of the point P track the input point from the physical input device. To be specific, for control of the representation manifold, as set out above, the following dependencies can be introduced:

$\xi(P), \psi(P)$
$g_R(a,P)$ for all a$\in M_R$
$e_O$ (P) and the position of the observer on the representation manifold is controlled by the combined dependence $\psi(P)$ ($e_0(P)$).

As explained above, further control functions are possible on the input manifold. For these, the following dependencies can be introduced:

X(P)
$g_O(a,P)$ for all a$\in M_O$

Let $x^\mu$ denote the coordinates of some global coordinate patch on $M_O$, then $x^\mu$ (P), i.e., coordinate changes that depend on the position of the input point can be made.

All these functionalities also have to be represented as events on the representation manifold. Control then proceeds by selecting one of these functionalities by controlling the observer; after this selection the input from the input manifold is used to control the selected functionality. Control is surrendered back to the observer when the functionality is deselected.

It should be noted that the input and output mechanisms described above need not be visual or through a touch control, but can take many other physical forms. An example of this would be an audio input and output. For a single frequency input our output, one has two parameters that control the input and output, namely, the frequency used and the amplitude. This would then also correspond to a two-dimensional manifold with the coordinates replaced by frequency and amplitude; and the same control as described above can then be introduced. For multi-frequency signals the Fourier transform of the signal, i.e., frequencies and amplitudes; can be used, but in this case one must use higher dimensional manifolds than the two-dimensional to characterise a certain input our output signal. The control mechanism described above does not change however; one simply has to replace the control coordinates $x_P$ by higher dimensional generalisation.

Figure 2:
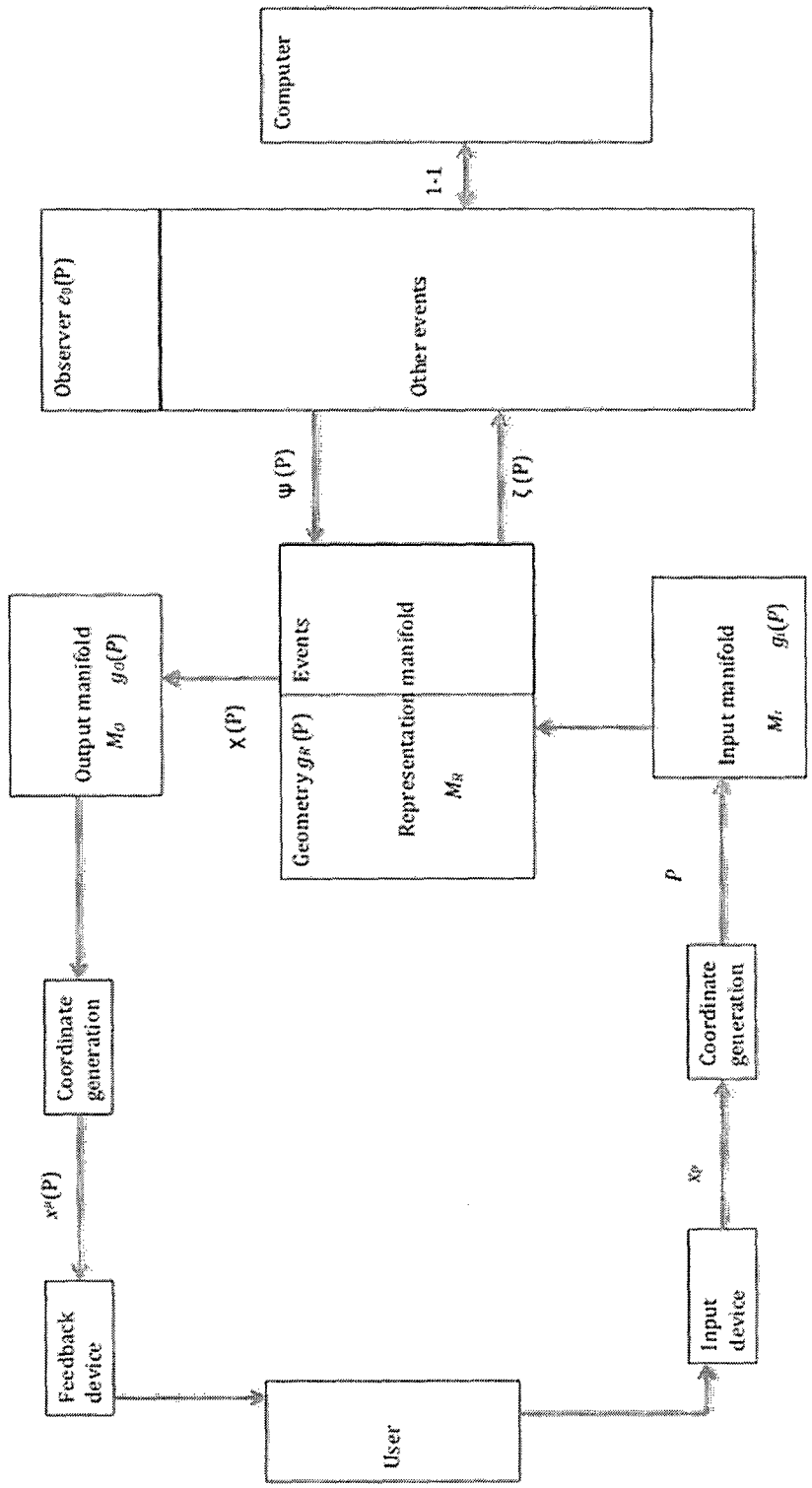

FIG. 1 summarises the complete event and causality based interface between user and computer. The input and output coordinate generators, which involve a specific choice of coordinates that may be controlled by the user, interface between the user and the coordinate independent interface. The interface with the computer is through the event set, which is an abstract, but one-to-one representation of all actions and objects available on the computer. FIG. 2 unpacks the components of the coordinate independent interface, as discussed above, in detail. Again, the important feature of the construction is the coordinate independence, i.e., the choice of coordinates are irrelevant and only the events and their logical relations, as encoded through causal relations, matter. Similarly, the input and output coordinates determined by the input and output coordinate generators are irrelevant and chosen only for maximal convenience and efficiency. In principle all computations in the coordinate independent interface can be carried out using only the logical relations between events and the logical relations communicated by the user through the input, while the result of the computation is communicated as logical relations through the output. However, in practice a judicious choice of coordinates can be made by the designer on the coordinate independent interface, which can greatly enhance computational efficiency. These coordinates are, however, normally inconvenient for the user and graphical display. In this setup the coordinate generator's function is to implement a coordinate transformation between the user's choice of coordinates and the intrinsic designer chosen set of coordinates.

The main innovations of this patent and the advantageous they offer are:

A new approach to human-computer interaction based on logical relations between actions, objects and combinations thereof (collectively referred to as events) is proposed. These relations have to be communicated efficiently to the user, must form the basis of the user's interaction with the computer and must be maintained throughout the interaction to ensure efficiency. The user interface must be designed around these relations.

The technological framework used for the implementation of this proposal is Einstein's theory of relativity, and specifically the notion of causality as encoded geometrically through an indefinite distance function.

The notion of causality is used to encode the logical relations between events and thus also takes on a geometrical meaning as expressed in terms of an indefinite distance function.

As the distance function is coordinate independent, the logical relations are encoded in a coordinate independent way, which frees the user from a particular geometrical representation. This freedom can be exploited for more efficient human-computer interaction.

Causal relations between a user controlled observer and other events are used to encode the user's interest function. The user is guided by displaying the observer and/or event light cones. As the interest function is encoded in the sign of the distance function, and not the precise value, much less accuracy is required from the user. This can facilitate greater accuracy and speed.

The user interface is determined by the choice of coordinates. Since the basis for the human-computer interaction is coordinate independent, this choice can be made solely for efficiency and convenience. The user can also control the choice of coordinates to optimize efficiency.

Causality can also be used to encode the logical structure of any data structure and may offer efficient control of such large data structures.

According to the invention, a method is provided for human-computer interaction (HCI), which includes:

Establishing an event set;

establishing and referencing one or more events in the event set;

establishing and referencing an event to represent the observer in the event set;

establishing a representation manifold as an indefinite metric Riemann manifold;

representing the events on the representation manifold in such a way that the logical relations between events are coordinate independent and geometrically encoded as causal relations;

establishing an input manifold to represent user input;

establishing an output manifold that maps between the representation manifold and a physical output device;

based on user input, select any one or more steps from:
    manipulating the observer event,
    adjusting manifold metrics,
    changing mappings,
    adjusting mapping parameters, and
    applying mappings; and repeat any of the above steps when the user input changes.

It will be understood that the events mapped on the representation manifold, include the observer event.

The input manifold may be a positive definite metric manifold, such as an Euclidian manifold.

The representation manifold may be Kähler.

The representation manifold may be Minkowski.

It will be understood that the output manifold may admit a global coordinate patch.

The method may include the step of manipulating the event set.

User input may be multi-dimensional.

User input may be multi-sourced, such as a mouse, touchpad, audio, video, etc.

User output may be multi-dimensional.

User output may be multi-sourced, such as a graphic display, haptic, audio, etc.

The logical relations between events may be functional, structural or temporal.

The user may manipulate the logical relations between events.

The method may include the step of visually representing the logical relations between events, for example showing the light cones of events.

It will be appreciated that the above includes the user's expression of intent and/or interest.

DETAILED DESCRIPTION OF THE INVENTION

The invention is now described by way of example with reference to the accompanying drawings.

In the drawings:

FIG. 1 summarises the complete event and causality based interface between user and computer.

FIG. 2 summarises the complete event and causality based interface between user and computer, including detail of the coordinate independent interface.

Figure 3:
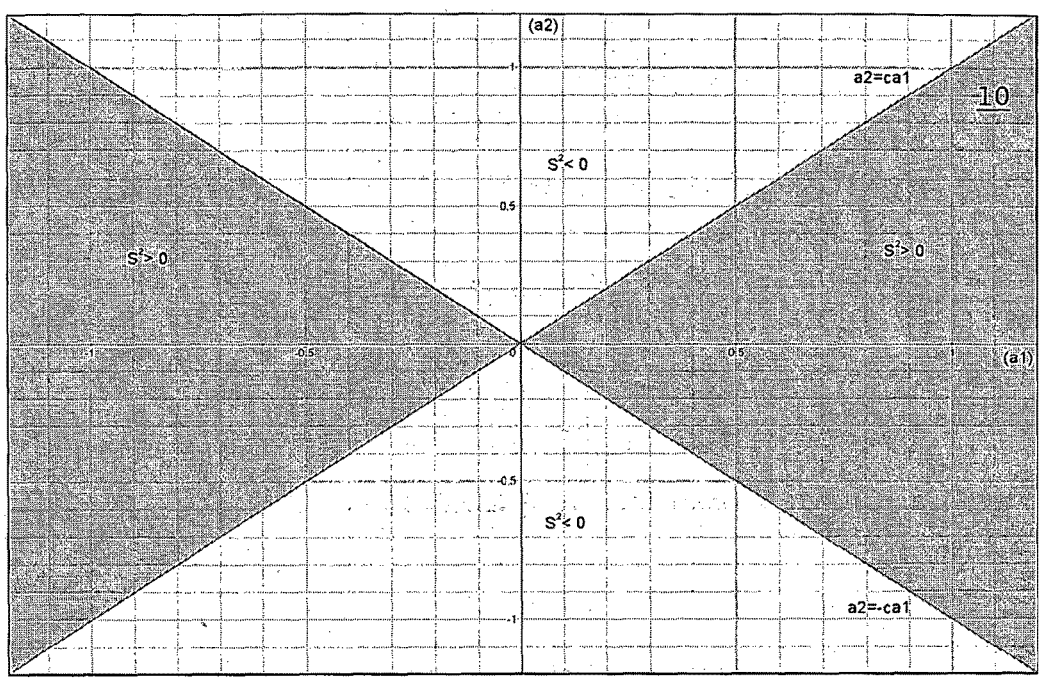

FIG. 3 shows the Minkowski distance squared $S^2_R(a,b)$ between two points $a=(a_1,a_2)$ and $b=(b_1,b_2)$ for $b=(0,0)$. The filled area indicates where $S^2_R(a,b)>0$, while the non-filled area indicates where $S^2_R(a,b)<0$;

FIG. 4.1 shows a single event, along with its forward and backward "light" cones, in a two-dimensional Minkowski representation manifold 10.

FIG. 4.2 shows seven causally related events in a two-dimensional Minkowski representation manifold 10.

Figure 5:
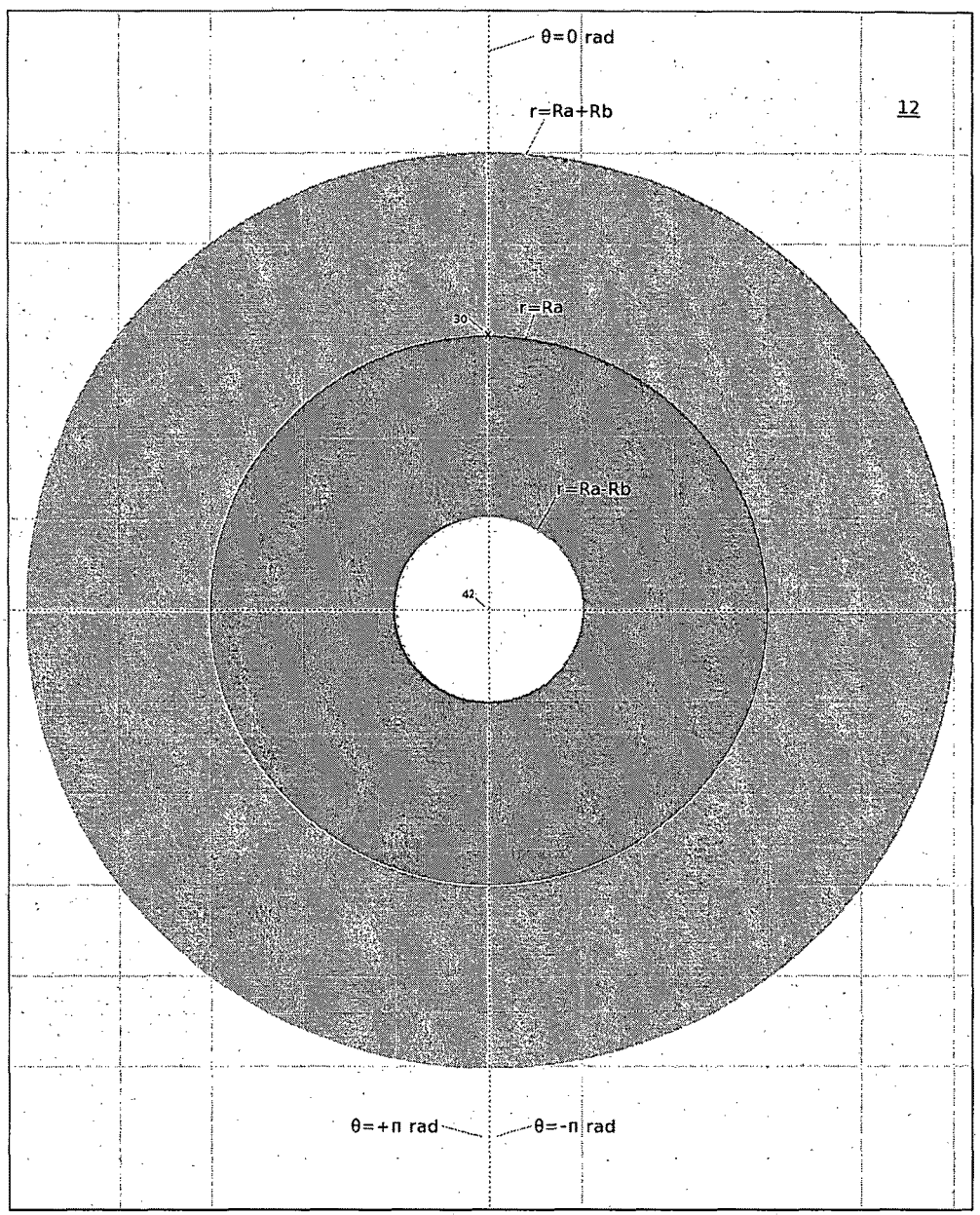

FIG. 5 shows a coordinate patch 12 after the global coordinate map $\Omega_A$ has been applied.

FIG. 6.1 shows the body $60_1$ of an event $e_1$, with location $50_1$ at $(0,0)$ and $c=0.5$, depicted by its forward and backward light cones.

FIG. 6.2 shows the event's location $52_1$ and body $62_1$ in the coordinate patch 12 after the global coordinate map $\Omega_A$, with $\lambda=0.25$ and observer event $e_0$ located at $(0,0)$, has been applied.

FIGS. 7.1 to 7.4 demonstrate the effect of a change in the observer's event location 30. The effect is shown in the representation manifold 10 and the coordinate patch 12 after the global coordinate map $\Omega_A$ has been applied.

FIG. 8.1 shows the locations and representations of causally related events $e_i$ in the representation manifold 10 and the locations and representations of the events $e_i$ in the coordinate patch 12 after the global coordinate map $\Omega_A$, with $\lambda=0.25$ and the observer event $e_0$ located at $(0,0)$, has been applied.

In FIGS. 8.2a-c the observer event's first (timelike) coordinate value is fixed at zero, while the second (spacelike) coordinate value is swept from −7 to 7 in steps of one unit.

In FIGS. 8.3a-b the observer event's second (spacelike) coordinate value is fixed at zero, while the first (timelike) coordinate value is swept from −5 to 6 in steps of one unit.

In FIGS. 8.4a-b the observer's event is fixed at $(0,0)$, while the Lorentz boost parameter $\phi$ is swept from $-2\pi$ to $2\pi$. The specific boost values are the set $\phi=\{-2\pi, -1.5\pi, -\pi, -0.8\pi, -0.6\pi, -0.4\pi, -0.2\pi, 0, 0.2\pi, 0.4\pi, 0.6\pi, 0.8\pi, \pi, 1.5\pi, 2\pi\}$.

Figure 9A:
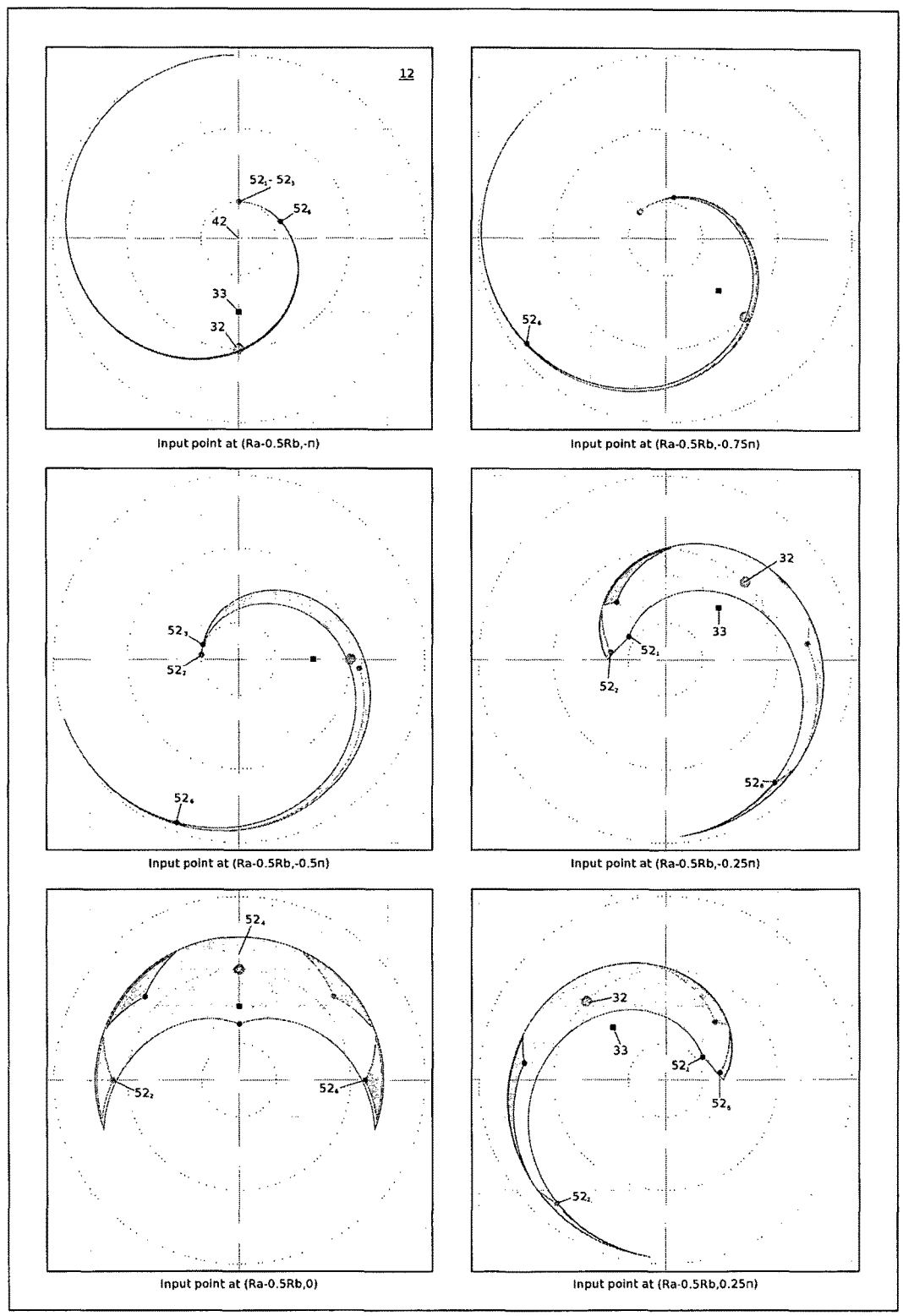
Figure 9B:
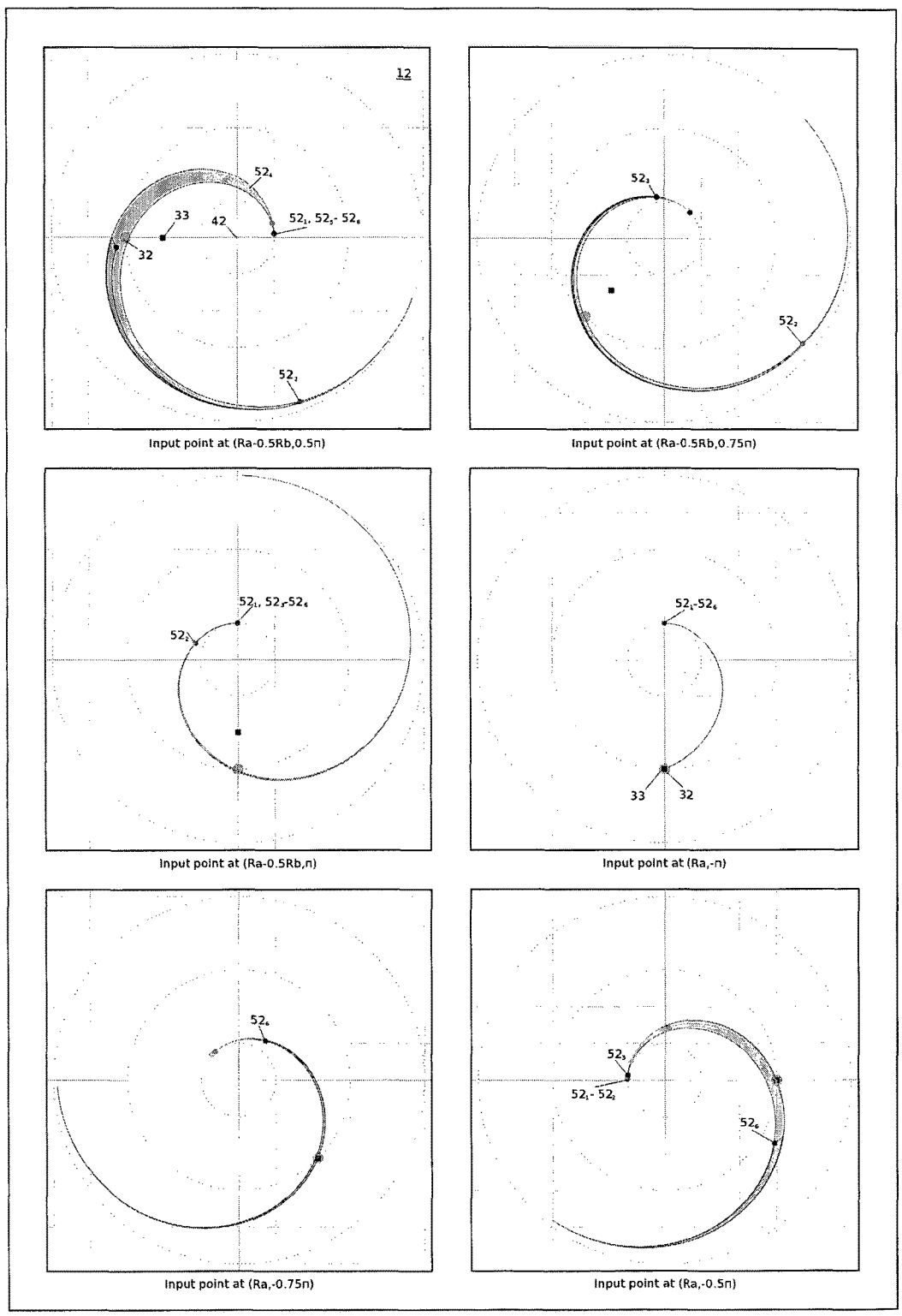
Figure 9C:
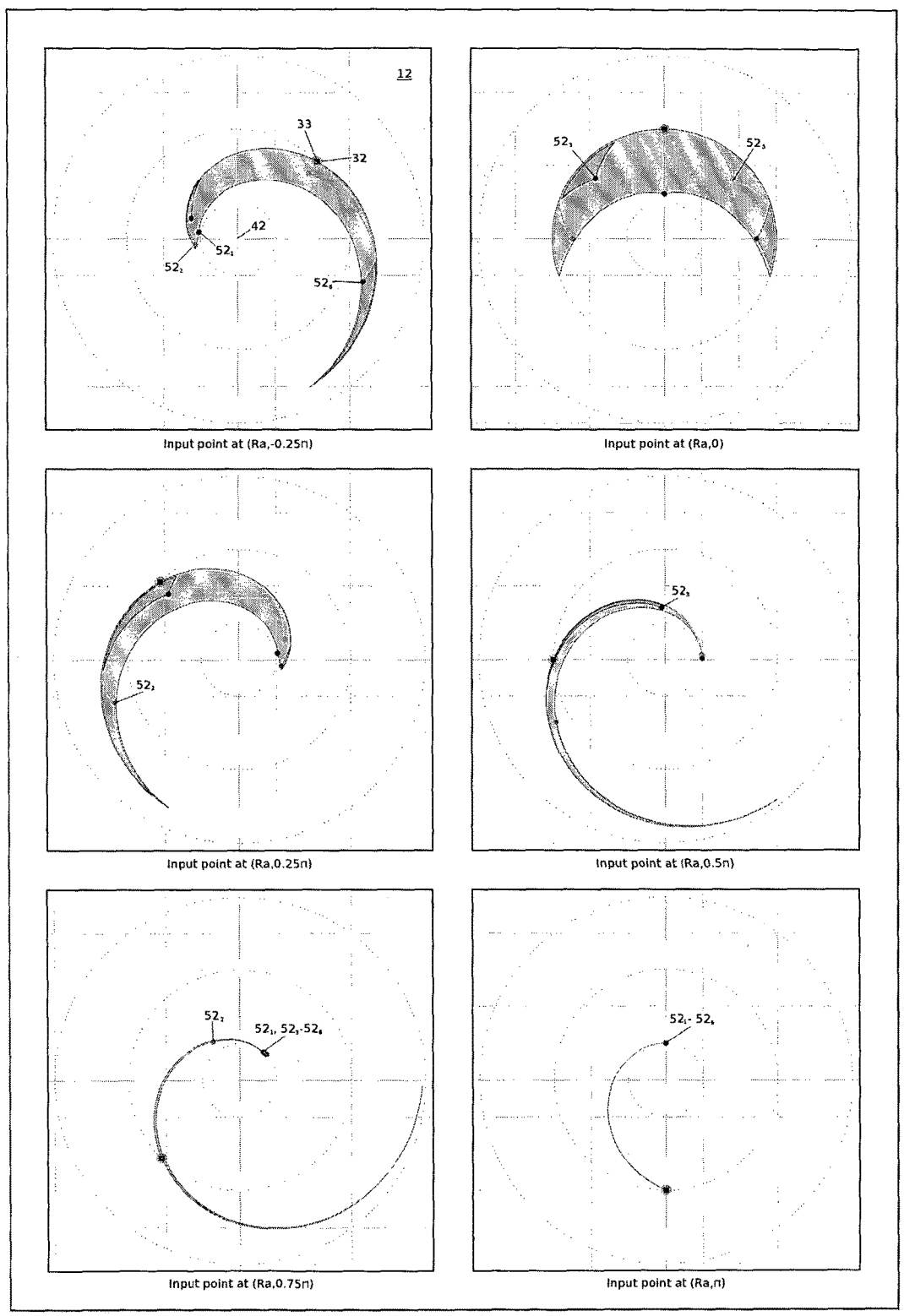

FIGS. 9a-c presents a sequence of diagrams that demonstrates the first control strategy.

Figure 10A:
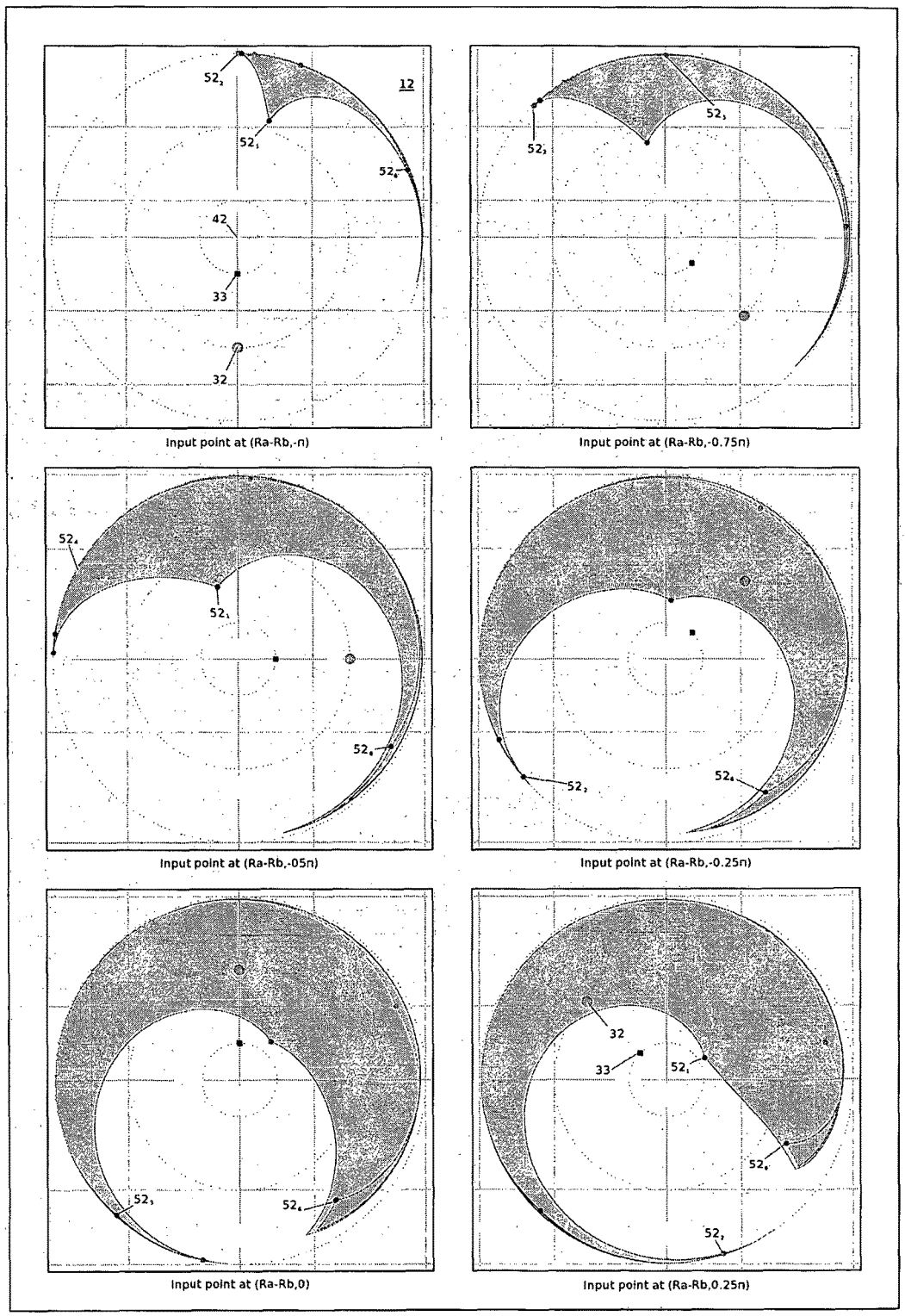
Figure 10B:
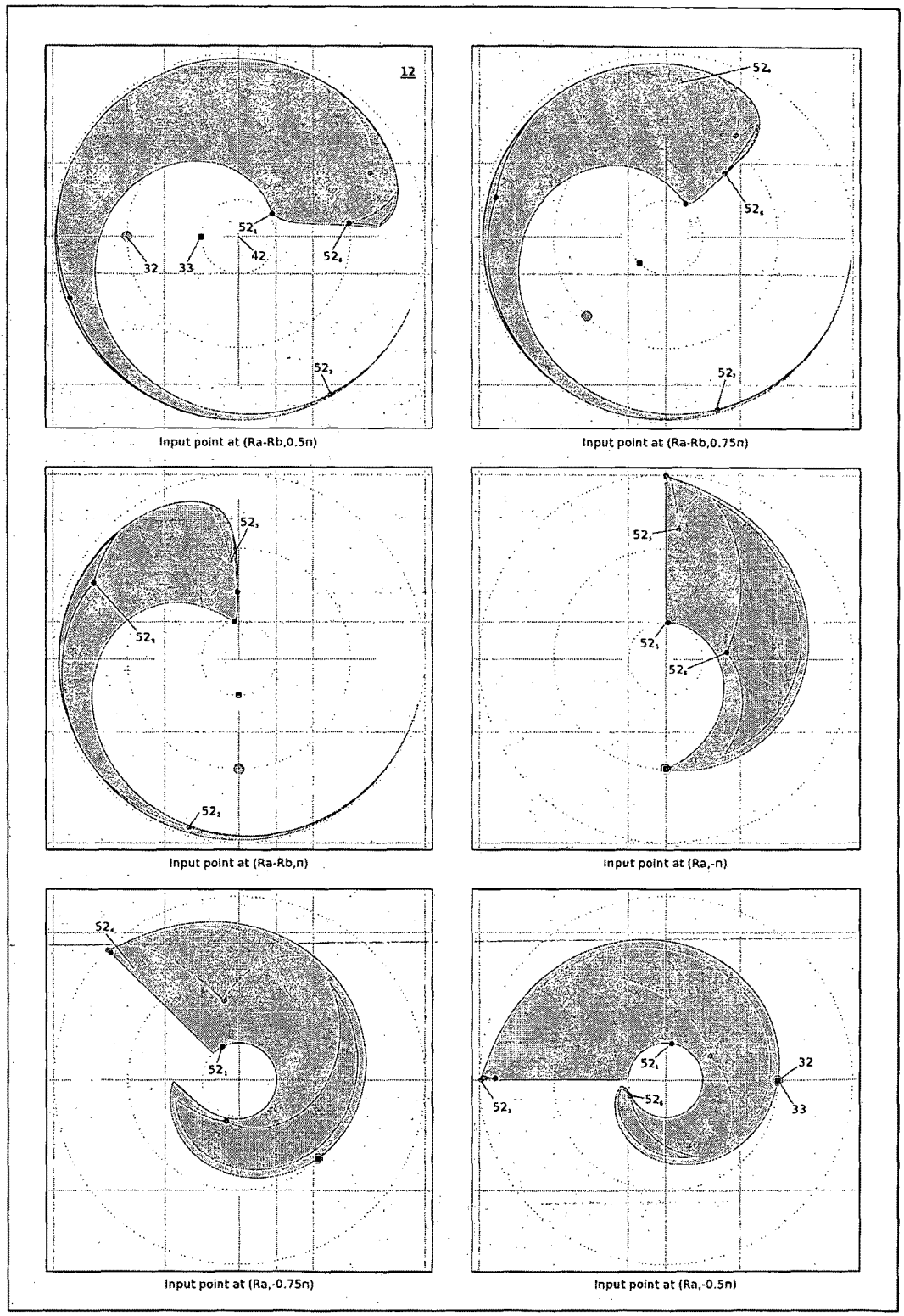
Figure 10C:
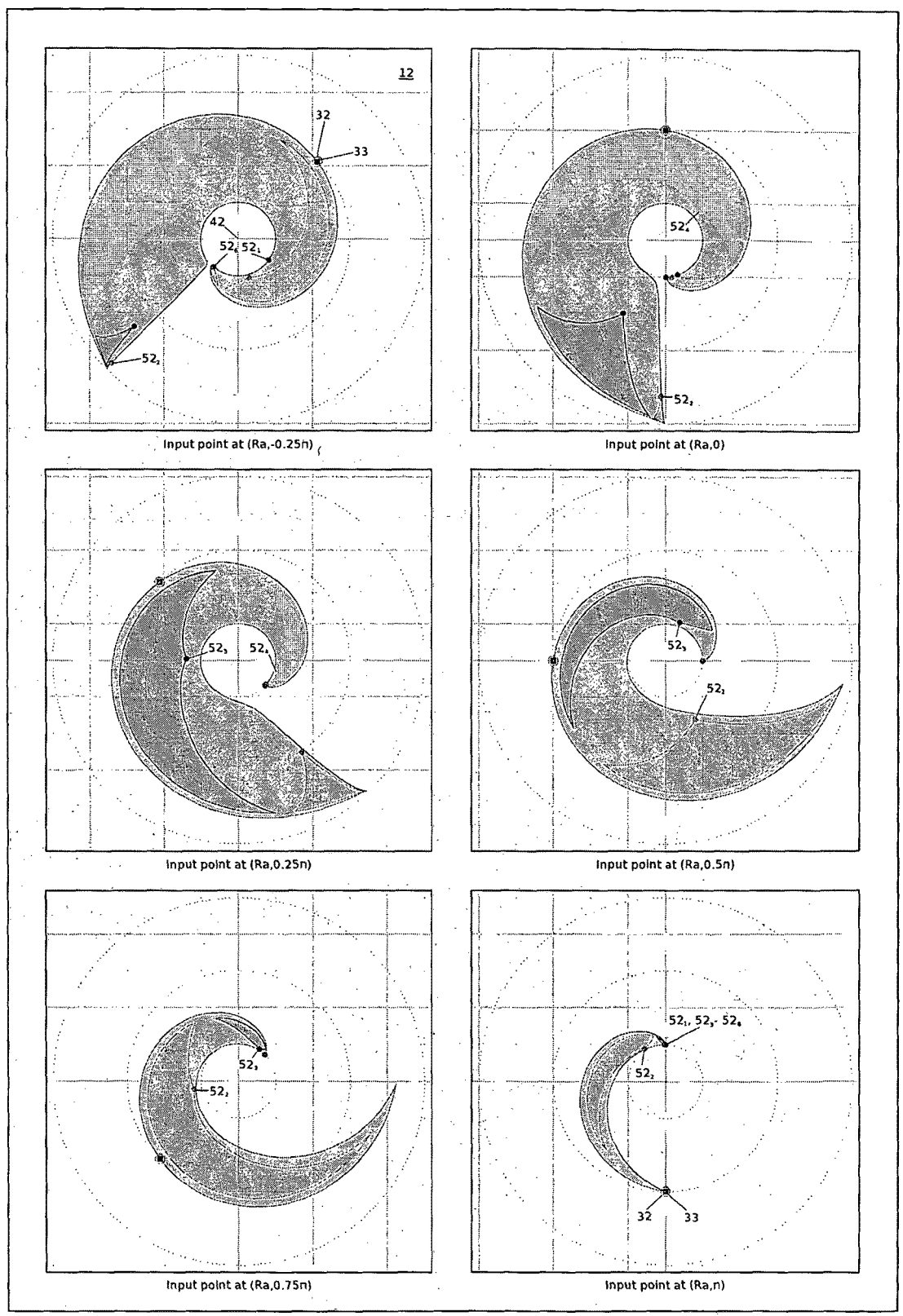

FIGS. 10a-c presents a sequence of diagrams that demonstrates the second control strategy.

Figure 11A:
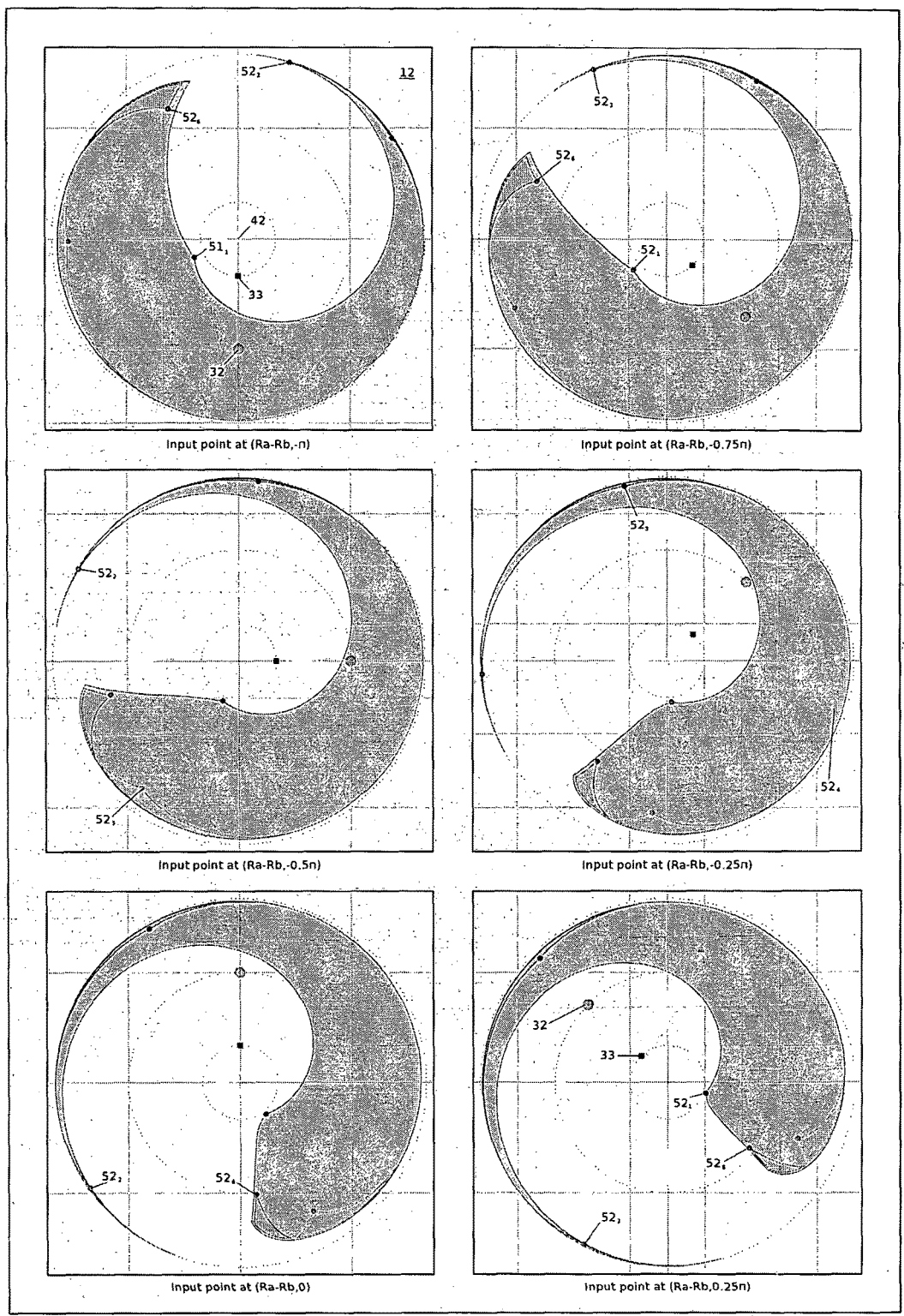
Figure 11B:
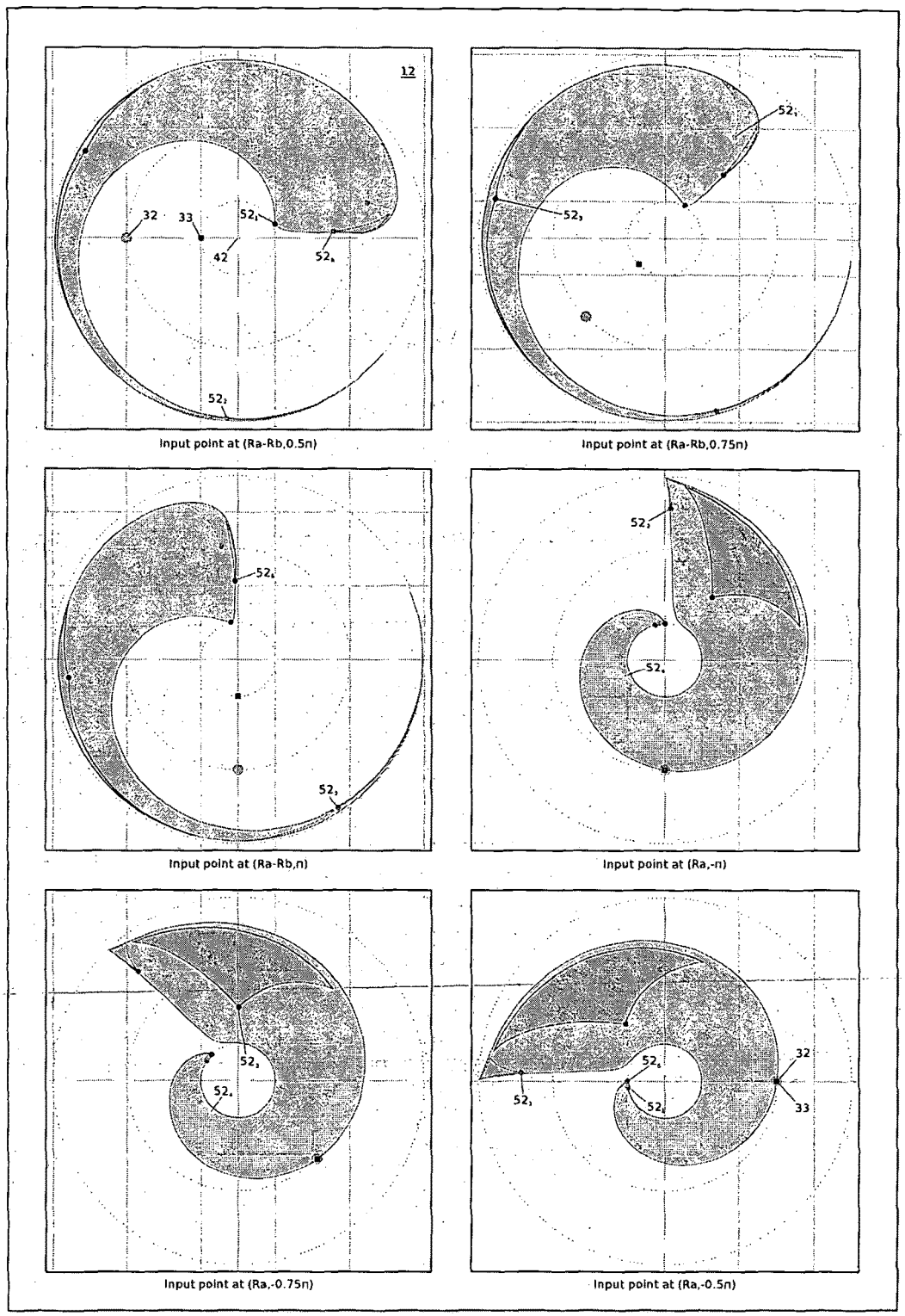
Figure 11C:
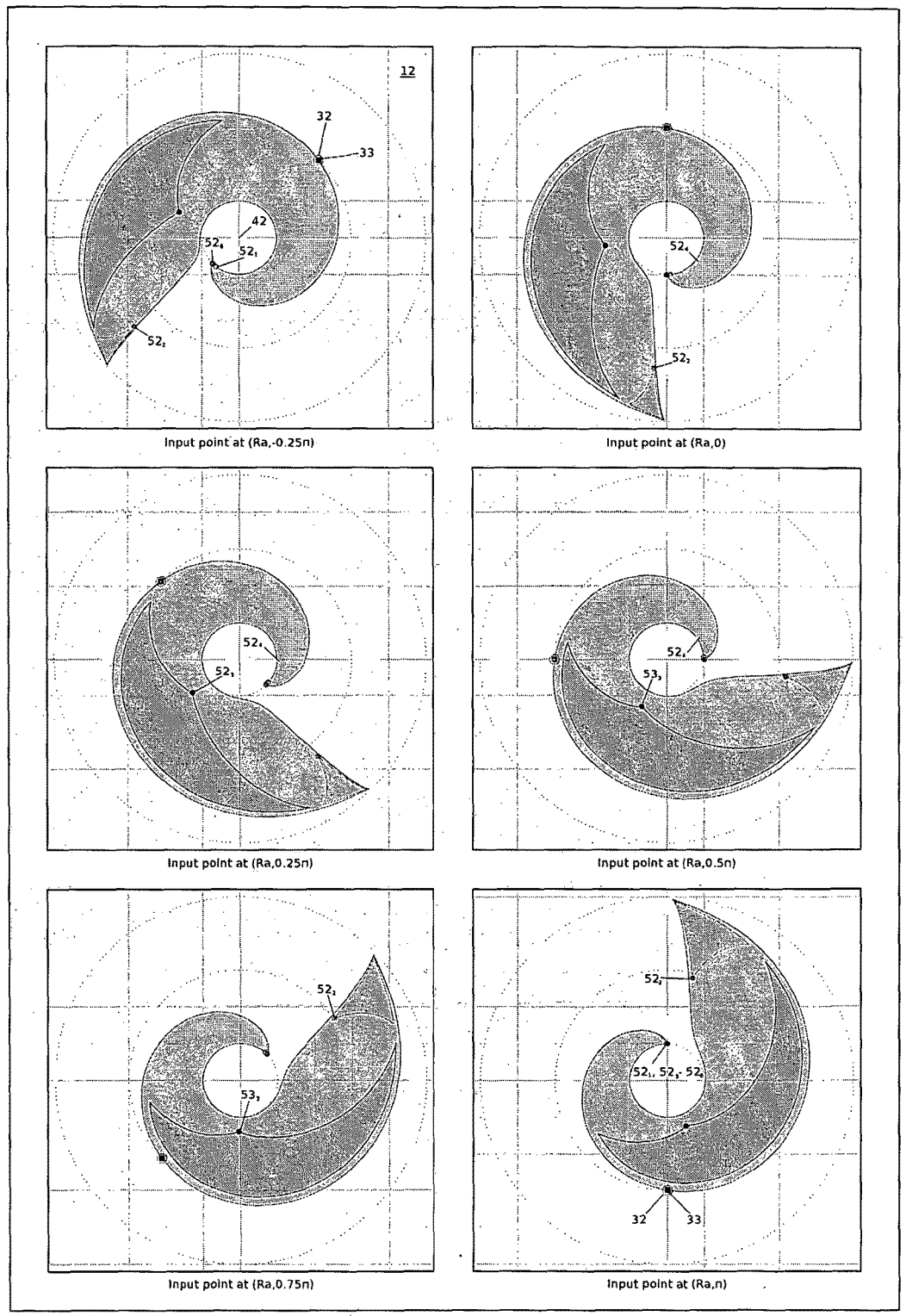

FIGS. 11*a-c* presents a sequence of diagrams that demonstrates the third control strategy.

Figure 12A:
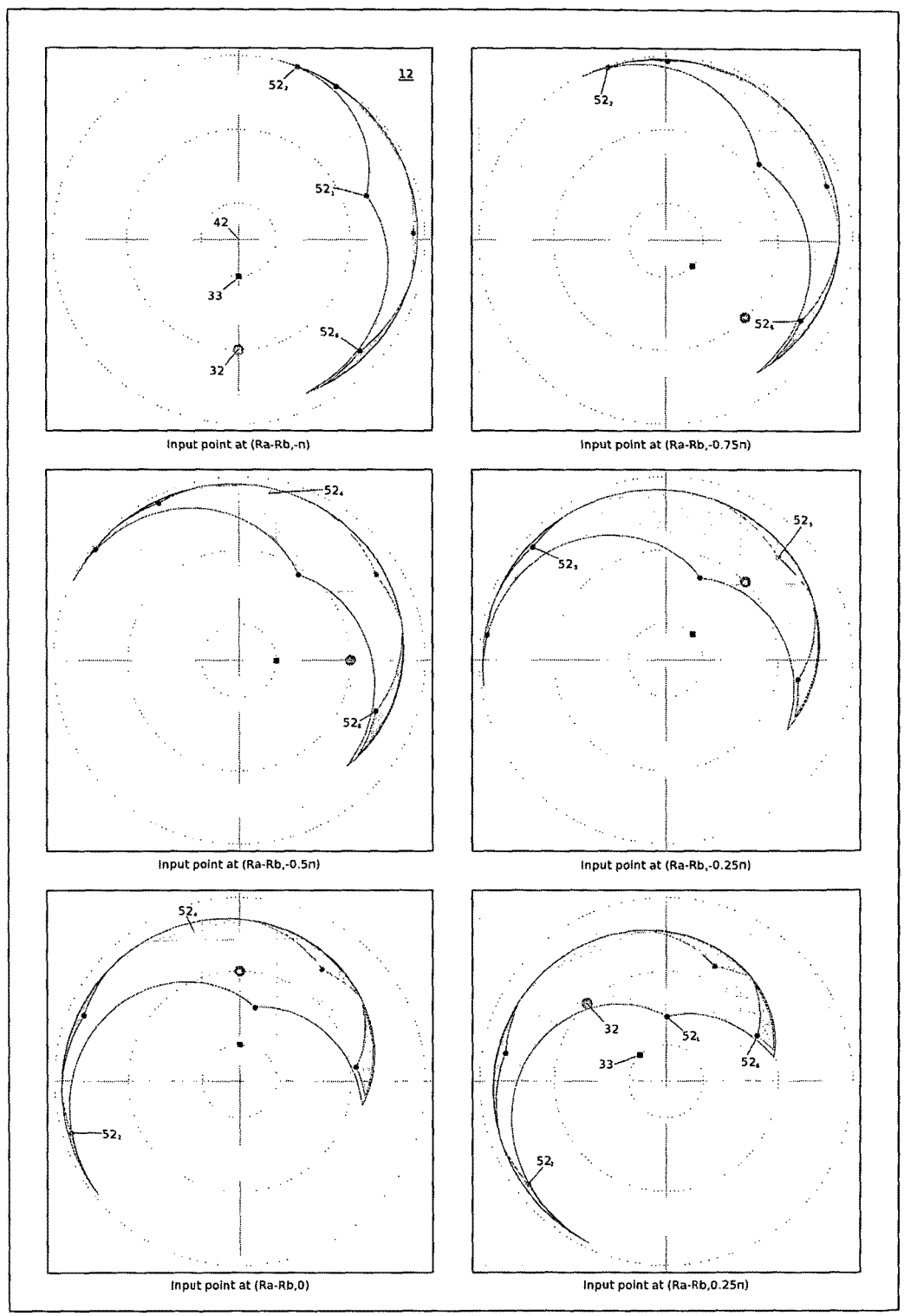
Figure 12B:
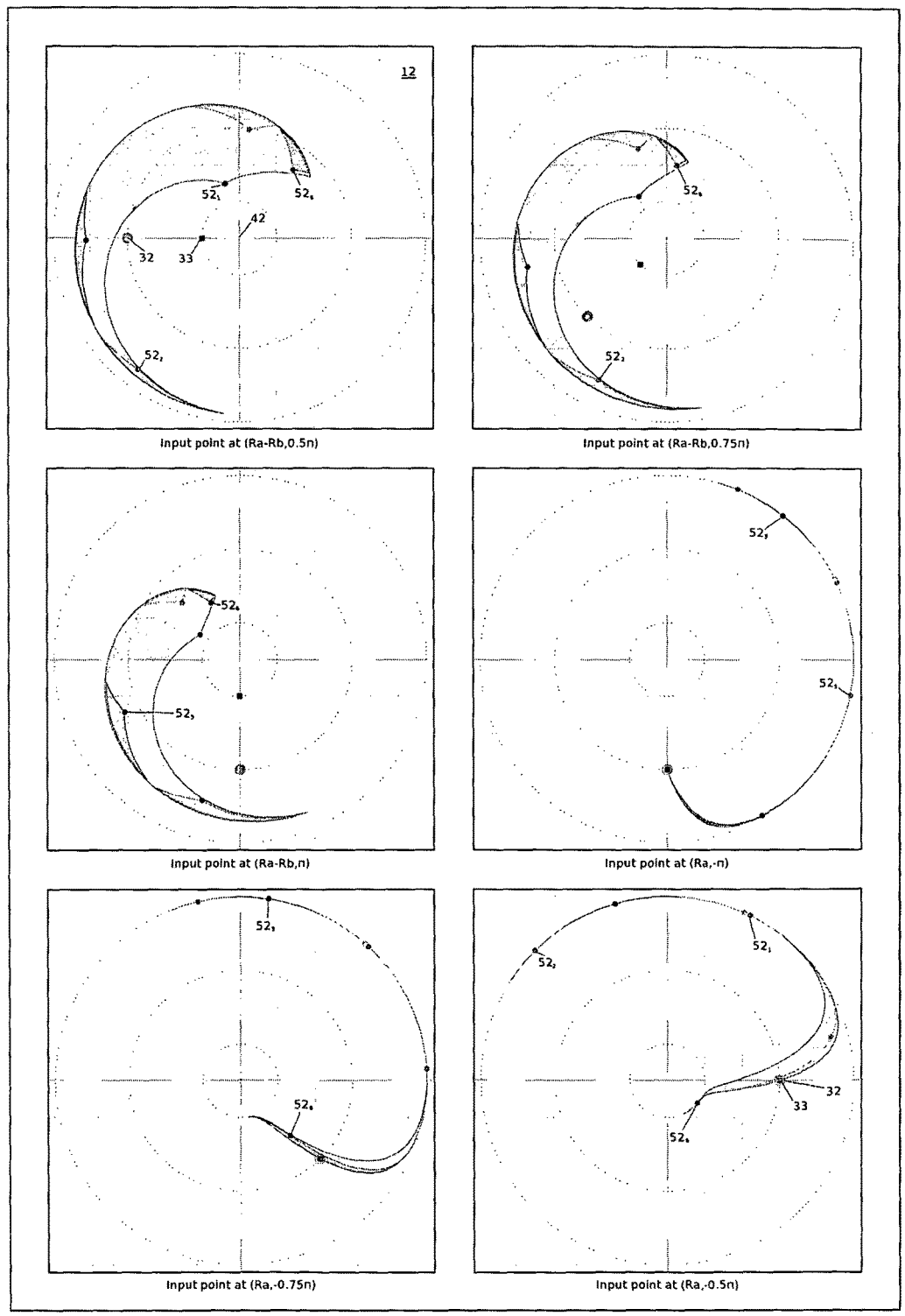
Figure 12C:
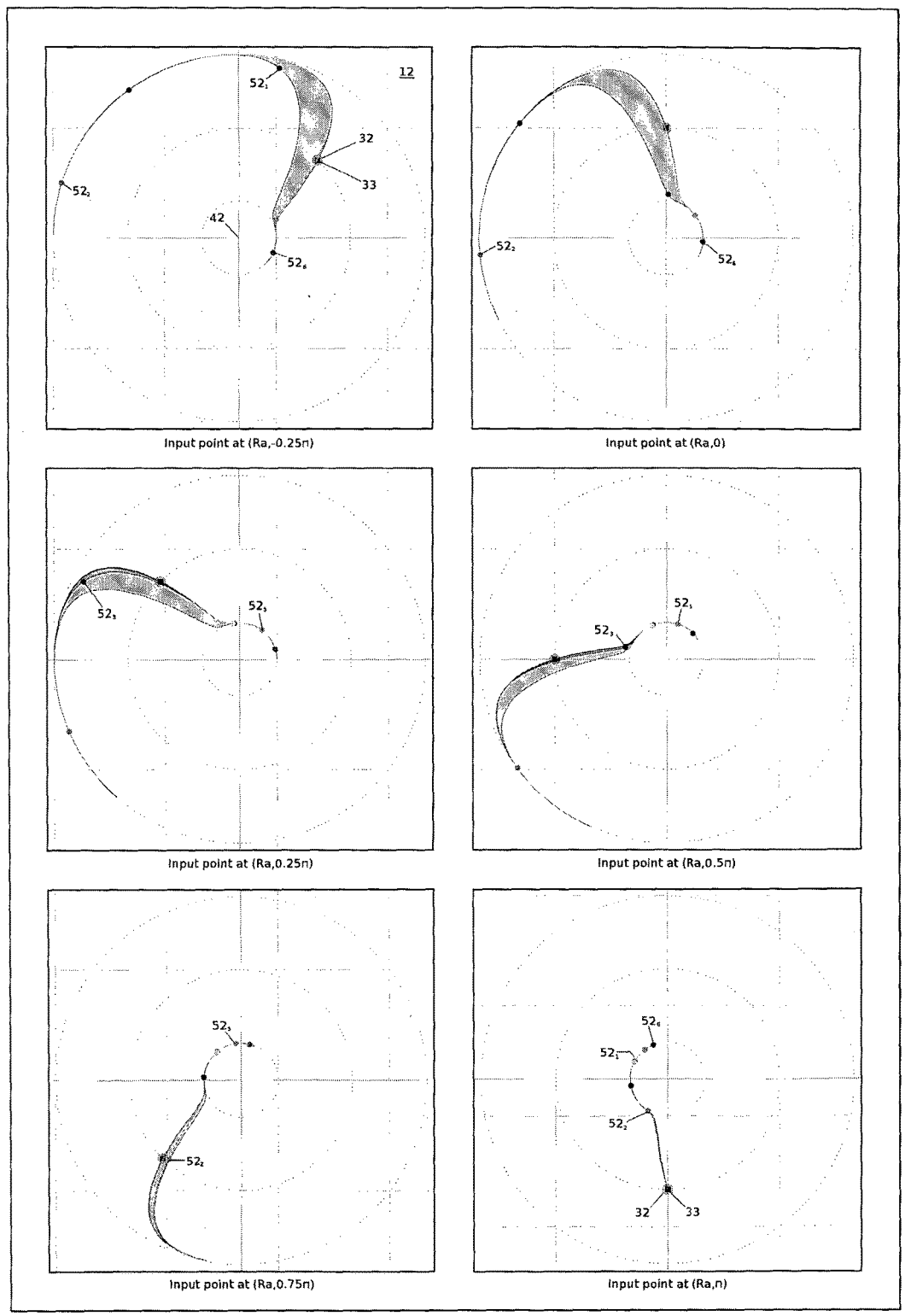

FIGS. 12*a-c* presents a sequence of diagrams that demonstrates the fourth control strategy.

FIG. 13.1 shows the boundaries and light cones for an alternative global coordinate patch.

In FIGS. 13.2*a-b* the observer event's first (timelike) coordinate value is fixed at −2, while the second (spacelike) coordinate value is swept from −7.5 to 7.5 in steps of 1.5 units.

In FIGS. 13.3*a-b* the observer event's second (spacelike) coordinate value is fixed at zero, while the first (timelike) coordinate value is swept from −3 to 7 in steps of one unit.

FIG. 14.1 shows a schematic representation of the main ideas of light cone display and control on a Minkowski space.

FIG. 14.2 shows one possible generic form of the display map for light cone display and control.

FIG. 14.3 shows the possible mapping of light cone projected control.

In FIG. 14.4 the observer event's second (spacelike) coordinate value is fixed at zero, while the first (timelike) coordinate value is swept from −0.75 to 5.5 in steps of 1.25 units.

FIG. 14.5 shows a Gaussian profiled sub-manifold for t(x).

FIGS. 15.1 to 15.3 shows examples of light cones for an alternative manifold (Kähler) and metric taken from general relativity.

Referring to the drawings, the event set $E'=\{e_1, e_2, \ldots e_N\}$ of actions, objects or action and object pairings is generally represented in abstract form, such as a point, an ellipse, a square, a cone, etc. The events may represent: any typical interface or computer action or command, such as select, open, move, play, create, remove, call, message, draw, drag, etc. The events may also represent any typical user interface object, such as windows, icons and menus. Windows serve as containers for other windows, icons and menus. Icons and menu items may represent computer internal objects, including media files, data files and programs; and real-world entities such as people, other computers and properties of a plant; and interface and computer actions. The events may also represent an order-independent pairing of actions and objects, such as "select icon", "run application", "show recent images", "play this list of songs", "create text file", "remove file", etc.

A representation manifold 10 is established using general relativity geometry as discussed before. Specifically, the Riemann manifold 10 is taken to be a two-dimensional Minkowski space, a real space ($\square^2$), with Euclidean coordinates and geodesic distance squared function between points $a=(a_1,a_2)$ and $b=(b_1,b_2)$ defined as: $S^2_R(a,b)=c^2(a_1-b_1)^2-(a_2-b_2)^2$. The first coordinate can be interpreted as time, the second coordinate as space and c as the speed at which a signal travels.

If an event is located on the manifold at a and a second event is located at b, a logical relation exists between the events (the two events are causally related) if the squared distance between the two events is larger or equal to zero, that is $S^2_R(a,b) \geq 0$. Stated in terms of the space-time geometric interpretation, the two events can follow each other (or be reached from each other) if they are separated by a spatial distance that is less than, or equal to, the distance traversed by a signal traveling at speed c times the temporal difference between them. It can be said that the events must fall within one another's "light" cones to be logically related.

FIG. 3 highlights the zones where $S^2_R(a,b)>0$ (filled area), $S^2_R(a,b)<0$ (non-filled area) and $S^2_R(a,b)=0$ (the lines formed by $a_2=c \cdot a_1$ and $a_2=-C \cdot a_1$) for the point b located at the origin ($b_2=b_1=0$).

The set of event locations is denoted by 50 in the representation manifold 10, while individual event locations are denoted by 50$_i$, where $1 \leq i \leq N$. FIG. 4.1 shows a single event 50$_1$ at (0,0) and its forward and backward "light" cones (filled areas) in the two-dimensional Minkowski representation manifold 10 for c=1.

Any event located in the forward "light" cone (Zone 1) satisfies the causality condition (is timelike) and is accessible in the future (t>0). One can say that events in Zone 1 follow on event 50$_1$.

Any event located in the backward "light" cone (Zone 3) also satisfies the causality condition (is timelike), but is accessible in the past (t<0). One can say that events in Zone 3 precede event 50$_1$.

Any event located outside the forward and backward "light" cones (Zones 2 and 4) does not satisfy the causality condition (is spacelike). One can say that these events are causally unrelated to event 50$_1$.

Numerous strategies exist to represent the event set 50, through the ψ map, in the representation manifold 10. One such strategy is introduced next. A potential application of the innovation is to associate causality between events with the hierarchical organisation of events in the event set 50. More specifically, we can encode a causal relationship, in the representation manifold 10 through the ψ map, between a parent event and its children by placing the child events in the "light" cone (Zones 1 and 3 in FIG. 4.1) of the parent event.

For example, FIG. 4.2 shows seven events, denoted by 50$_1$ to 50$_7$, in the representation manifold 10. Event 50$_1$ is the root parent event and it contains three children 50$_2$, 50$_3$ and 50$_4$. Event 50$_3$ in turn has three children 50$_5$, 50$_6$ and 50$_7$.

The forward and backward "light" cones of event 50$_3$ are indicated, where the speed value is again taken to be c=1. The following statements can be made:

Events 50$_2$, 50$_3$ and 50$_4$ follow from event 50$_1$.

Events 50$_5$, 50$_6$ and 50$_7$ follow from event 50$_3$.

Through the transitive property, events 50$_5$, 50$_6$ and 50$_7$ also follow from event 50$_1$, since they follow from event 50$_3$.

There are no causal relationships between events 50$_2$, 50$_3$ and 50$_4$.

There are no causal relationships between events 50$_5$, 50$_6$ and 50$_7$.

Through the geometric placement of events 50$_5$ to 50$_7$, it may seem that these events are also causally related to events 50$_2$ and 50$_4$. This may, or may not be, a desirable configuration in different embodiments of the innovation.

One may furthermore allow mappings on the representational manifold 10 ($\Phi:M_R \to M_R$) as long as causality is maintained. There is a large set of such possible maps. This includes, but is not limited to, a linear translation:

$$(\Phi_T:(a_1,a_2) \to (a_1+d_1, a_2+d_2),$$

where $a_1$ is the first coordinate in the manifold, $a_2$ is the second coordinate in the manifold, $d_1$ is the translation in the first coordinate and $d_2$ is the translation in the second coordinate; a linear scaling:

$$\Phi_S:(a_1,a_2) \to (\lambda a_1, \lambda a_2),$$

where λ is the scaling factor; and the Lorentz transform:

$$\Phi_L: (a_1, a_2) \to \left(\cosh(\phi)a_1 + \frac{\sinh(\phi)}{c}a_2, c\sinh(\phi)a_1 + \cosh(\phi)a_2\right),$$

where φ is the Lorentz boost parameter.

An output manifold 11 and a coordinate patch 12 are established to visually represent the event set 50.

One possible choice for the output manifold 11 is the two-dimensional Minkowski space as defined previously for the representation manifold 10. The map between the representational and output manifold is then the identity map.

The display coordinate map is generally chosen to be a bounded subdomain of the two-dimensional real space ($\square^2$), allowing for the visualisation of the output manifold 11 on a finite sized screen. However, any relevant coordinate mapping is allowed, as long as it maintains causality.

In the following examples, a global coordinate map Ω is selected. This map translates all points in the output manifold 11 onto an annular ring shaped region around the origin 42 of the coordinate patch 12. This global coordinate map is defined in terms of polar coordinates:

$$\Omega_A: \begin{vmatrix} r = R_a + R_b \tanh(\lambda(a_1 - b_1)) \\ \theta = \pi\tanh(\lambda(a_2 - b_2)) + \theta_{\mathit{offset}} \end{vmatrix},$$

where $(a_1,a_2)$ is the original global Cartesian coordinates, $(b_1,b_2)$ is an offset from the origin (for example the observer's location 30, as will be demonstrated later), $R_a$ is the radius to the middle of the annulus, $R_b$ is an offset from $R_a$ so that $R_a+R_b$ is the radius of the outer ring of the annulus and $R_a-R_b$ is the radius of the inner ring of the annulus if b>0 and a≥b, and $\theta_{\mathit{offset}}$ is an angular offset. FIG. 5 shows the proposed coordinate patch 12, without any events, after the global coordinate map $\Omega_A$ has been applied. Zero degrees radian is at the top of the annulus, while π and −π are at the bottom of the annulus, as indicated. This transformation maps values of the first (timelike) coordinate in the output manifold 11 to the radial coordinate in the coordinate patch 12 as follows: $(-\infty<a_1<\infty) \to (R_a-R_b<r<R_a+R_b)$, and the second (spacelike) coordinate in the output manifold 11 to the angular coordinate in the coordinate patch as follows: $(-\infty<a_2<\infty) \to (-\pi<\theta<\pi)$. Coordinates at the offset $(b_1,b_2)$, associated with the observer's event location in 10, are mapped to the location indicated by 32 in FIG. 5. Coordinates $(a_1,a_2)$ that are located in the future, relative to the offset $(b_1,b_2)$, are mapped to the outer ring (dark highlighted area of the annulus), while coordinates in the past are mapped to the inner ring (light highlighted area of the annulus).

The coordinate patch 12 provides a view of the output manifold 11 (and through each map, indirectly provides a view of the representation manifold 10) relative to the coordinate $(b_1,b_2)$. It is useful to interpret this offset as the location of an observer, represented by event $e_0$, which traverses the space.

The bodies (shapes) of events are denoted, as a set, by 60 and individually by $60_i$ in the representation manifold 10. There are numerous options to depict an event's body in the representation manifold 10, such as a point only, a triangle, a rectangle, an ellipse, a polygon, etc. An event's location and body may be transformed from the representation manifold 10 to the coordinate patch 12 by the various maps. The set consisting of event locations is denoted by 52 in the coordinate patch 12 and individual event locations are denoted by $52_i$, where $1 \le i \le N$. The bodies of events are denoted, as a set, by 62 and individually by $62_i$ in the coordinate patch 12.

One useful depiction of an event's body in the representation manifold 10 is the event's forward and backward light cones. FIG. 6.1 shows the body $60_1$ of an event $e_1$, with location $50_1$ at (0,0) and c=0.5, depicted by its forward and backward light cones. FIG. 6.2 shows the event's location $52_1$ (the solid disc) and body $62_1$ in the coordinate patch 12 after the global coordinate map $\Omega_A$, with λ=0.25 and observer event $e_0$ located at (0,0), has been applied. With the observer's event $e_0$ at the same location as the depicted event $e_1$, the forward light cone is mapped to the outer ring of the annulus and the backward cone is mapped to the inner annulus. Note how the points at infinity in the representation manifold 10 are mapped to the bounded region in the coordinate patch 12.

FIGS. 7.1 to 7.4 demonstrate the effect of a change in the observer's event location 30. The single event $e_i$, still with location $50_1$ at (0,0) and c=0.5, is shown in the representation manifold 10 and coordinate patch 12 with observer positions respectively at (−1,0), (1,0), (0,1) and (0,−1).

In the following examples, an event hierarchy consisting of one parent event $e_1$ and five child events ($e_2$ to $e_6$) is used to demonstrate how the events are mapped to the coordinate patch 12 when the observer's event $e_0$ location 30 changes (through a linear translation) or when other various mappings are applied.

FIG. 8.1 shows the locations 50; and representations 60; of the events $e_i$ in the representation manifold 10. In this example, c=0.5 and only the forward light cones are used to represent the event bodies. Note that the sizes of the light cones are limited (i.e. not infinite) to reduce visual clutter. Furthermore, the light cone sizes are chosen so that the light cones of child events are contained within the light cones of their parent event, which makes it easier to visualise the dependency relationships. FIG. 8.1 also shows the locations $52_i$ and representations $62_i$ of the events $e_i$ in the coordinate patch 12 after the global coordinate map $\Omega_A$, with λ=0.25 and the observer event $e_0$ located at (0,0), has been applied.

FIGS. 8.2 and 8.3 each presents a sequence of diagrams that display the locations $52_i$ and representations $62_i$ of the events $e_i$ in the coordinate patch 12 after the global coordinate map $\Omega_A$, with λ=0.25 but varying observer event $e_0$ locations 30, has been applied.

In FIGS. 8.2*a-b* the observer event's time coordinate value is fixed at zero, while the space coordinate value is swept from −7 to 7 in steps of one unit. The effect of the observer event's translation in the space axis is that the locations $52_i$ and representations $62_i$ of the events are deformed and rotated around the centre of the annulus. In this case, the event set moves from positive to negative angular values. At first, all events are far away from the observer's location 32, with $e_6$ closest to the observer and $e_2$ furthest from the observer. As the space coordinate value increases, the events move closer to, and eventually pass, the observer's location 32. Eventually all events are again located far away from the observer's location 32, but this time with $e_2$ closest to the observer and $e_6$ furthest from the observer.

In FIG. 8.3 the observer event's space coordinate value is fixed at zero, while the time coordinate value is swept from −5 to 6 in steps of one unit. The effect of the observer event's translation in the time axis is that the locations $52_i$ and representations $62_i$ of the events are deformed and moved closer to the origin 42 of the annulus. In this case, the event set moves from larger to smaller radial values. At first, all events are "in front" of the observer event in the representation manifold, and far away from the observer event location in the coordinate patch 12. All events start out in the outer ring of the annulus, indicating that they are located in the future relative to the observer event. As the observer event moves in time, it moves progressively closer the event set, reaching the parent event $e_1$ at location (0,0). After this point, the parent event moves from the outer ring (future light cone) of the annulus to the inner ring (past light cone) and away from the observer's event location 32. As the observer's translation continuous, the child events move closer to the origin 42 of the annulus. Note how child event $e_4$ moves towards the observer's location 32 and then past it (at between 4<t<5). Eventually all events are located in the inner ring of the annulus.

FIG. 8.4 presents a sequence of diagrams that display the locations $52_i$ and representations $62_i$ of the events $e_i$ in the coordinate patch 12 after both the Lorentz transform and the global coordinate map $\Omega_A$, with $\lambda=0.25$ and the observer's event $e_0$ located at (0,0), has been applied.

The Lorentz boost parameter $\phi$ is swept from $-2\pi$ to $2\pi$. The specific boost values displayed in FIG. 8.4 are the set $\phi=\{-2\pi, -1.5\pi, -\pi, -0.8\pi, -0.6\pi, -0.4\pi, -0.2\pi, 0, 0.2\pi, 0.4\pi, 0.6\pi, 0.8\pi, \pi, 1.5\pi, 2\pi\}$. The effect of the Lorentz transform is that the locations $52_i$ and representations $62_i$ of the events are distorted and "boosted away" from the observer's event location 32 as the magnitude of $\phi$ increases. In this example, the events move from negative to positive angular values. At first, all events are far away from the observer's event location 32, with $e_2$ closest to the observer and $e_6$ furthest from the observer. For large negative boost values, the events are asymptotically transformed to $(r,\theta)=(R_a+R_b,-\pi)$ on the annulus. As the boost parameter value increases, the events, starting with $e_2$, sequentially escape the asymptotic position and move towards the observer's event location 32 while staying in the outer ring of the annulus. At a boost parameter value of zero, the Lorentz transform has no effect and only the effects of the global coordinate map $\Omega_A$ remain. Eventually all events are again "boosted away" away from the observer's event location 32, but this time with $e_6$ closest to the observer and $e_2$ furthest from the observer. For large positive boost values, the events are asymptotically transformed to $(r,\theta)=(R_a+R_b,\pi)$ on the annulus.

It is important to note that the encoded logical (causal) relationships between events have been maintained throughout the transformations demonstrated in FIGS. 8.2 to 8.4.

In the following examples we incorporate user input and user control. An input manifold 13 is established to receive and track user input. The input manifold 13 may be multi-dimensional to support multi-dimensional input, such as mouse input, three-dimensional multi-touch input, keyboard input and voice input.

User control will be demonstrated using a two-dimensional input vector as provided, for example, by a mouse or touch sensitive input device. For this, one possible choice of input manifold 13 is a two-dimensional Euclidian space with squared distance defined as $dS^2=dp_1^2+dp_2^2$, where $p_1$ and $p_2$ are independent coordinates of the space. The input point P on the input manifold 13 is denoted in the figures by 33.

The method allows for the adaptation of at least the following constructs:
 $\xi$: The map that determines the set of events $E=\{e_0, e_1, e_2, \ldots\}$.
 $g_R$: The metric for the representation manifold $M_R$.
 $\psi$: The map that embeds the events E in the representation manifold $M_R$.
 $e_0$: The location of the observer in the representation manifold $M_R$.
 $g_O$: The metric for the output manifold $M_O$.
 X: A map between the representation manifold $M_R$ and the output manifold $M_O$.
 $\Omega$: Coordinate patch on the output manifold $M_O$.
 $g_I$: The metric for the input manifold.

One possible strategy for adapting the constructs is to introduce the input point P as a parametric dependency on the constructs. That is:
 $\xi(P)$,
 $g_R(a,P)$ for all $a \in M_R$
 $\psi(P)$
 $e_0(P)$
 $g_O(a,P)$ for all $a \in M_O$
 $X(P)$
 $\Omega(P)$
 $g_I(a,P)$ for all $a \in M_I$ Building on the previous examples, we demonstrate possible strategies to control the observer's event location $e_0$, the X map between the representation manifold 10 and the output manifold 11 and the $\Omega$ coordinate patch, using the input point P. Specifically, we will apply, and control the parameters of, the linear translation map $\Phi_T$, the Lorentz transform map $\Phi_L$ and the global coordinate patch $\Omega_A$ as defined before.

In the following examples, a device that overlaps input over the display, such as a touch interface smart phone, is used. The input manifold 13 is constructed to overlay the space occupied by the coordinate patch 12 on the device's display. The input manifold 13 additionally uses the same unit scale at the coordinate patch 12, sets the zero reference point 43 to coincide with the coordinate patch's reference point 42, and aligns the zero heading direction with the observer's position 32 in the coordinate patch. The input point is defined as polar coordinates $(r_p,\theta_p)$, where $r_p$ is measured from the point 43 and $\theta_p$ from the zero heading direction.

In the first proposed control strategy: the first coordinate of the observer event is set proportionally to the input point's radial coordinate; the second coordinate is set proportionally to the input point's angular coordinate; the Lorentz boost parameter is set proportionally to the input point's angular coordinate; and the angular offset of the global coordinate patch is equal to the input point's angular coordinate. Specifically:

$$e_0: a_1 = s_{a1}\frac{r_p}{R_a}$$

$$e_0: a_2 = s_{a2}\frac{\theta_p}{\pi},$$

$$\Phi_L: \phi = s_\phi \theta_p$$

$$\Omega_A: \theta_{offset} = \theta_p$$

where $s_{a1}$, $s_{a2}$ and $s_\phi$ are scaling parameters for the observer event's first coordinate, the observer event's second coordinate and Lorentz boost respectively. The other parameters are as defined before. The scaling values are free parameters and may, for example, be determined as a function of the event set. By setting the angular offset $\theta_{offset}$ of the global coordinate patch map $\Omega_A$ equal to the value of the input point's angular coordinate, it is ensured that the observer's mapped location 32 in the coordinate patch 12 is always in the same direction as the input point relative to reference points 42 and 43.

FIGS. 9a-c presents a sequence of diagrams that display the locations $52_i$ and representations $62_i$ of the events $e_i$ in the coordinate patch 12 after both the Lorentz transform and the global coordinate map $\Omega_A$, with $\lambda=0.25$, has been applied. The first nine diagrams demonstrate the effect of the first control strategy with the input point's radial coordinate set to $r_p=R_a-0.5R_b$, while the angular coordinate is swept from $-\pi$ to $\pi$ in steps of $0.25\pi$. In the subsequent nine diagrams the input point's radial coordinate set to $r_p=R_a$, while the angular coordinate is again swept from $-\pi$ to $\pi$ in steps of $0.25\pi$.

In the second proposed control strategy: the first coordinate of the observer event is set proportionally to the input point's radial coordinate; the second coordinate is set proportionally to the input point's angular coordinate; the Lorentz boost parameter is set proportionally to the rate of change of the input point's angular coordinate; the scaling factor of the global coordinate patch is set proportionally to input point's radial coordinate; and the angular offset of the global coordinate patch is set equal to the input point's angular coordinate. Specifically:

$$e_0: a_1 = s_{a1}\frac{r_p}{R_a}$$
$$e_0: a_2 = s_{a2}\frac{\theta_p}{\pi}$$
$$\Phi_L: \phi = s_\phi d\theta_p$$
$$\Phi_\lambda: \lambda = s_{\lambda a} + s_{\lambda b}\frac{r_p}{R_a}$$
$$\Omega_A: \theta_{offset} = \theta_p$$

where $d\theta_p$ is the rate of change of input point's angular coordinate, $s_{\lambda a}$ and $s_{\lambda b}$ are scaling parameters for $\lambda$. The other parameters are as defined before. The rate of change may, for example, be calculated as relative change between updates. The scaling values are free parameters and may, for example, be determined as a function of the event set.

FIGS. 10a-c presents a sequence of diagrams that display the locations $52_i$ and representations $62_i$ of the events $e_i$ in the coordinate patch 12 after both the Lorentz transform and the global coordinate map has been applied. The first nine diagrams demonstrate the effect of the second control strategy with the input point's radial coordinate set to $r_p=R_a-R_b$, while the angular coordinate is swept from $-\pi$ to $\pi$ in steps of $0.25\pi$ and at an angular rate of change of $0.125\pi$. In the subsequent nine diagrams the input point's radial coordinate set to $r_p=R_a$, while the angular coordinate is again swept from $-\pi$ to $\pi$ in steps of $0.25\pi$ at an angular rate of change of $0.125\pi$.

The third proposed control strategy is similar to the second control strategy, except that the second coordinate of the observer's event is set proportionally to a derived apparent angular value, $\theta_a$. The apparent angular value is specified through a function parameterised by: the previous apparent angular value, the rate of change of the input point's angular coordinate and the input point's radial coordinate. Specifically:

$$e_0: a_2 = s_{a2}\frac{\theta_a}{\pi}, \text{ with}$$
$$\theta_a = \theta_{a,previous} + \left(1 - s_r\frac{r_p}{R_a}\right) \cdot d\theta_p,$$

where $\theta_{a,previous}$ is the previous apparent angular value and $s_r$ is a scaling parameter that regulates the influence of the input point's radial coordinate. The other parameters are as defined before. The apparent angular value may be initialised as zero.

The scaling value $s_r$ may be chosen so that the apparent angular value is similar in value to the input point's angular coordinate when the input point's radial coordinate is small, and only a fraction of the input point's angular coordinate when the input point's radial coordinate is large. This allows for finer control over the second coordinate of the observer's event as the input point's radial coordinate value increases.

The above form of the apparent angular value is one possible function that allows for dynamic allocation of control space based on user input.

FIGS. 11a-c presents a sequence of diagrams that display the locations $52_i$ and representations $62_i$ of the events $e_i$ in the coordinate patch 12 after both the Lorentz transform and the global coordinate map has been applied. The first nine diagrams demonstrate the effect of the third control strategy with the input point's radial coordinate set to $r_p=R_a-R_b$, while the angular coordinate is swept from $-\pi$ to $\pi$ in steps of $0.25\pi$ and at an angular rate of change of $0.125\pi$. In the subsequent nine diagrams the input point's radial coordinate set to $r_p=R_a$, while the angular coordinate is again swept from $-\pi$ to $\pi$ in steps of $0.25\pi$ at an angular rate of change of $0.125\pi$.

The effect of the introduction of the apparent angular value is evident. In both FIGS. 10 and 11 the input point rotates around the reference point 43 by $2\pi$. In FIG. 10 the observer's event moved by approximately the distance between five consecutive child events in the spacelike axis, but in the first nine diagrams of FIG. 11 the observer's event moved only by approximately the distance between three consecutive child events and in the subsequent nine diagrams the observer's event moved by less than the distance between two consecutive child events. This control strategy effectively provides a radially controlled motor advantage for selection in the angular axis, especially for large event sets.

In the fourth proposed control strategy: the first coordinate of the observer event is set proportionally to the input point's radial coordinate; the second coordinate is set proportionally to the input point's angular coordinate; the Lorentz boost parameter is set proportionally to the rate of change of the input point's angular coordinate; the speed of light of the representation manifold's metric is set proportionally to input point's radial coordinate; and the angular offset of the global coordinate patch is set equal to the input point's angular coordinate. Specifically:

$$e_0: a_1 = s_{a1}\frac{r_p}{R_a}$$
$$e_0: a_2 = s_{a2}\frac{\theta_p}{\pi}$$
$$\Phi_L: \phi = s_\phi d\theta_p$$
$$\Phi_\lambda: \lambda = s_{\lambda a} + s_{\lambda b}$$

-continued $$g_R: c = 1 - s_c \frac{r_p}{R_a}$$

$$\Omega_A: \theta_{offset} = \theta_p$$

where $s_c$ is a scaling parameters for c. The other parameters are as defined before.

FIGS. 12a-c presents a sequence of diagrams that display the locations $52_i$ and representations $62_i$ of the events $e_i$ in the coordinate patch 12 after both the Lorentz transform and the global coordinate map $\Omega_A$ with $\lambda=0.25$, has been applied. The first nine diagrams demonstrate the effect of the second control strategy with the input point's radial coordinate set to $r_p=R_a-R_b$, while the angular coordinate is swept from $-\pi$ to $\pi$ in steps of $0.25\pi$. In the subsequent nine diagrams the input point's radial coordinate set to $r_p=R_a$, while the angular coordinate is again swept from $-\pi$ to $\pi$ in steps of $0.25\pi$.

From an implementation point of view the previous examples have the drawback that the light cone structure of an event is rather complicated and counter intuitive. In the next example a choice of global coordinates is made on the output manifold such that the light cones of events are bounded by straight lines. This creates a very simple and intuitive notion of causality and causally connected events and allows for much more simple control strategies. This again demonstrates the power of the innovation proposed here: Different graphical presentations, related by a simple choice of coordinates, are used to communicate with the user. As these presentations are related by a coordinate transformation, the logical content in terms of objects and logical relations is unaffected, yet some of these presentations are more convenient or effective for communication and control of this information by the user.

As in the previous examples, we take the representation and output manifolds to be the same, i.e., $M_O=M_R$ and to coincide with two-dimensional Minkowski space. The map X is again taken as the identity map.

The following global (polar) coordinate patch is introduced on the output manifold $M_O$:

$$\Gamma_r: r = a\tanh(m_v^0(\lambda)(x-x_0)^v),$$

$$\Gamma_\varphi: \varphi = \frac{\pi}{2} - \frac{\pi}{2}\tanh\left(\frac{\gamma m_v^1(\lambda)(x-x_0)^v}{cm_v^0(\lambda)(x-x_0)^v}\right).$$

Here $m(\lambda)$ is a Lorentz transformation matrix $$m(\lambda) = \begin{pmatrix} \cosh\lambda & \frac{\sinh\lambda}{c} \\ \sinh\lambda & \frac{\cosh\lambda}{c} \end{pmatrix},$$

$x_0^v$ represents a translation in Minkowski space and $\gamma$ is a scale factor on the spatial coordinate.

For control, the translation coordinates $x_0^v$ will be identified with the position of the observer, i.e., the observer will be situated at the origin of the translated coordinate system. This coordinate transformation therefore makes provision for translations, Lorentz transformations and a scale transformation on the spatial coordinate. As such it is parameterised by four real parameters $x_0^0$, $x_0^1$, $\gamma$, $\lambda$. Cartesian coordinates can be introduced in the usual way by $$x = r\cos\varphi, y = r\sin\varphi.$$

Note that $r \in (-a,a)$ and $\varphi \in (0,\pi)$, which is not the usual choice of polar coordinates, where $r \in (0,a)$ and $\varphi \in (0,2\pi)$. Furthermore the boundary $x^0=\infty$ maps onto the semi-circle $r=a$ and the boundary $x^0=-\infty$ onto the semi-circle $r=-a$, while the boundary $x^1=\infty$ maps onto the line $\varphi=0$ and the boundary $x^1=-\infty$ onto the line $\varphi=\pi$. Note also that the light cone of the object (observer) at $x^0=x_0^0$ and $x^1=x_0^1$ in the Minkowski plane where $x^1=\pm cx^0$ maps onto the lines $$\varphi = \frac{\pi}{2} - (\pm)\frac{\pi}{2}\tanh(\gamma).$$

This is demonstrated in FIG. 13.1, which shows the boundaries and light cones in the global coordinate patch defined by the map $\Gamma$.

The control strategy here is to identify the coordinates $x_0^v$ with the position of the observer, which implies that the observer is always at the origin for the coordinate choice $\Gamma$. The user controls the position of the observer through horizontal and vertical motion, the effect of which is that objects flow towards the observer or from left(right) to right(left). At the same time the user can zoom with the scale parameter $\gamma$ or alter the flow with a Lorentz transformation controlled by $\lambda$.

As it is impractical to control all four these parameters effectively, the simplest control strategy is to fix the Lorentz transformation on $\lambda=0$ and to relate the zoom parameter $\gamma$ to the timelike distance between the observer (origin) and the objects. One such choice is:

$$b = ue^{-w(x^0-x_0^0)^2}.$$

The effect this has is that when objects approach from the $x^0$-directions the light cone simultaneously opens the closer the objects get to the observer (origin).

Using the events configuration as in FIG. 8.1, FIGS. 13.2 and 13.3 each presents a sequence of diagrams that display the locations $52_i$ of the events $e_i$ in the coordinate patch 12 after the global coordinate map, with $\lambda=0.5$, but varying observer event $e_0$ locations 30, has been applied. The mapped event locations are shown without their light cone projections.

In FIGS. 13.2a-b the observer event's time coordinate value is fixed at −2, while the space coordinate value is swept from −7.5 to 7.5 in steps of 1.5 units. The effect of the observer event's translation in the space axis is that the locations $52_i$ of the events are rotated around the centre of the circle. In this case, the event set moves from positive to negative angular values.

In FIGS. 13.3a-b the observer event's space coordinate value is fixed at zero, while the time coordinate value is swept from −3 to 7 in steps of one unit. The effect of the observer event's translation in the time axis is that the locations $52_i$ of the events are moved closer to the origin 42 of the circle. In this case, the event set moves from larger to smaller radial values. At first, all events are "in front" of the observer event in the representation manifold, and far away from the observer event location in the coordinate patch 12. All events start out in the upper half of the circle, indicating that they are located in the future relative to the observer event. As the observer event moves in time, it moves progressively closer the event set, reaching the parent event $e_1$ at location (0,0). After this point, the parent event moves from the upper half (future) of the circle to the lower half (past) of the circle and moves and away from the observer's event location 32. As the observer's translation continuous, the child events move closer to the origin 42 of the circle. Eventually all events are located in the lower half of the circle.

The next example exploits the causal structure as encoded through light cones, but uses a considerably different graphical display than in the previous examples. This again demonstrates the flexibility and efficiency that the current innovation allows when communicating information to the user.

The representation manifold is taken as two-dimensional Minkowski space. The idea of this example, which we'll refer to as light cone projected display, is to choose a one-dimensional sub-manifold (this may also be a disconnected set of one-dimensional manifolds as shown below) of Minkowski space and to consider the projection of the forward light cones of events in Minkowski space on this sub-manifold. In practice this can be implemented by choosing a specific coordinate system, taken here to be Cartesian, on Minkowski space and introduce a one-dimensional curve $t(x)$ with $x \in [x_-, x_+]$ (see FIG. 14.1 and note that $x_\pm$ can correspond to $\pm\infty$). The forward light cones of the different events intersect this curve as shown in FIG. 14.1. It is important to note that the logical relations between events are not lost by this projection as the projection of the forward light cones of events closest to the curve, and falling within the forward light cone of events further from the curve, are embedded in the forward light cone projections of these events.

Display is implemented by mapping this one-dimensional sub-manifold with its projected light cone intersections onto a one-dimensional sub-manifold of the output manifold. For the present example the properties of the output manifold may therefore be relaxed in that it need not be Minkowski or even have an indefinite metric, i.e., $M_O$ and $M_R$ need not coincide. To make this more precise, assume a choice of Cartesian coordinates $(t, x)$ on the representation manifold and a choice of coordinates $(x_0^1, x_0^2)$ on the output manifold (taken two-dimensional for illustrative purposes here) and that the one-dimensional sub-manifolds on the representation and output manifolds are, parameterized respectively by the one dimensional curves $t(x)$, $x \in [x_-, x_+]$ and $x_o(\tau)$, $\tau \in [\tau_-, \tau_+]$. The display is then an invertible map $f: [x_-, x_+] \to [\tau_-, \tau_+]$, i.e., $\tau = f(x)$ and $x = f^{-1}(\tau)$ for $x \in [x_-, x_+]$ and $\tau \in [\tau_-, \tau_+]$. This map plays the role of the map X introduced in the general discussion of the output interface, but here it is no longer the identity map. Note that the display curve $x_o(\tau)$ can assume any geometry, e.g., a circle, line or square. In the case where the sub-manifold consists of a disconnected set of one-dimensional manifolds, each one-dimensional sub-manifold is mapped, as above, onto a one-dimensional sub-manifold of the output manifold, i.e., the display manifold is also a collection of disconnected one-dimensional manifolds.

It should be clear that when the light cone intersections of all events are displayed, the display will be extremely cluttered and of limited practical use. Therefore one has to display only those light cone intersections that are sufficient for control and memory retention. This can, for example, be done by displaying only the light cone intersections of events in the immediate past of a point on the curve, i.e., the forward light cone intersections of these events.

Given any point $r$ on the display graph, the point $x = f^{-1}(\tau)$ and the time $t' = t(f^{-1}(\tau))$ on the one-dimensional curve on the representation manifold can then be computed. Thus we obtain the point with coordinates $(t(f^{-1}(\tau)), f^{-1}(\tau))$ on this curve. The Minkowski distance to events on the representation manifold can then be computed to decide in which events' light cones this point lays. This can, however, be computationally costly. A more economic way to do this is to compute the intersections of the light cones with the curve once. To do this, consider the light cone emanating from a point with Cartesian coordinates $(t', x')$ on the representation manifold. It is described by the curves $x_\pm(t) = x' \pm c(t-t')$. Let the points where the light cone cuts the curve $t(x)$ be $(t_\pm, x_\pm)$. Then $$t(x_\pm) = t_\pm = t' \pm \frac{x_\pm - x'}{c} \qquad \text{(Equation 14.1)}$$

This provides equations for $x_\pm$, which can be solved analytically, and only once, for a reasonable choice of the curve $t(x)$. Once this expression is obtained, the points $x_{i\pm}$ where the light cone of the $i^{th}$ object with coordinates $(t_i, x_i)$ cut the curve $t(x)$ can be obtained by replacing the coordinates $(t', x')$ by the coordinates $(t_i, x_i)$. The points of intersection on the display can then be computed simply as $\tau_{i\pm} = f(x_{i\pm})$. The region between these points can then simply be shaded or decorated with an icon that represents the object at point $(t_i, x_i)$. This should be computationally cheap as this analytic formula can be stored and computed easily.

In the case where the sub-manifold consists of a finite number, N, of one-dimensional manifolds described by curves $t^{(n)}(x)$, $n=1, 2, \ldots N$, the intersections of the light cones with each of these curves are computed as in Equation 14.1 by making the simple replacements $$t^{(n)}(x_\pm^{(n)}) = t_\pm^{(n)} = t' \pm \frac{x_\pm^{(n)} - x'}{c} \qquad \text{(Equation 14.2)}$$

These provide equations for the $x_\pm^{(n)}$ for each choice of $n=1, 2, \ldots N$.

The display outlined above is, however, not sufficient for navigation. The reason is that as the observer moves forward in time, the length scales become shorter and shorter if overlaps between light cones are to be avoided. It is therefore necessary to rescale distances in the r-direction (this may also be the case for the t-direction, but this does not affect the display and is a separate matter) at the point that interests the observer, denoted by $\tau_0 \equiv f(x_0)$ in FIG. 14.1. We therefore require from the map $f:[x_-, x_+] \to [\tau_-, \tau_+]$ that the distance between infinitesimally separated points at $\tau_0$ stretch and, far away from $\tau_0$, shrink. Since the distance between two infinitesimally separated points at $\tau = f(x)$ is given by $d\tau = f'(x)dx$, we want $f'(x) \geq 0$, $\forall x$ (consistent with an invertible function), $f'(x_0) \gg 1$, while $f'(x) \to 0$ when $x \to x_\pm$. This limits the generic form of this map to the form shown in FIG. 14.2, i.e., it is a monotonically increasing function, rapidly increasing at the user selected point $x_0$ and flattening out at the end points. The same considerations apply to each one-dimensional manifold in the case of a collection of disconnected one-dimensional manifolds. In fact, to avoid relative distortion, one wants to implement the same zooming function for each one-dimensional manifold.

Control is exercised by moving the curve forward or backward in time by adjusting $t_0$, thereby 'scrolling' through the menu of events lying in each other's light cones (time like control) or by moving along the curve by adjusting $x_0$, thereby 'scrolling' through the menu of objects that are not in each others light cones (space like control). These two functions can naturally be ascribed to radial and angular movements, respectively, as shown in FIG. 14.3 for a display with ring geometry.

We now describe the control in more detail. Starting with time like control: when the user moves the curve t(x) in the time direction, this affects the light cone intersection points $\tau_{i\pm}$ and thus they are functions of $t_0$, i.e., $\tau_{i\pm}(t_0)$. This functional dependence is obtained from the solutions of Equation 14.1 and no new information is required. Typically the forward light cone projections will stretch as the curve moves away from an object. This implies a corresponding stretching of the icon representing the object in its projected light cone. This scaling factor is fixed and computed once analytically when the light cone intersections are computed.

The space like control is more flexible and subtle and in essence involves the control of the shape of the display map $\tau = f(x)$ given in FIG. 14.2. The important features that are under the user's control are the position of the step (peak in the derivative), which is determined by the choice of $x_0$ and the slope of the step (height of the peak of the derivative), which controls the magnification at $\tau_0$.

One way of implementing these control features in practice is to choose any function $f(x)$ with the desired features shown in FIG. 14.2. Then one simply defines the map $\tau = f(\gamma(x-x_0))$. Shifting $x_0$ creates the scrolling effect and changing $\gamma$ the zoom effect. Note, however, that the point $x=x_0$ always maps onto $\tau = f(0)$ and zooming is only implemented at this point.

Implementing zooming as a separate control function requires an additional control parameter, which we wish to avoid, as we want at most two control parameters. One choice is to introduce a $t_0$ dependent zoom function. This is also quite natural as the objects become denser in the x-direction as time increases, necessitating a zooming function. This is simply implemented by increasing the slope of the function $f(x)$ at $\tau_0 = f(x_0)$, keeping this point fixed, as a function of $t_0$. The simplest implementation is given by the map $\tau = f(\gamma(t_0)(x-x_0))$.

This control strategy also applies to the case of a collection of one-dimensional manifolds: the curve $t^{(1)}(x)$ is positioned at $t_0$, $t^{(2)}(x)$ at $t_0+\Delta t_1$, $t^{(3)}(x)$ at $t_0+\Delta t_1+\Delta t_2$ etc. The timelike separations $\Delta t_n$ between the curves $t^{(n)}(x)$ are kept fixed or can be varied, depending on the detailed structure of events, to avoid light cone overlaps or other unwanted visual effects. The same zooming strategy outlined above is applied to each of these one-dimensional manifolds separately.

More generally, almost any visual effect can be generated by adjusting the shape of the map $f(x)$. For example, one may start with a straight line, which will simply lead to an equally spaced display of the intersecting light cone if the objects are equally spaced along the x-direction in Minkowski space. One can then deform this straight line to generate zooming or scrolling effects.

A simple concrete example that demonstrates these general considerations is to take for the curves $t^{(n)}(x)=t_0+n\Delta$, i.e., a collection of equally spaced vertical lines. Equation 14.1 then becomes a trivial linear relation that can be solved trivially, i.e., $$x_{i\pm}^{(n)} = x_i \pm c(t_0 + n\Delta - t_i),$$

demonstrating also the explicit $t_0$ dependence of the light cone intersections. Taking the x-direction as unbounded, the line $x \in (-\infty, \infty)$ can be mapped on a finite interval $\tau \in (-1,1)$ or circle by the map $$\tau = \tan h(\gamma(x-x_0)).$$

In addition this map has all the features set out in FIG. 14.2.

The display strategy here is to visualise only the projections of the forward light cones of events in the interval between two successive lines on the latest temporal line. As forward scrolling progresses, the increased number of events in the interval between two lines may lead to cluttering. It may therefore be necessary to reduce the separation in order to limit the number of events between successive lines, but this can only be done with detailed knowledge of the event structure.

Using the events configuration as in FIG. 8.1, FIG. 14.4 presents a sequence of diagrams that display the representations $62_i$ of the events $e_i$ in the coordinate patch 12 after the global coordinate map, with $\lambda=0.5$, but varying observer event $e_0$ locations 30, has been applied. The mapped event representations are shown as segments on two circular one-dimensional manifolds. The inner circle represents the $\tau$ mapping for curve $t^{(1)}(x)$ (positioned at $t_0$) and the outer circle represents the $\tau$ mapping for curve $t^{(2)}(x)$ (positioned at $t_0+\Delta t_1$, with $\Delta t_1=4.5$). The outer circle represents events in the future of the observer and the inner circle represents events in the past of the observer.

In FIGS. 14.4 the observer event's space coordinate value is fixed at zero, while the time coordinate value is swept from −0.75 to 5.5 in steps of 1.25 units. The event representations $62_i$ are mapped onto one of the two output manifolds. In the first diagram only $62_1$ is visible in the outer circle (the future). In the second diagram the observer has moved into the light cone of event $e_1$. The event representation $62_1$ now moves to the inner circle (the past) and the representations of events $e_2$ to $e_6$ now appear in the outer circle (the future). In the final diagram, the observer moved into the light cone of event $e_4$. The representation of event $e_1$ is no longer shown and the events $e_2$ to $e_6$ have moved to the inner circle (the past).

The previous example has the disadvantage of discreteness in the sense that items drop of the earliest line, jump between successive lines and appear on the latest line as forward scrolling is done. A method to create a more continuous visual effect is now described. This method is based on the choice of a curve (one-dimensional sub-manifold) as shown in FIG. 14.5 where the explicit choice $$t(x) = t_0 + a^2 e^{-b^2(x-x_0)^2}$$

was made.

The control strategy in this case is as before, namely, $t_0$ and $x_0$ are controlled by the user through vertical/radial and horizontal/angular motion, depending on the choice of display geometry. In addition the height and width of the peak can be controlled, but to avoid too many parameters, these are normally fixed on a choice that optimizes visualization. The projections of forward light cones of events in the past of this curve are then displayed through a display map as already described above. It is natural to limit the displayed light cones to events with time coordinate in the interval $[t_0, t_0+t_{max}]$ where $t_{max}$ is the maximum height of the curve.

The intersections of the light cones with this curve are computed as before by solving Equation 14.2. In the case of a Guassian profile, the resulting equation cannot be solved analytically, which makes this an inconvenient and costly choice. Another alternative is the Lorentz shaped curve $$t(x) = t_0 + \frac{a^2}{b^2 + (x-x_0)^2}$$

Equation 14.2 then becomes a $3^{rd}$ order polynomial equation that can still be solved analytically, with the result given in appendix A. To avoid more than one intersections, the following constraint must be respected $$a < \frac{2\sqrt{2}}{3\sqrt{3}} cb^{3/2}.$$

In the following example an alternative manifold and metric, taken from general relativity, is selected for the representation manifold 10. The example, based on an analogy with the Schwarzchild metric, also demonstrates more sophisticated light cone control through control of the manifold metric. The manifold discussed here is a Kähler manifold for which the metric is given by $$ds^2 = \frac{\partial^2 V}{\partial x^\mu \partial x^\nu} dx^\mu dx^\nu.$$

Here V is the Kähler potential. This choice assures that the metric transforms correctly to make $ds^2$ invariant under coordinate transformations. The choice of V made here is ($x^0=t$, $x^1=x$)

$$V = \frac{1}{2}c^2 t^2 - 2ax + \frac{x^2}{2} - \frac{a^2}{2}\log(x-a)^2 + a(x-a)\log(x-a)^2.$$

This yields the metric $$ds^2 = c^2 dt^2 - \left(1 - \frac{a}{x}\right)^{-2} dx^2.$$

The null geodesics, which are the trajectories of light rays and bound the light cone are found by setting $ds^2=0$:

$$\frac{dx}{dt} = \pm c\left(1 - \frac{a}{x}\right),$$

which gives $$t = t_0 \pm \frac{1}{c}\left[(x-x_0) + a\log\left(\frac{x-a}{x_0-a}\right)\right],$$

with $t_0$, $x_0$ integration constants. We set here $t_0=0$, then $x_0$ is simply the x-coordinate of an event at t=0.

The shaded regions in FIG. 15.1 show the light cones of two events at t=0. Here a=1, c=1 and the one event is at ($x_0=0.8<a$) and the other at $x_0=1.2>a$. The events are situated where the lines cross. Note that the light cone never crosses the line x=a=1. The local (Minkowski like) light cones at the events are determined by the lines tangent to the null geodesics at the event, as indicated in FIG. 15.1. The line x=a=1 acts as an event horizon that separates space into two causally disconnected regions. There is a subtle difference here from the Schwarzchild metric where the role of space and time interchanges inside the event horizon (the sign of the metric changes, which is not the case here). In this case light cones inside the event horizon are directed towards the singularity and correspond to the spacelike regions of the current example.

This construction already provides an interesting logical tool to separate events into causally disconnected classes that may, for instance, reflect the user's interest at a given time.

FIG. 15.2 displays the same information as FIG. 15.1 (two events at t=0, $x_0$=0.8 and 1.2), but now with a=1.198, c=1. The effect on the shapes of the light cone is apparent. The light cone of the event close to the event horizon becomes very narrowly shaped close to the event and opens up only much later. This can be used by the user to control his interest in events close or further away from him or, for that matter, logical relations between any events.

FIG. 15.3 demonstrates another feature of the present construction, namely, that the light cones are no longer parallel everywhere as in Minkowski space and that the opening of the local Minkowski light cone also various from point to point (this can be seen as a position dependent light speed). In FIG. 15.3 a=1, c=1 and the trajectories of backward and forward propagating light rays are plotted (null geodesics) passing through the events at t=0, $x_0$=0.2, 0.4, 0.6, 0.8, 1.2, 1.4, 1.6 and 1.8. At each point where these lines cross an event can be placed and the local light cone of this event is determined by the tangents to the null geodesics, as also indicated in FIG. 15.1. This gives the user control over local light cones, and thus the local logical relations determined by these light cones, by varying the geometry, e.g., through a variation of the event horizon in this case.

It shall be understood that the examples are provided for illustrating the invention further and to assist a person skilled in the art with understanding the invention and are not meant to be construed as unduly limiting the reasonable scope of the invention.

REFERENCES

Buxton, B. "HCI and the inadequacies of direct manipulation systems." *SIGCHI Bulletin*, January 1993: 22.

Bachmat, Eitan, Daniel Berend, Luba sapir, and Steven Skiena. www.cs.bgu.ac.il/~ebachmmat/prlfinal.pdf.

Moray, Neville, and Peter A Hancock. "Minkowski space as models of human-machine communication." *Theoretical Issues in Ergonomic Science* 10 (2009): 315.

Darlow, Adam, and Gideon Goldin. *causal temporal order in HCI. Vancouver: CHI* 2011, 2011.

Hrischuk, C E, and C M Woodside. April 1996. http://www.sce.carleton.ca/rads/rads.html.

Broy, manfred. "Time, Abstraction, Causality and modularity in Interactive Systems." *Electronic Notes in Theoretical Computer Science* 108 (2004): 3.

*Seeing and Experiencing Relativity—A New Tool for Teaching.* 2012. www.popsci.com/science/article/2012-11.

Matherat, Philippe, and Marc-Thierry Jaekel. "relativistic Causality and Clockless Circuits." *Journal of Emerging Technologies in Computing Systems* 7, no. 4 (2011): 2043643.

Beaudouin-Lafon, M. Designing interaction, not interfaces. w.thomas.baudel.name/Epistimologie/p15-beaudoin-lafon-tmp.pdf.

Hinze-Hoare, V. arxiv.org. arxiv.org/pdf/0707.3638.

The invention claimed is:

1. A method for human-computer interaction (HCI) comprising:
    establishing an event set;
    establishing and referencing one or more events in the event set;
    establishing and referencing an event to represent an observer in the event set;
    establishing a representation manifold as an indefinite metric Riemann manifold;
    representing the events on the representation manifold in such a way that the logical relations between events are geometrically encoded as causal relations between events based on coordinates of the events within the representation manifold that are independent of coordinates of an input device of a computer and independent of coordinates of a physical output device of the computer;
    establishing an input manifold to represent user input received by the input device of the computer in the representation manifold;
    establishing an output manifold that maps between the representation manifold and coordinates of the physical output device of the computer;
    based on user input received by the input device, selecting any one or more steps from:
        manipulating the event representing the observer in the event set,
        adjusting manifold metrics,
        changing mappings,
        adjusting mapping parameters, and
        applying mappings; and
    presenting information identifying the logical relations between events in the event set using the physical output device of the computer by the computer applying the output manifold to the representation manifold to determine coordinates of the physical output device corresponding to events in the event set and relations between events in the event set.

2. The method of claim 1, wherein the input manifold is a positive definite metric manifold.

3. The method of claim 2, wherein the input manifold is an Euclidian manifold.

4. The method of claim 1, wherein the representation manifold is a Kahler manifold.

5. The method of claim 1, wherein the representation manifold is a Minkowski manifold.

6. The method of claim 1, wherein the output manifold admits a global coordinate patch.

7. The method of claim 1, which includes the step of manipulating the event set.

8. The method of claim 1, wherein the user input is multi-dimensional.

9. The method of claim 1, wherein the user input is multi-sourced.

10. The method of claim 1, wherein the user output is multi-dimensional.

11. The method of claim 1, wherein logical relations between events are selected from functional, structural or temporal.

12. The method of claim 1, further comprising:
    manipulating logical relations between events.

13. The method of claim 1, wherein the logical relations between events are represented by showing light cones of events.

14. The method of claim 1, wherein the logical relations includes the user's expression of intent and/ or interest.

* * * * *